United States Patent
Gordon-Carroll

(10) Patent No.: US 10,861,305 B2
(45) Date of Patent: Dec. 8, 2020

(54) DRONE ENABLED STREET WATCH

(71) Applicant: Vivint, Inc., Provo, UT (US)

(72) Inventor: Clint Huson Gordon-Carroll, Highland, UT (US)

(73) Assignee: Vivint, Inc., Provo, UT (US)

(*) Notice: Subject to any disclaimer, the term of this patent is extended or adjusted under 35 U.S.C. 154(b) by 144 days.

(21) Appl. No.: 15/644,440

(22) Filed: Jul. 7, 2017

(65) Prior Publication Data

US 2017/0337791 A1    Nov. 23, 2017

Related U.S. Application Data

(63) Continuation-in-part of application No. 15/371,004, filed on Dec. 6, 2016, now Pat. No. 10,522,013, which is a continuation-in-part of application No. 15/160,979, filed on May 20, 2016, now Pat. No. 9,870,694.

(51) Int. Cl.
| | |
|---|---|
| *H04L 29/06* | (2006.01) |
| *G08B 13/196* | (2006.01) |
| *H04L 29/08* | (2006.01) |
| *G06F 16/71* | (2019.01) |
| *H04W 4/21* | (2018.01) |
| *H04W 4/02* | (2018.01) |
| *G06F 16/735* | (2019.01) |

(52) U.S. Cl.
CPC ....... *G08B 13/19645* (2013.01); *G06F 16/71* (2019.01); *G06F 16/735* (2019.01); *G08B 13/19656* (2013.01); *G08B 13/19682* (2013.01); *H04L 67/12* (2013.01); *H04W 4/023* (2013.01); *H04W 4/21* (2018.02); *H04L 67/306* (2013.01)

(58) Field of Classification Search
CPC ........................................ H04L 67/12
USPC ........................................ 709/223
See application file for complete search history.

(56) References Cited

U.S. PATENT DOCUMENTS

| | | |
|---|---|---|
| 5,164,827 A | 11/1992 | Paff |
| 7,202,884 B1 | 4/2007 | Barraclough |
| 7,477,285 B1 | 1/2009 | Johnson |
| 7,760,109 B2 | 7/2010 | Broad et al. |
| 8,386,615 B2 | 2/2013 | Clark et al. |
| 9,060,074 B2 | 6/2015 | Wagner et al. |
| 2008/0100705 A1 | 5/2008 | Kister et al. |
| 2008/0238668 A1 | 10/2008 | Johnsen |

(Continued)

OTHER PUBLICATIONS

PCT International Search Report for International Application No. PCT/US2017/028507, dated Jul. 25, 2017 (3 pp.).

(Continued)

*Primary Examiner* — Adnan M Mirza
(74) *Attorney, Agent, or Firm* — Holland & Hart, LLP

(57) ABSTRACT

Apparatuses, techniques, and methods for a security and/or automation system are described. In some cases, methods may include receiving, from a first device, a request to capture data during an identified time period at a first location, determining that a mobile camera device and the first device are part of a predetermined group of devices operating in a neighborhood network, capturing the data using the mobile camera device at the first location, and transmitting the data to the first device. In some cases, the first device comprises a stationary device and the mobile camera device comprises an unmanned air vehicle.

19 Claims, 25 Drawing Sheets

(56) References Cited

U.S. PATENT DOCUMENTS

| | | |
|---|---|---|
| 2010/0023865 A1 | 1/2010 | Fulker et al. |
| 2011/0058034 A1 | 3/2011 | Grass |
| 2011/0211070 A1 | 9/2011 | Shu et al. |
| 2011/0257985 A1 | 10/2011 | Goldstein |
| 2011/0275432 A1 | 11/2011 | Lutnick et al. |
| 2012/0124203 A1 | 5/2012 | Richards |
| 2012/0257061 A1 | 10/2012 | Edwards et al. |
| 2013/0009749 A1 | 1/2013 | Vijayaraghavan et al. |
| 2014/0132772 A1* | 5/2014 | Billau .............. G08B 13/19682 348/159 |
| 2014/0266681 A1 | 9/2014 | Dunn et al. |
| 2014/0375800 A1* | 12/2014 | Lim .................. H04M 1/72538 348/143 |
| 2015/0022355 A1 | 1/2015 | Pham et al. |
| 2015/0054639 A1 | 2/2015 | Rosen |
| 2015/0070506 A1 | 3/2015 | Chattopadhyay et al. |
| 2015/0098686 A1 | 4/2015 | Obukhov et al. |
| 2015/0145991 A1 | 5/2015 | Russell et al. |
| 2015/0339912 A1 | 11/2015 | Farrand et al. |
| 2016/0012445 A1 | 1/2016 | Villa-Real |
| 2016/0094810 A1 | 3/2016 | Mirza et al. |
| 2016/0173827 A1 | 6/2016 | Dannan et al. |
| 2016/0286135 A1 | 9/2016 | Baseuny |
| 2017/0019644 A1 | 1/2017 | K V et al. |
| 2017/0244985 A1* | 8/2017 | Masterson ......... H04N 21/2187 |

OTHER PUBLICATIONS

User's Manual, Ring Video Doorbell, https://static.ring.com/assets/static/Ring-Users-Manual-18214878ad7f1946e58d9efd0d919.pdf, Bot Home Automation, Inc., Mar. 21, 2016.

International Search Report and Written Opinion of the International Searching Authority for PCT/US2017/062620, dated Feb. 26, 2018.

* cited by examiner

DRONE ENABLED STREET WATCH

CROSS-REFERENCE TO RELATED APPLICATIONS

This application is a continuation-in-part of U.S. patent application Ser. No. 15/371,004, titled "STREET WATCH," filed Dec. 6, 2016, pending, which is a continuation-in-part of U.S. patent application Ser. No. 15/160,979, titled "NETWORKED SECURITY CAMERAS AND AUTOMATION," filed May 20, 2016, pending, the disclosures of which are incorporated herein in their entireties by this reference.

BACKGROUND

The present disclosure, for example, relates to security and/or automation systems, and more particularly to networked security cameras and related automation.

Security and automation systems are widely deployed to provide various types of communication and functional features such as monitoring, communication, notification, and/or others. These systems may be capable of supporting communication with a user through a communication connection or a system management action. Some automated systems may be programmed to enable security cameras to send data to or receive data from a device linked in a network.

SUMMARY

Multiple audio or video devices, such as security cameras may be networked together to receive and transmit data related to the location and/or the association of the devices. In some examples, the network of devices may be created and maintained based on a predetermined proximity of the devices or a device to a location, such as devices associated with a house or houses in a neighborhood. In other examples, the network of devices may be based on each device's association with a group, such as a community network, or a group of devices running the same software application.

The devices may obtain and receive data related to the presence of people and/or objects or occurrence of events, obtain and receive data related to identifying the people, objects, and/or events, and make a determination as to whether an action should be taken. The action may be an action related to user preferences at a home and the action may be a security action. In addition, one device in a networked group may share the data, request data, and request initiation of actions with and to other devices in the networked group.

An unmanned aerial vehicle (UAV) (e.g., a drone), is an aircraft without a human pilot aboard. The flight of UAVs (or drones) may operate with various degrees of autonomy: either under remote control by a human operator, or fully or intermittently autonomously, by onboard computers. Drones may have one or more cameras or other components attached to it, which may be used to capture audio and/or video data. In some examples, the audio and/or video data may be stored for later viewing within the drone, or the audio and/or video data may be transmitted to a device associated with the drone. Drones may be configured to fly to a specific destination, and in some cases may be used to monitor a neighborhood. In one example, each home in a neighborhood may have a drone. In some other examples, a common drone may be shared among neighbors in a neighborhood and may perform security-related functions for the group of shared neighbors or may be available on demand based on detected scenarios.

In some embodiments, a new member of a neighborhood may sign up for a street watch group (which may include using an application on a mobile device that allows group members to join). The existing members of the street watch app may accept the new member within the street watch application and may share information related to the neighborhood networked database with the new member. In some examples, a first member of the street watch application may compose a request for access to the neighborhood mobile camera device (e.g., a drone). The first member may also select a time period (e.g., 3:45 pm-4:15 pm) related to data captured by the drone and may include details associated with the request. For example, if a child is supposed to be back from school at 4:00 pm, and the bus stop is a couple of blocks away from the person's house, then the person may request a drone for the time period when the bus is expected to be at the bus stop. If the requested time period is 3:45 pm-4:15 pm, then the drone may go to the bus stop at 3:45 pm and wait for the child to get off the bus. The drone camera may detect or identify the child using one or more techniques (e.g., using facial recognition, using feature recognition, using a view of the child captured at an angle) and may follow the child to his home. In some examples, the drone may ensure that the child is safely back to the house, and may generate a notification to the requesting person (e.g., parent, administrator, baby sitter).

In some examples, access to mobile camera devices may be shared with neighbors in case of an urgent situation. One or more members of a street watch application may receive access to a common drone. For example, a person may be on vacation and may request a neighborhood drone (e.g., a common drone for some neighbors on a street) to go and check on his/her house (e.g., monitor an entry point, the entire property, or based on a detected problem or issue based on sensor data or other information). The mobile camera device, upon receiving the request, may travel to the person's house and may check if everything looks to be in order (e.g., detect doors and windows are shut and intact, detect that doors and windows are locked and positioned correctly). In some examples, the drone may request more information from the home's network of outdoor cameras, indoor cameras, and/or other sensors, and perform certain actions based on the reception of or analysis of the data. Alternatively, the drone directly or through another device may receive information from the home's network of outdoor cameras, indoor cameras, and/or other sensors before arriving at the home or other location.

In some examples, the cameras and sensors could provide information to the street watch application when certain potential threats are detected (e.g., visitor detected on a porch after a package has been delivered, unknown visitor or intruder positioned at a location inside or outside the home), and the street watch application or other device can automatically dispatch a drone to the location identified. In some embodiments, in response to detecting an unusual event, an outdoor camera and/or sensor may record a video and send the file or a notification to other users in the network to be on alert. Thus, neighbors can be notified and/or their cameras (e.g., drones and outdoor cameras) may begin recording to capture additional information. In some examples, upon receiving this alert, a common drone may be dispatched to monitor multiple houses of the neighborhood. In some examples, this alert to other systems and people may include a notification about what happened and/or may include a picture of an unidentified person (or unusual event) for the user or other cameras (e.g., drones or stationary cameras) to monitor for.

According to one embodiment, an event-based trigger may alert a drone (e.g., a personal drone or a common neighborhood drone). In some examples, an alert may be received (e.g., a problem, an amber alert, a natural disaster or other condition). The security and/or automation system may alert the mobile camera device, and may send the details of the event or alert. For example, an amber alert may include a car identification (e.g., make, model, year of a car, color of the car, license plate number etc.). The system may detect the amber alert via the drone and/or via other cameras (e.g., outdoor cameras, doorbell cameras, user-generated video content, or a combination thereof) and automatically dispatch a mobile camera device. The mobile camera device may identify the specified car and may follow the car for a predetermined distance.

The mobile camera device may, in some examples, alert one or more other mobile camera device in the path of the car. For example, based on the path of the car, the mobile camera device may identify one or more potential routes that the car may take. Upon identifying the routes, the mobile camera device may notify other mobile camera devices or other devices at or near the route of the car identified from the amber alert. The camera on the mobile camera device may record audio and/or video footage of the car, based on the amber alert. In some examples, the audio and/or video data captured by the mobile camera device may be transmitted to a third party (e.g., law enforcement officers) or the video from the mobile camera device or mobile camera devices may be combined and sent to a requesting party, those part of the street watch group, or anyone in the area. In some examples, the system may aggregate data (e.g., audio and/or video data) from one or more mobile camera devices and one or more cameras in a neighborhood (e.g., outdoor cameras), and may send the aggregated data to the third party. One or more mobile camera device may follow the car until police or other law enforcement officers are in the vicinity.

According to one example, the cameras (e.g., mobile cameras and stationary cameras) may be coupled with a wireless communication system which is enabled to send data over a wireless network. In some cases, the data is sent to a user associated with the drone. In other cases, the cameras may be communicatively coupled with other drones and camera systems enabled with wireless communication capabilities (directly between cameras or indirectly using the internet or other wireless connection). In some embodiments, communications between cameras may be enabled through a base station, and in other cases, the cameras may communicate using peer-to-peer communications.

A stationary device (e.g., control panel, motion sensor, doorbell camera) may transmit a request to capture data at a location during a predetermine time period. The request may be transmitted to a mobile camera device (e.g., drone). The stationary device and the mobile camera device may be part of a predefined group of devices. The mobile camera device may capture the requested data. The captured data may be transmitted to the stationary device. The mobile camera device may identify a person and/or an event from the captured data.

A first device may transmit a request for data from a second device. The request for data may also include an inquiry related to presence of people and/or objects or occurrence of events and a category associated with the request. The second device may obtain data related to the presence of people and/or objects or occurrence of events, based on the category associated with the request, and make a determination as to whether an action should be taken. The action may be an action related to user preferences related to automated transmission of the obtained data and the action may be a security action. In addition, one device in a networked group may share the data, request additional data, and request initiation of actions with and to other devices in the networked group.

Some examples relate to systems, methods, non-transitory computer readable media and related devices for enhancing security and home automation system components and communications. In one example, the system and method may include receiving, from a first device, a request to capture data during an identified time period at a first location, determining that a mobile camera device and the first device are part of a predetermined group of devices operating in a neighborhood network, capturing the data using the mobile camera device at the first location, and transmitting the data to the first device.

In some examples, the first device comprises a stationary device and the mobile camera device comprises an unmanned air vehicle. The system and method may further include identifying a first set of data related to a person or an event at the first location based at least in part on capturing the data. In some cases, transmitting the data comprises transmitting the first set of data related to the person or the event at the first location to the first device based at least in part on identifying the first set of data.

In some examples, the system and method may include receiving identification data for an object or a person at the mobile camera device, the identification data associated with a user inquiry, identifying a first set of data related to the object or the person at the first location using the mobile camera device, and confirming an identity of the object or the person based at least in part on the identifying.

In some examples, the system and method may include determining that the object or the person is in motion, following a path of progress for the object or the person for a predefined distance, and initiating notification of a second device based at least in part on the path of progress for the object or the person.

In some examples, the system and method may include predicting a future path of progress for the object or the person, identifying one or more cameras located within a first distance of the future path of progress, and initiating notification of the second device based at least in part on identifying the one or more cameras, wherein a second mobile camera device comprises one of the one or more cameras.

In some examples, the one or more cameras comprise one or more stationary cameras, the one or more stationary cameras and the second mobile camera device being part of the predetermined group of devices operating in the neighborhood network.

In some examples, the system and method may include identifying the predetermined group of devices based at least in part on a geographic proximity of each to the first location, or a second location, or both, wherein the first location and the second location are each associated with different homes.

In some examples, the system and method may include receiving data related to occupancy at the first location and capturing data using the mobile camera device at the first location based at least in part on receiving the data related to the occupancy. In some examples, the system and method may include transmitting an indicator associated with an adjustment of a security action at the first location based at least in part on the received data related to the occupancy, the captured data, or both.

In one example, the system and method may include identifying an object at the first location, determining that the object is a mobile object, determining that the object is a mobile object, and transmitting an indicator associated with an adjustment of a security action at the first location based at least in part on determining that the object is the mobile object and the retrieved data. In some cases, the request comprises a request to capture audio, visual data, or both during the identified time period at the first location.

The system and method may include transmitting, to a mobile camera device, a request to capture data during an identified time period at a first location, determining that the mobile camera device and a first device are part of a predetermined group of devices operating in a neighborhood network, and receiving the data captured using the mobile camera device at the first location.

In some examples, the first device comprises a stationary device and the mobile camera device comprises an unmanned air vehicle. In some examples, the system and method may include transmitting identification data for an object or a person to the mobile camera device, the identification data associated with a user inquiry, determining that the object or the person is in motion, identifying a path of progress for the object or the person for a predefined distance, and transmitting the identified path of progress to the mobile camera device.

In some examples, the system and method may include predicting a future path of progress for the object or the person, identifying one or more cameras located within a first distance of the future path of progress, and notifying a second device based at least in part on identifying the one or more cameras, wherein a second mobile camera device comprises one of the one or more cameras.

Some examples relate to systems, methods, non-transitory computer readable media and related devices for enhancing security and home automation system components and communications. In one example, the system and method may include receiving, from a first device at a first location, a request to access data associated with a time period from a second device at a second location, the data comprising at least one of audio data, visual data, or a combination thereof, receiving, from the first device, a category associated with the request, identifying a first set of data associated with the time period, the identified first set of data based at least in part on the request and the category, and/or automatically transmitting the first set of data to the first device based at least in part on the category.

In some examples, the second device comprises a camera. The system and method may further include obtaining from a third device, the data associated with the time period at the second device, wherein identifying the first set of data is based at least in part on the data obtained from the third device. In some examples, the method may include obtaining the data from a database associated with a pre-determined group of devices.

In some examples, the system and method may include determining that the first device and the second device are part of the pre-determined group of devices operating in a network, wherein transmitting the first set of data is based at least in part on the determination.

In some examples, the pre-determined group of devices comprise a plurality of cameras. In some examples, the system and method may include defining the pre-determined group of devices based at least in part on a geographic proximity of each of the pre-determined group of devices to the first location, or the second location, or both, wherein the first location and the second location are in different physical structures.

In some examples, the system and method may include receiving, from the first device, an inquiry associated with an object, or a person, or both and/or confirming an identity of the object, the person, or both based at least in part on the first set of data and the inquiry.

In some examples, the system and method may include determining that the category satisfies a pre-determined threshold associated with the second device. In some examples, the system and method may include receiving a notification indicating the category based at least in part on the determination.

In some examples, the pre-determined threshold is defined by a user associated with the second device. In some examples, the automatically transmitting the first set of data to the first device is based at least in part on the determination.

In some examples, the system and method may include transmitting an instruction to adjust a first security action at the first location based at least in part on the first set of data and/or adjusting a second security action at the second location based at least in part on the first set of data.

In some examples, the system and method may include determining that a first device at a first location and a second device at a second location are part of a pre-determined group of devices operating in a network, creating, at the first device, a request to access data associated with a time period, the data being captured by the second device, and the data comprising at least one of audio data, visual data, or a combination thereof, identifying a category associated with the request, and/or transmitting the request and the category associated with the request to the second device.

In one example, the system and method may include obtaining data from a first sensor at a first location, receiving identification data related to a person or an event at the first location, comparing the obtained data with the identification data, adjusting a first security action at the first location based at least in part on comparing the received data with the obtained data, and/or transmitting information to a second sensor at a second location different from the first location based at least in part on the determining, the second sensor being part of a predetermined group of devices.

The system and method may include detecting an event at the first location based on the obtained data, the received identification data, or both, classifying the event at the first location based on the detecting, and/or sending a request to a second device at the second location based at least in part on the classification. In yet further examples, the method may include determining an indication of occupancy at the first location and adjusting the first security action based on the indication of occupancy.

In some examples, the system and method may include transmitting a first request to a device at the second location to determine an indication of occupancy at the second location, and/or transmitting a second request to adjust a second security action at the second location based at least in part on the determined indication of occupancy at the second location.

In some examples, adjusting may include sending a request to a device at the second location to obtain data, sending a command to adjust a second security action at the second location based at least in part on the comparing at the first location, and/or adjusting the first security action at the first location based at least in part on a user profile associated with the first location.

In some examples, the system and method may include transmitting an instruction to variably adjust a second security action at the second location based at least in part on the adjustment of the first security action at the first location.

In some examples, the transmitted information may include transmitting an instruction to variably adjust a second security action at the second location based at least in part on a user profile associated with the second location.

In some examples, the system and method may include receiving identification data from a remote source, and determining an identity of the person based at least in part on the received identification data from the remote source and the comparing.

In some examples, receiving data may include receiving identification data from a database associated with the predetermined group. In some examples, the method may include identifying the predetermined group of devices based on a user input.

In some examples, the system and method may include defining the predetermined group of devices based at least in part on a geographic proximity of the first location to the second location, wherein the first location and the second location are in different physical structures.

In some examples, adjusting the first security action includes increasing a frequency of obtaining audio data or visual data, activating an internal light, or an external light, or an internal audio source, or an external audio source, or a lock, or some combination thereof.

In some examples, the system and method may include sending an alert to a user device associated with the first location based at least in part on the received data, receiving an indication from the user based on the sent alert, and adjusting a security action at the first location based at least in part on the received indication.

The foregoing has outlined rather broadly the features and technical advantages of examples according to this disclosure so that the following detailed description may be better understood. Additional features and advantages will be described below. The concepts and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
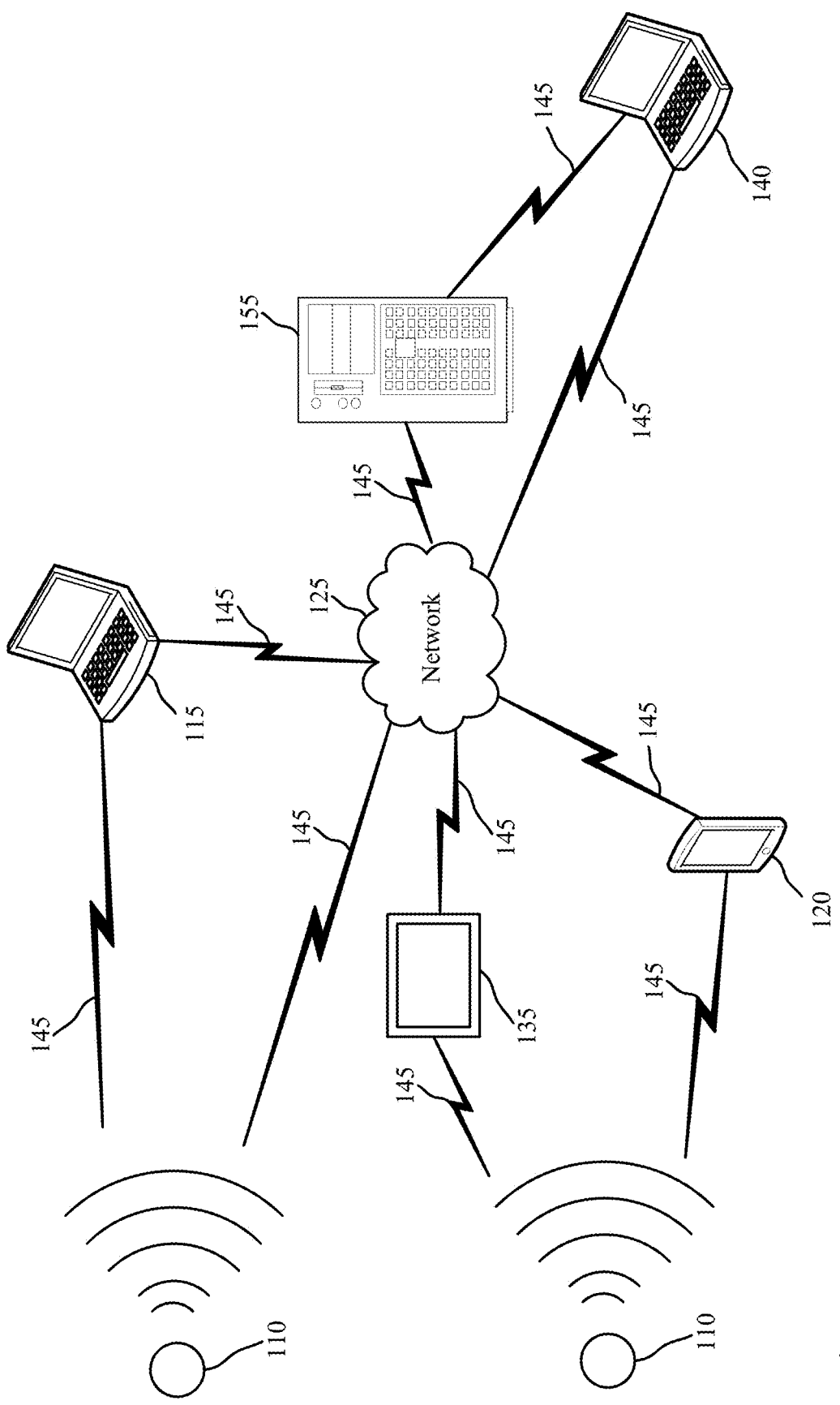
FIG. 1 shows a block diagram relating to a security and/or an automation system, in accordance with various aspects of this disclosure.

The systems and methods described herein relate generally to receiving and transmitted identification and event data at a mobile audio/video device, such as a UAV (e.g., drone). In some examples, the identification and event data may be transmitted in response to a received request. In some examples, the identification and/or event data may be requested from a first member of a community networking group by a second member of the community networking group. In some examples, the device may be wirelessly networked with other devices within a predetermined distance or at a predetermined location. In other examples, the devices may be wirelessly networked with other devices that have opted-into the community networking group. In some examples, the members of the community networking group may be customers of the same security and automation solution provider. In some other examples, the members of the community networking group may be customers of two or more different security and automation solution providers. Based on the data received and/or transmitted, the devices may send commands to other devices to take an action, send an alert, perform other operations.

In one embodiment, two or more security cameras may be associated with two or more locations, respectively. One camera may be a mobile camera device (e.g., a drone, an unmanned aerial vehicle, a self-flying camera) and the other camera may be a stationary device (e.g., a doorbell camera, an outdoor camera). The mobile camera device at one location may obtain and receive data related to identification of people, objects, and/or events occurring at or near the location. The mobile camera device (e.g., drone) may be configured to travel (e.g., fly) to that location upon receiving a request for audio and/or video data. In some examples, the camera may be configured to automatically take snapshots upon detecting events at or near the location. Based on the relationship between the two or more cameras, the first mobile camera device may share information, request information, take an action at the first location, and/or request or initiate an action at the second location. In some examples, a user associated with the first camera may review the data prior to sending it to a second camera. In some examples, the second camera at the second location may be configured to request for audio/video data (i.e., data related to identification of people, objects, and/or events occurring at or near the location of the first camera) for a specified time period. While requesting, a user associated with the second camera may also indicate a category of urgency. The category of urgency may, in some examples, be an indication of a level of urgency of the request. Information obtained may be analyzed to determine if a person, object, and/or event requires an alert and/or an action with regard to at least one of the locations.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 is an example of a communications system 100 in accordance with various aspects of the disclosure. In some examples, the communications system 100 may include one or more sensor units 110, local computing devices 115 and 120, network 125, server 155, control panel 135, and remote computing device 140, among other components. One or more sensor units 110 may communicate via wired or wireless communication links 145 with one or more of the local computing devices 115 and 120, or network 125. The network 125 may communicate via wired or wireless communication links 145 with the control panel 135 and the remote computing device 140 via server 155. In alternate examples, the network 125 may be integrated with any one of the local computing devices 115 and 120, server 155, or remote computing device 140, such that separate components are not required.

Local computing devices 115 and 120 and remote computing device 140 may be custom computing entities configured to interact with sensor units 110 via network 125, and in some examples, via server 155. In other examples, local computing devices 115 and 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a smart watch, a fitness tracker, a mobile phone, a personal digital assistant (PDA), and/or any other suitable device operable to send and receive signals, store and retrieve data, and/or execute modules. In some examples, local computing devices 115 and 120 and/or remote computing device 140 may comprise or be coupled to internal and/or external sensors which are enabled to sense and capture data similar to or in the same manner as sensor units 110.

Control panel 135 may be a smart home system panel, for example, an interactive panel permanently or removably mounted on a wall in a user's home. Control panel 135 may be in direct communication via wired or wireless communication links 145 with the one or more sensor units 110, or may receive sensor data from the one or more sensor units 110 via local computing devices 115 and 120 and network 125, or may receive data via remote computing device 140, server 155, and network 125.

The local computing devices 115 and 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some examples, the local computing devices 115 and 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115 and 120 may be operable to control operation of the output of the local computing devices 115 and 120. The output may be a television, a liquid crystal display (LCD) monitor, a cathode ray tube (CRT) monitor, speaker, tactile output device, and/or the like. In some examples, the output may be an integral component of the local computing devices 115 and 120. Similarly stated, the output may be directly coupled to the processor. For example, the output may be the integral display of a tablet and/or smart phone. In some examples, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115 and 120 to the output.

The remote computing device 140 may be a computing entity operable to enable a remote user to monitor the output of the sensor units 110. The remote computing device 140 may be functionally and/or structurally similar to the local computing devices 115 and 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 155.

In some examples, the one or more sensor units 110 may be sensors configured to conduct periodic, continuous, conditional, or otherwise ongoing automatic measurements related to determining the presence of at least one person in or at a location and/or determining data related to identifying the person determined to be present in the location. In other examples, the sensors may be configured to conduct periodic, continuous, conditional, or otherwise ongoing automatic measurements related to determining the occurrence of an event or a condition within a predetermined distance of the location or at the location. For example, the sensors may determine if a car is speeding by on the street in front of a home, if a person has entered into a house, if items are being removed from a house, etc. Sensor units 110 may include or relate to, but are not limited to: proximity, motion, temperatures, humidity, sound level, smoke, structural features (e.g., glass breaking, door opening and/or closing, window opening and/or closing, window position, door position), time, geo-location data of a user and/or a device, distance, biometrics, weight, speed, direction, gait, height, size, preferences, light, darkness, weather, time, system performance, the status and/or the usage of an electronic device and/or a building feature, and/or other inputs that relate to a security and/or an automation system and/or an occupant of an area and/or a structure, such as a home. Each sensor unit 110 may be capable of sensing one or more environmental parameters, or alternatively, separate sensor units 110 may monitor separate environmental parameters. For example, one sensor unit 110 may measure ambient light level, while another sensor unit 110 (or, in some examples, the same sensor unit 110) may detect motion of an occupant. Such detecting motion may in some examples occur in relative darkness and/or involve wavelengths within and/or beyond those detectable by the human vision (e.g., near-infrared illumination, microwave radiation, ultrasonic waves, passive infrared radiation, tomographic motion). One sensor unit 110 example may be a camera. In some examples, one or more sensor units 110 may additionally monitor alternate environmental parameters, such as the voice of an occupant.

Each sensor unit 110 may be capable of sensing multiple identification and/or event identifying parameters, or different sensor units 110 may be capable of sensing a specific identification and/or event parameter. For example, one sensor unit 110 may measure biometric data, while another sensor unit 110 (or, in some examples, the same sensor unit 110) may detect digital and/or electronic data, a physical characteristic of the person, or a location of a different person. In some examples, one or more sensor units 110 may additionally capture a snapshot upon sensing a specific identification of an event parameter (e.g., detect a motion, facial recognition). In some examples, one or more sensor units 110 may additionally monitor alternate environmental parameters, such as the date, time, and/or weather. In alternate examples, a user may input identification data directly at the local computing devices 115 and/or 120 or at remote computing device 140, such as an allowed and/or expected user entering or exiting a building associated with the networked devices.

Data gathered by the one or more sensor units 110 may be received by local computing devices 115 and 120, which may be, in some examples, a thermostat or other wall-mounted input/output smart home display. In other examples, local computing devices 115 and 120 may be a personal computer or portable electronic device such as a smart phone, tablet, and/or smartwatch. The local computing devices 115 and 120 may process the data received from the one or more sensor units 110 to obtain presence data, identification data, and/or event data and to determine whether to store and/or share (e.g., with other networked devices or a third-party source) the data, respond to a request from a user, alert a user, and/or take an action in response to obtaining the data or otherwise receiving data related to presence, identification, and/or an event. In alternate examples, remote computing device 140 may process the data received from the one or more sensor units 110, via network 125 and server 155, to obtain presence, identification and/or event data. Data transmission may occur via, for example, frequencies appropriate for a personal area network (such as BLUETOOTH® or IR communications) or local or wide area network frequencies such as, but not limited to, radio frequencies specified by the IEEE 802.15.4 standard.

In some examples, local computing devices 115 and 120 may communicate with remote computing device 140 or control panel 135 via network 125 and server 155. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some examples, a user may access the functions of local computing devices 115 and/or 120 from remote computing device 140. For example, in some examples, remote computing device 140 may include a mobile application that interfaces with one or more functions of local computing devices 115 and/or 120. In some examples, remote computing device 140 may be a personal computer (e.g., desktop and/or laptop), control panel, smart phone or smart watch, and/or tablet. In other examples, remote computing device 140 may be a computing device associated with a business, public service, and/or database such as a news source, law enforcement, hospitals, schools, traffic cameras, Amber Alerts, criminal databases, etc.

The server 155 may be configured to communicate with the sensor units 110, the local computing devices 115 and 120, the remote computing device 140 and control panel 135. The server 155 may perform additional processing on signals received from the sensor units 110 or local computing devices 115 and 120, or may simply forward the received information to the remote computing device 140 and control panel 135.

Server 155 may be a computing device operable to receive data streams (e.g., from sensor units 110 and/or local computing devices 115 and 120 or remote computing device 140), store and/or process data, and/or transmit data and/or data summaries (e.g., to remote computing device 140). For example, server 155 may receive a transmission of or a stream of identification data from any of a number of sensor units 110. In some examples, server 155 may "pull" the data, e.g., by querying the sensor units 110, the local computing devices 115 and 120, and/or the control panel 135. In some examples, the data may be "pushed" from the sensor units 110 and/or the local computing devices 115 and 120 to the server 155. For example, the sensor units 110 and/or the local computing devices 115 and 120 may be configured to transmit data as it is generated by or entered into that device. In some instances, the sensor units 110 and/or the local computing devices 115 and 120 may periodically transmit data (e.g., as a block of data or as one or more data points).

The server 155 may include a database (e.g., in memory) containing identification data received from the sensor units 110 and/or the local computing devices 115 and 120. In some examples, the database may also contain a log of events related to the sensor units 110 (e.g., door events, window events). Additionally, as described in further detail herein, software (e.g., stored in memory) may be executed on a processor of the server 155. Such software (executed on the processor) may be operable to cause the server 155 to monitor, process, summarize, present, and/or send a signal associated with resource usage data.

In one example, sensor units 110 may be associated with at least two networked locations; for example, sensor units 110 may be security cameras located at a first house and a second house. The sensor units 110 may, respectively, be in wireless communication with a control panel and local computing devices located at the first house and/or the second house, where the control panels and computing devices of each house are in communication with each other. Remote computing device may be a computing device associated with law enforcement, a news source, or other information source from which sensor units 110 and local computing devices 115 and/or 120 may receive identification information. Based at least in part on what data the sensor units 110 obtain at the houses and the data received from other elements of the wireless communication system, actions at least one of the locations may be adjusted or initiated.

Figure 2A:
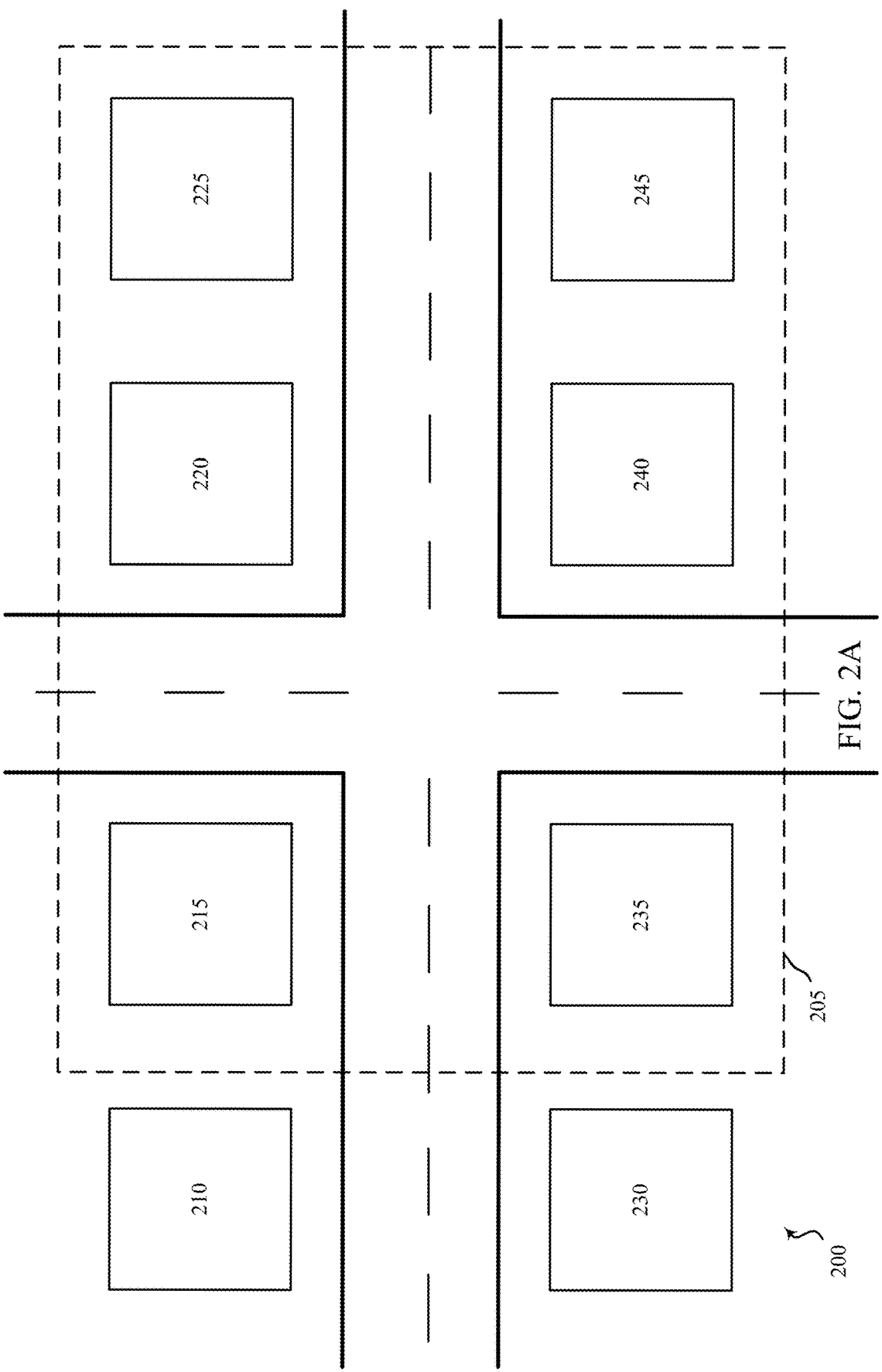
FIG. 2A shows a block diagram relating to a security and/or an automation system, in accordance with various aspects of this disclosure.

FIGS. 2A-2J show block diagrams relating to a security and/or an automation system, in accordance with various aspects of this disclosure. In particular, FIG. 2A shows an example residential neighborhood 200 having eight houses 210, 215, 220, 225, 230, 235, 240 and 245. Although FIG. 2A shows an example residential neighborhood with houses located within a geographic area of one another, it should be understood that neighborhood 200 may be a residential area, a commercial area, a rural area, and/or a mixed use area. In addition, the houses 210-245 may be any type of structures, and the structures need not be located next to one another, but rather may be located in different geographic locations separated by any contemplated distance (e.g., same subdivision, same commercial block, same multi-unit building, different sub-divisions, different commercial blocks, located on the same street but separated by one or miles). The systems and methods described herein relate to the example residential neighborhood 200, but the system and methods are not limited to neighborhood 200.

In neighborhood 200, any of the eight houses 210-245 may be coupled to at least one audio/video device, such as a mobile camera device (such as a drone), a security and/or doorbell camera in wireless communication with at least one audio/video device located at another house; however, not all the devices may be in wireless communication with each other. Dotted line 205 shows a grouping of houses which are wirelessly networked to communicate with at least one other house located within the dotted line 205 by way of at least one audio/video device located at and/or associated with houses 215, 220, 225, 230, 235, 240, and/or 245. In this example, the six houses that are in networked wireless communication with each other are shown to be next to one another, however, the networked houses need not be next to each other. For example, houses 215, 220, 240, and 245 may be wirelessly networked in another example. In another example, any or some of the houses shown in within dotted line 205 may also be in wireless communication with a house (e.g., based on a device associated with and/or located at a house communicating with a device associated with a second house) that is not shown in FIG. 2.

Thus, in one example, the devices and/or houses may be part of a network based on proximity within a location; however, in other examples, the devices may be part of a network based on a specific association. For example, a community network may include a neighborhood-based social network, a social group network, an opt-in network that is not proximity based, an opt-in network that is proximity based, an automatically established network link based on location and proximity (e.g., portable electronic device running an application enters a building enabled to perform the methods described herein). For example, houses 215, 220, 225, 235, 240, and 245 may all be part of a homeowners' association, where houses 210 and 230 are not part of the same homeowners' association, even though houses 210 and 230 are located in the same neighborhood. In some examples, the devices and/or houses may be members of a street watch group. In some examples, the devices and/or houses may each be related to one or more street watch groups. The devices and/or houses may be capable of choosing members of their personal street watch group based on user input, location of potential users, geographic proximity of one or more objects to one or more objects or locations, other information, or some combination.

Each of the devices associated with the location of each of the houses may share any or all of the same capabilities as each other device. For example, a device associated with house 215 may be enabled to obtain data from a first sensor at house 215. In one example, the sensor may be part of the mobile camera device. In another example, the sensor may be physically integrated as part of the device and/or may be in wired and/or wireless communication with the device. The data obtained by the sensor may include: biometric and personal data such as fingerprints, retinal scans, facial scans, gait, height, weight, speed, cadence, hair color, hair length, presence of facial hair, tattoos, piercings, jewelry, clothing style, clothing color, voice recordings, personal identification numbers, radio frequency data related to a radio frequency identification (RFID) tag associated with a person, identification of an electronic device such as a smartphone, table, or wearable electronic device, and the like.

The sensor may also obtain data related to animals, vehicles, environment, and non-tangible items, such car types, delivery vehicles, company logos, identification card data, rain, wind, sounds related to walking, running, talking, screaming, laughing, wind, glass breaking, doors opening and closing, sirens, alarms, etc. which are determined to be within a predetermined proximity of example house 215.

In addition, a first device may receive a request for sensor data for a specific time period from one or more other devices. For example, the first device may be a mobile camera device (e.g., a drone). The first device may receive a category associated with the request. Based on the category, the first device may transmit data (e.g., sensor data) to the second device. In some cases, the first device may automatically transmit data based on the category, such as the category meeting or exceeding a threshold (which may be based on user input, a system setting, other information, or some combination). In one example, the mobile camera device associated with house 210 may receive a request to capture audio/video data at or near house 245 (for example from a smartphone of an occupant of house 245). For example, the home owner of house 245 may be on a vacation, and may request access to the mobile camera device of house 210 in order to perform a surveillance of the property (e.g., house 245) or a surrounding area. In order to reach house 245, the mobile camera device may fly past houses 215, 235, 220, 240 and 225. The mobile camera device may be configured to follow the dotted line as route from house 210 to house 245. Upon reaching house 245, the mobile camera device may capture audio and/or video data in and around the house, and may transmit the data to the requesting device. In one example, the mobile camera device may determine the shortest route from house 210 to house 245. In some examples, the shortest route from house 210 to house 245 may include a street between house 230 and house 235 that runs behind house 235 and house 240 to reach house 245. In such an example, the mobile camera device may be configured to follow the street between house 230 and house 235 and behind house 235 and house 240.

Additionally, the device may also receive event notification in house 245. For example, with respect to an event, the mobile camera device may be configured to identify any abnormalities in house 245 (such as the front door open, window glass broken, unknown person on the porch). In one example, the identification data related to a person or an event at or within a predetermined distance of previously discussed example house 215. For example, with respect to a person, the device may associate or compare the data obtained from the sensor with a plurality of user profiles associated with house 215 or past data. In other examples, the user profiles may be associated with other houses in the neighborhood which are in networked communication with one another. The user profiles may be profiles of an allowed and/or expected users and/or guests at example house 215, or other networked houses. The user profiles may be stored individually for each house and/or combined into a database for some and/or all of the networked devices. Some profiles, sensor data, determinations, comparisons, or other information may be shared with some devices with user permission or based on user preferences. For example, in the case of an emergency or a detected event, more profile data may be shared with more of the networked devices within the area indicated by dotted line 205. If the user interacts with the system using a software application (such as on a smartphone or a control panel), the software application may query the user on what, if any, information the user would like to share with the rest of the networked users.

Other identification data related to a person may include data received from transmissions from other devices (e.g., 220, 225, 235, 240, and/or 245). In other examples, other identification data related to a person may be received from remote and/or third-party databases and/or reports and/or broadcasts and/or publications. For example, identification data from a criminal database, missing child and/or persons database, newspaper articles, news broadcasts, radio broadcasts, television broadcasts, digital streaming broadcasts, and the like.

With respect to an event, the device may associate the data obtained from the sensor with predetermined, pre-stored, and/or computer learning algorithmic determined elements related to one or more events. For example, the device may obtain information related to opening and closing a door, window, gate, garage door, blinds; a vehicle ignition starting, turning off, speeding, idling, swerving, crashing; weather data such as rain, wind, snow, hail; glass breaking; talking, screaming, laughing, etc., located within a predetermined distance of example house 215. Based on the data received, user input, changes in preferences, and/or communication from and between other devices, each device may learn the association between obtained data and/or identification data which may not have been previously predetermined or preprogrammed into the system.

The device may compare the data obtained with identification data received to determine if an event has occurred and/or if an identified or non-identified person is associated with the event. In some examples, the device may receive an inquiry related to an event and/or a person. The device may device compare the data obtained with inquiry received to determine if an event has occurred and/or if a person is identified. In some examples, the person and/or the event may be allowed and/or expected, while in other examples, the person and/or the event may be unauthorized. In other examples, the person and/or event may not be able to be determined and/or identified; however, through computer learning algorithms and other input, over time, the device may be able to identify people and/or events over time.

Based on the comparison, the device may initiate an adjustment of an action related to the location and/or a user associated with the location. In some examples, the adjustment may be of a user preference (e.g., turn on the lights, turn on music, set the thermostat to a specific temperature). In other examples, the adjustment may be to a security action. The adjustment may be automatic (i.e., pre-programmed by a security company, law enforcement, the manufacturer), may be user-defined (i.e., based on user preference), and/or may be dynamically adjusted and learned over time based on computer learning algorithms. In addition, the device may send the obtained data, the identification data, the comparison data, data associated with the adjustment, etc., to at least one of the other devices in networked communication with the device at house 215.

Figure 2B:
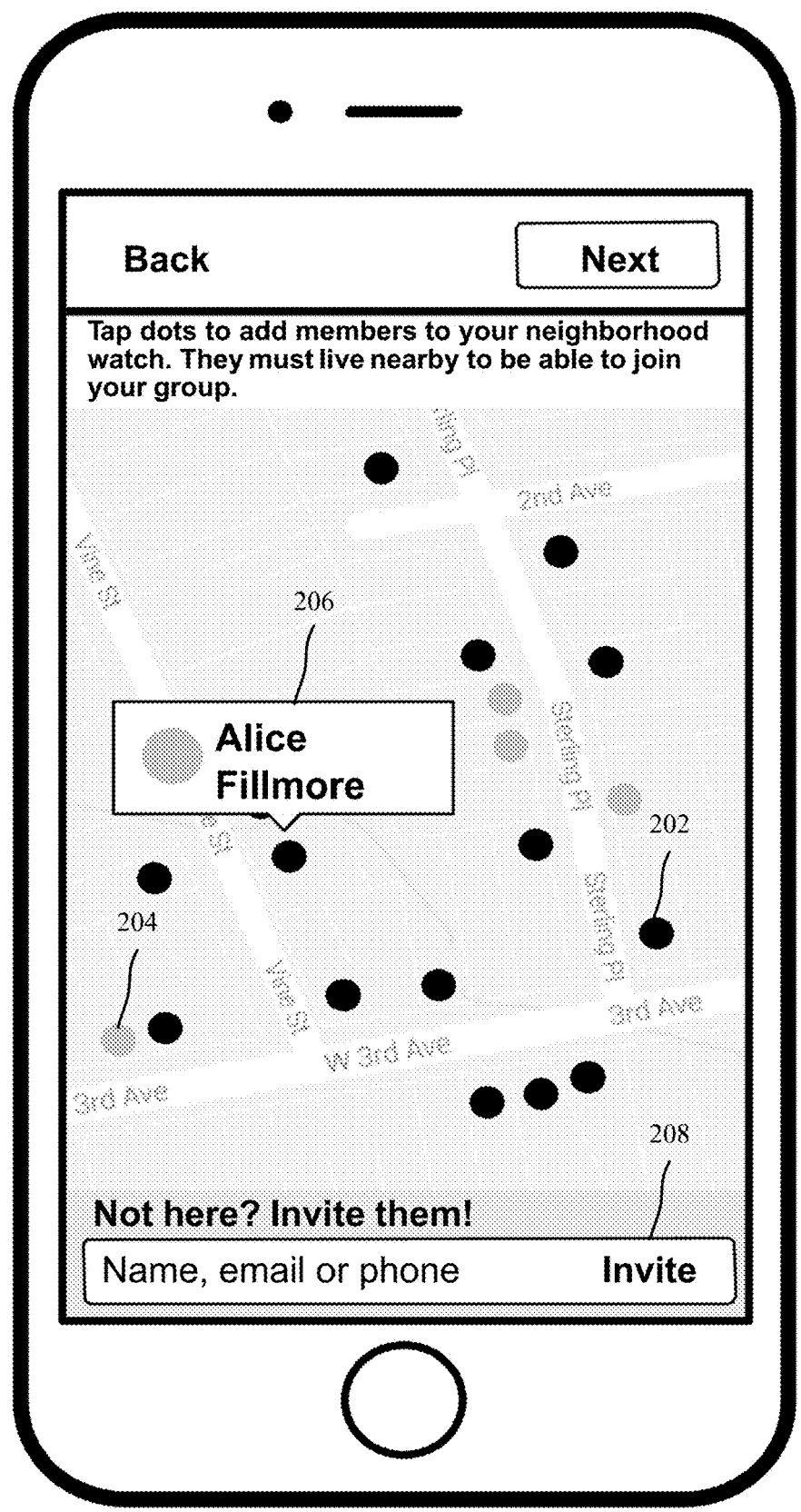
FIG. 2B shows an exemplary user interface relating to a security and/or an automation system, in accordance with various aspects of this disclosure.

Referring now to FIG. 2B, an exemplary user interface 201-*b* for a street watch is described. In some examples, the user interface may be generated by the sensor linking module 415, among other components or elements. The user interface shows a map of an area proximate a user of the street watch application. This may be generated when a user signs up for a street watch program. The dots represent neighbors of the user, who are members of the street watch. The user may sign up for a street watch, with his personal information (address, home phone number, social security number, mobile phone number). For example, a user may be new to a neighborhood and may be willing to be part of an existing street watch group. The neighborhood may have multiple street watch groups. The user may provide his address at sign up, and the security and automation provider may verify the address. Once the address is verified, the user may choose to be a member of an existing street watch group or the user may choose to create a new street watch group. When the user decides to create a street watch group, the user sends a request to his neighbors. For example, the request may be an introductory message and an invitation to be a member of the user's street watch group. The recipient of the message could either accept the invitation or reject the invitation. In some examples, the first dot 202 (and other similar dots) may indicate a neighbor who has accepted the invitation and is a member of the user's personal street watch group. In some examples, the second dot 204 (and other similar dots) may indicate a neighbor who has not yet accepted the invitation or has been sent a request for an invitation, and is not yet in the user's personal street watch group. In some examples, the second dot 204 may also indicate a neighbor who has rejected the user's invitation and is not in the user's street watch group. The user may select any member from the street watch to get more details, including various types of identifying information as shown in component 206. For example, in accordance with various aspects of the present disclosure, the user may have selected a member who is in the user's street watch group. The user may also invite some external contacts (not present on the map) using one or more pieces of identifying information in field 208 (e.g., name, email phone).

Figure 2C:
FIG. 2C shows an exemplary user interface relating to a security and/or an automation system, in accordance with various aspects of this disclosure.

Referring now to FIG. 2C, an exemplary user interface 201-*c* for a street watch is described. In some examples, the user interface may be generated by the sensor linking module 415, among other components or elements. In some examples, the user interface describes a message thread of a member of a street watch group. This may be generated when a user selects a particular user as described with reference to FIG. 2B, among other actions. The user may view details about a member 212 of the street watch group. The selected member may have a message 214 sent or posted among other members of the street watch group. Other members of the street watch group may choose to reply to the message 214. For example, one or more members may reply to message 214 in a message thread 216. In some examples, the user may remove the selected user from his street watch group or flag that the posted message is not relevant using one or more selections within menu 218. For example, if the user observes that the selected member is posting too often or is acting in a certain way, then the user may either choose to remove the person from his street watch group or flag that the message is irrelevant. In another example, if the user observes that the selected member is requesting personal information, the user may flag that the selected member may be a exhibiting suspicious behavior. This suspicious behavior may be identified by comparing one user's behavior to another, analyzing the types of information being requested by this user over time, analyzing the information being requested pertains to one or more locations, object, or people, or some combination thereof.

Figure 2D:
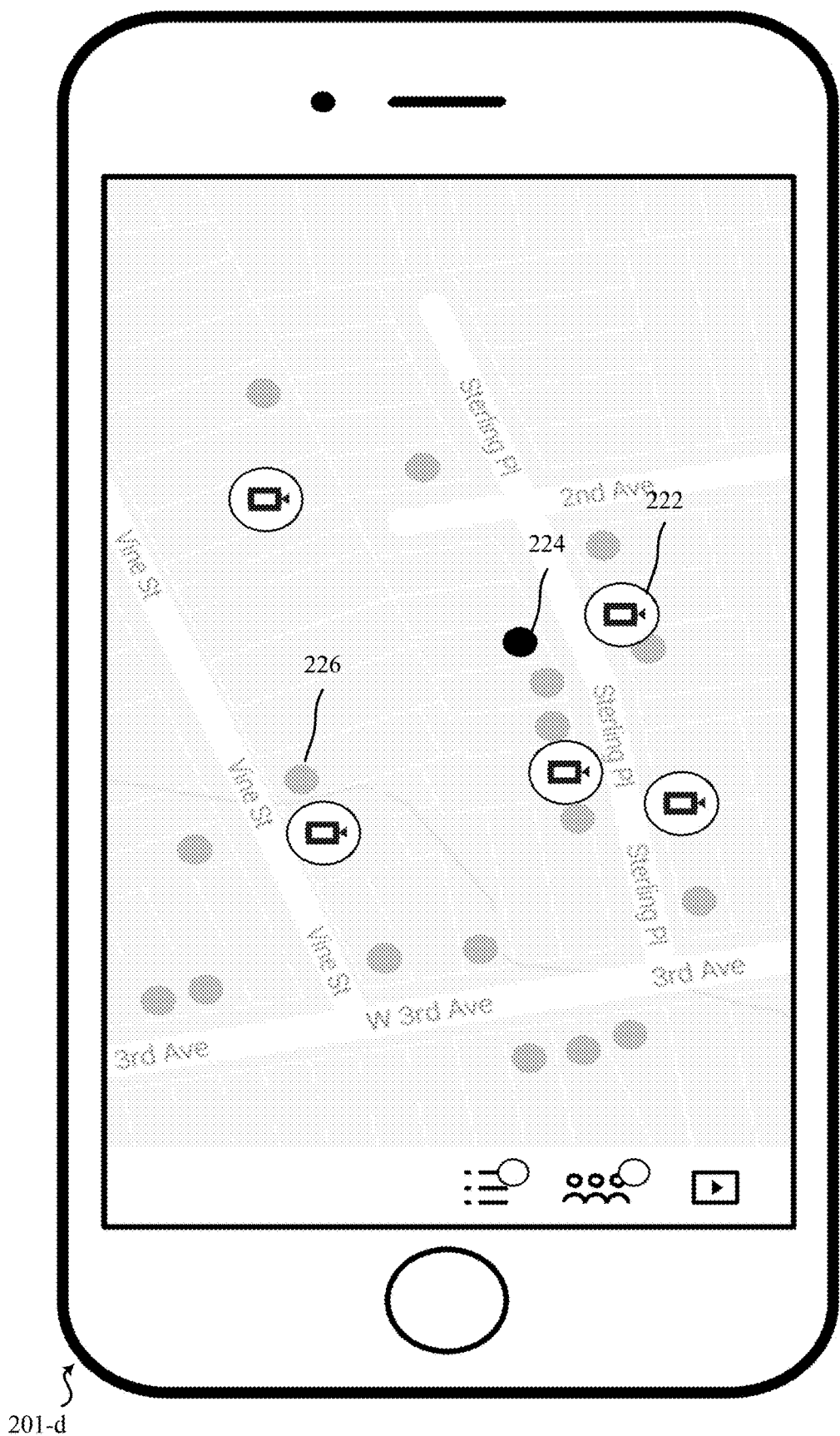
FIG. 2D shows an exemplary user interface relating to a security and/or an automation system, in accordance with various aspects of this disclosure.

Referring now to FIG. 2D, an exemplary user interface 201-*d* for a street watch is described. In some examples, the user interface may be generated by the sensor linking module 415, among other components or elements. The user interface described in FIG. 2D describes a map of an area related to a user of the street watch application. In some examples, this may be generated when a user is composing a request to access data (e.g., audio data, video data, other data, a combination of different data types) from one or more users or user devices. The dots and cameras represent users who are members of a street watch group. The camera icon 222 may indicate a neighbor who is a member of the user's street watch group and has shared (or agreed to share upon approval) data related to one or more outdoor cameras (e.g., doorbell cameras, front porch cameras, backyard cameras). The black dot 224 may indicate a neighbor who is part of the user's street watch group but has not shared their cameras (or do not have an outside camera available for sharing at the present time). The shaded dot 226 may indicate a neighbor who is not a member in the user's street watch group. The user may select one or more members each with one or more shared outdoor cameras for requesting data.

Figure 2E:
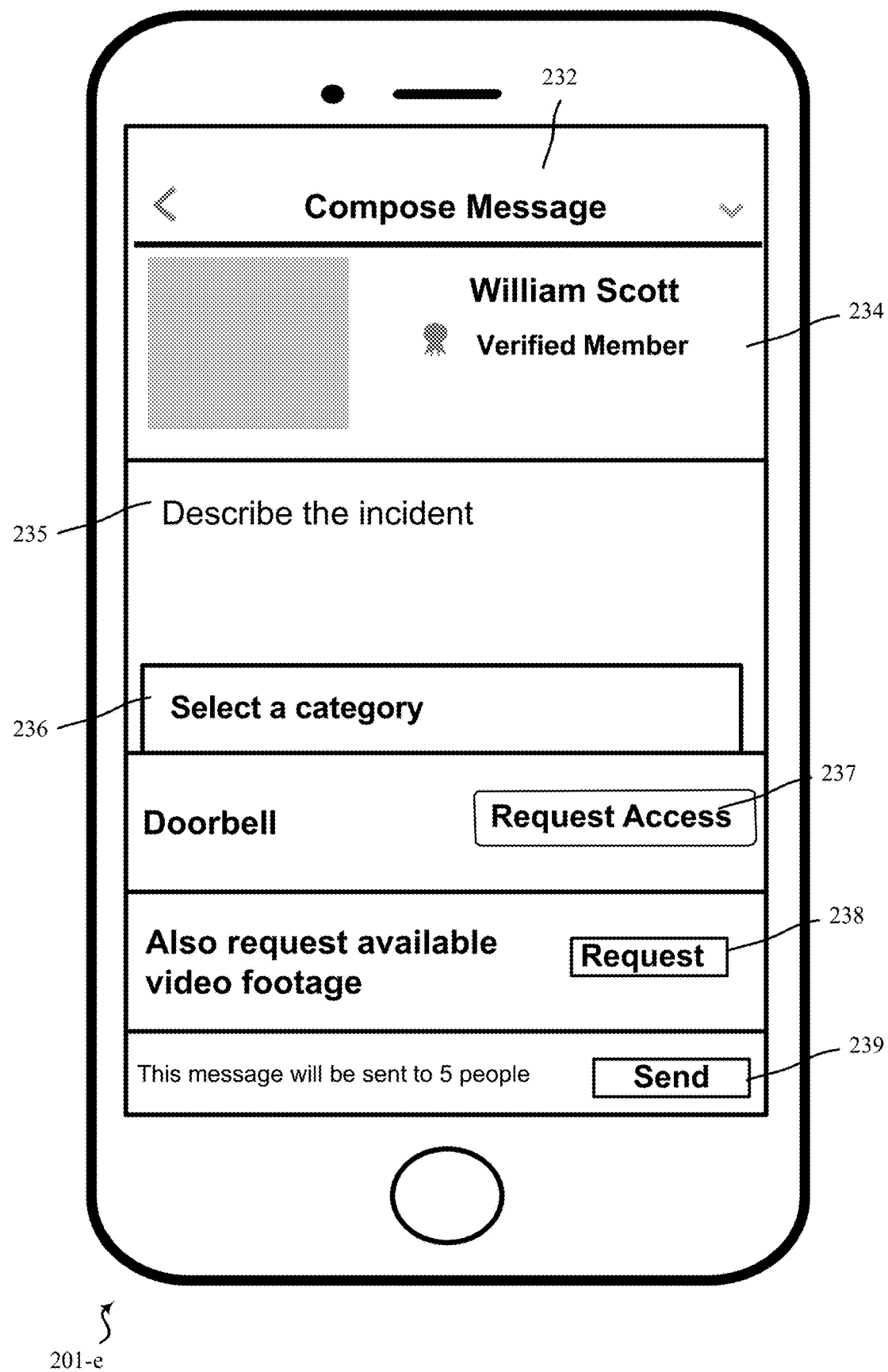
FIG. 2E shows an exemplary user interface relating to a security and/or an automation system, in accordance with various aspects of this disclosure.

Referring now to FIG. 2E, an exemplary user interface 201-*e* for a street watch is described. In some examples, the user interface may be generated by the sensor linking module 415, among other components or elements. The user interface may be generated in response to user input (e.g., a user's indication to compose a message). The window 232 for composing a request may include the details 234 (e.g., name, status, verification) of the requester (user composing the message). For example, the user interface may also indicate if the user composing the request, is a verified member of the street watch group. The window 232 for composing a request may also allow the user to describe 235 an incident related to the request (or include an inquiry related to the request), select a category 236 associated with the request, request access 237 to doorbell cameras and request additional video footage 238 using one or more commands associated with one or more elements or buttons (whether physical or digital). For example, the user may describe 235 an incident related to the request. The incident can be an inquiry related to an object or person or event. The user composing the request may additionally select a category associated with the request.

Figure 2F:
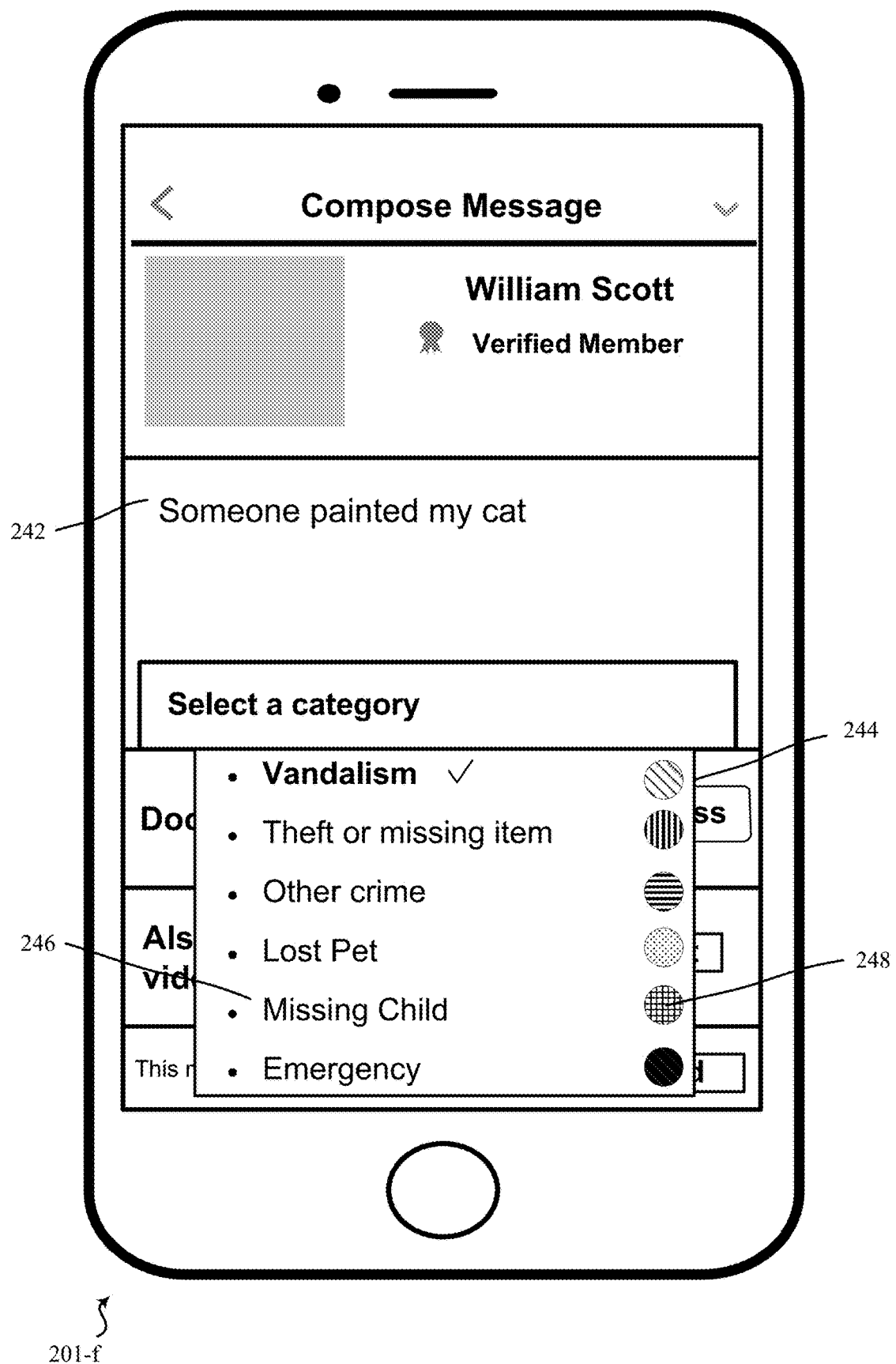
FIG. 2F shows an exemplary user interface relating to a security and/or an automation system, in accordance with various aspects of this disclosure.

Referring now to FIG. 2F, an exemplary user interface 201-*f* for a street watch is described. In some examples, the user interface may be generated by the sensor linking module 415, among other components or elements. The user interface may be generated in response to a user's indication to compose a message. The window for composing a request may include the name and details of the requester (user composing the message), a description 242 of an incident related to the request, and a category associated with the request. After the user composing the request, provides a description of the request, the user may be prompted by the sensor linking module 415 to select a category. Upon receiving user input for selecting a category, a list of categories 244 may be presented to the user. The list of category may include one or more phrases 246 describing a general category of the request. For example, the phrases can be vandalism, theft or missing item, other crime, lost pet, missing child and emergency. Additionally, the user interface may also include a visual representation 248 of each category that may be related to the request. The visual representation may include a color-coded representation, a patterned representation, a numerical representation, or any other visual representation that described a level associated with the urgency of each category.

Figure 2G:
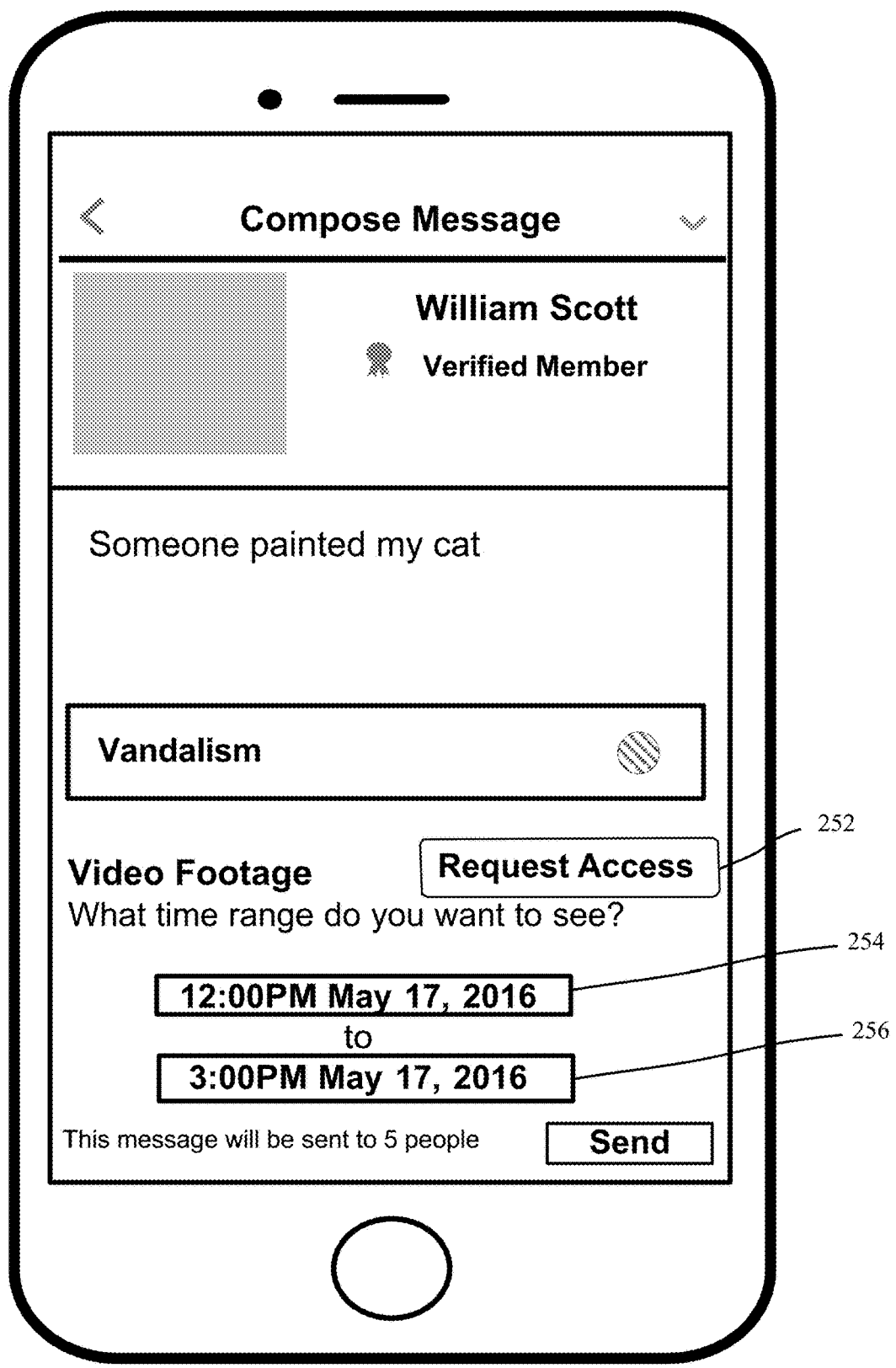
FIG. 2G shows an exemplary user interface relating to a security and/or an automation system, in accordance with various aspects of this disclosure.

Referring now to FIG. 2G, an exemplary user interface 201-g for a street watch is described. In some examples, the user interface may be generated by the sensor linking module 415, among other components or elements. The user interface may be generated in response to a user's indication to compose a message. The window for composing a request may include the name and details of the requester (user composing the message), a description of an incident related to the request, and a category associated with the request. After the user provides a description of the request and selects a category associated with the request, the user may be prompted to select a time range associated with the request. For example, the user may request data (e.g., video footage) from other members of the street watch group foo the selected time period. The user composing the request may select a start time 254 and an end time 256 for the requested data. According to the example of FIG. 2G, the user composing the request, may request video footage between 12:00 PM and 3:00 PM on May 17, 2016. After the time period selection, the user may request via element 252.

Figure 2H:
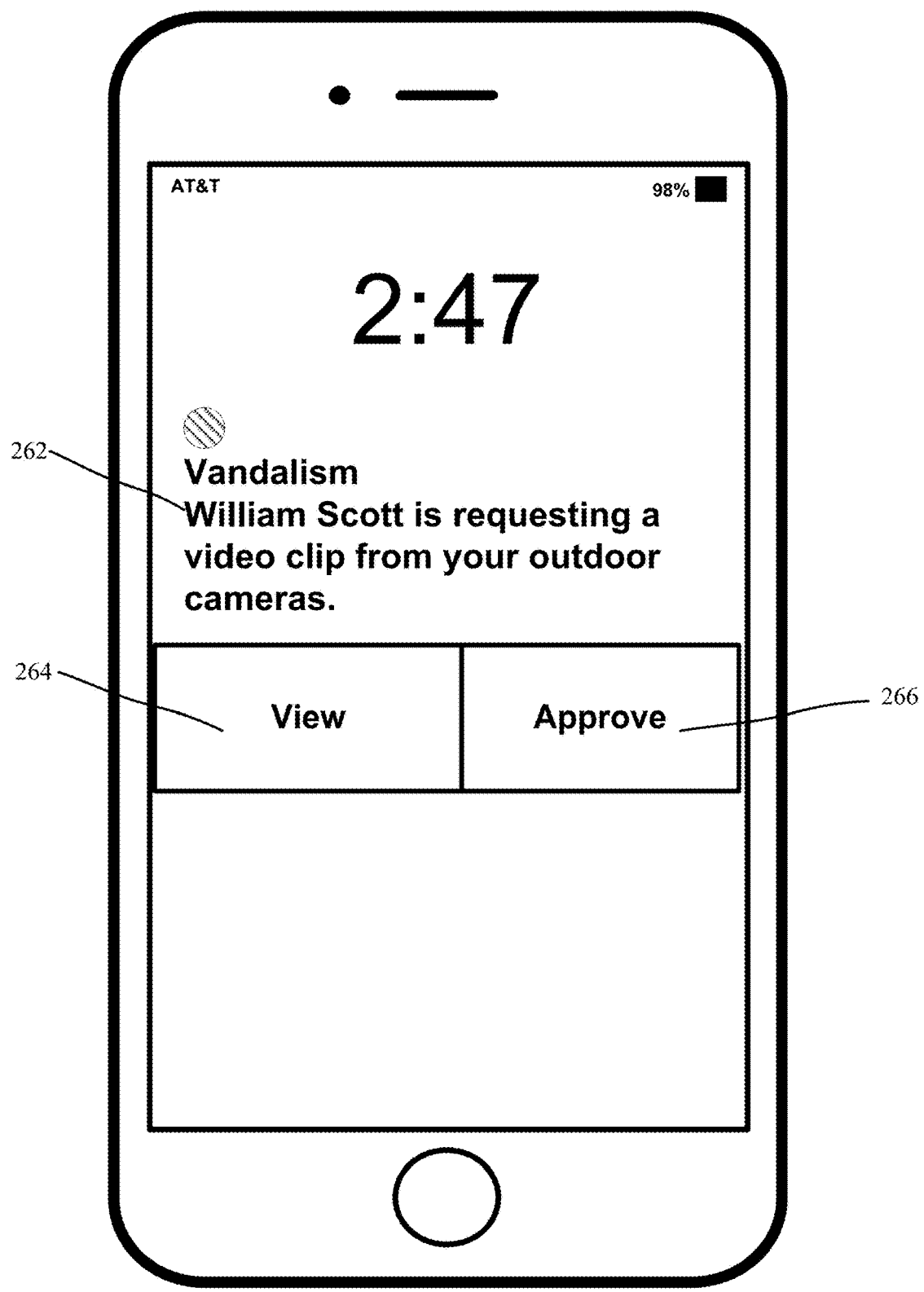
FIG. 2H shows an exemplary user interface relating to a security and/or an automation system, in accordance with various aspects of this disclosure.

Referring now to FIG. 2H, an exemplary user interface 201-h for a street watch is described. In some examples, the user interface may be generated by the sensor linking module 415, among other components or elements. The user interface may be generated at a receiver's user equipment (e.g., control panel, smart phone, tablet computer, wearable device) in response to receiving a request to access one or more pieces of data. The user interface described in FIG. 2H includes a notification 262 of the request message to the receiver. For example, the notification of the request message may include the sender's name, contents of the message, category associated with the message, and a visual representation of the category. The user interface may also indicate if the sender of the request is a verified member of the street watch. The user interface of the receiver includes an option for the receiver to view 264 the request or approve 266 the request. In some examples, the receiver may pre-approve requests from one or more users (e.g., a particular trusted neighbor). In that case, the receiver or receiving device may not be notified before sending the approval, which may be automatic. In some examples, the receiver may have pre-approval for categories satisfying or exceeding a threshold. For example, the receiver settings may indicate approval to send requested data (e.g., video footage) is not required from the receiver if the category associated with the request satisfies a threshold. In some examples, the pre-approval for categories may be based on one or more phrases, keywords, descriptions, or other information describing a general category of the request. For example, the phrases may include vandalism, theft or missing item, other crime, lost pet, missing child, help, injury, bleeding, blood, medical condition, and emergency. The receiver of the request may indicate approval to send the requested data (e.g., video footage) if the phrase describing the request indicates that the request is related to a missing child or an emergency. On the other hand, if the request indicates that the request is related to any other category (e.g., vandalism), then the receiver or receiving device may be notified before sending the approval. In some examples, the pre-approval for categories may be based on visual representations associated with the category of the request. For example, the visual representation may include a color-coded representation, a patterned representation, a numerical representation, or any other representation (e.g., a visual representation) that describes a level associated with the urgency of each category. The receiver of the request may indicate pre-approval for sending the requested data (e.g., video footage), if the visual representation associated with the request indicates satisfies a threshold. For example, the receiver settings may indicate that the requested data (e.g., audio/video footage) may be automatically transmitted to the requestor, if the visual representation of the category of the request indicates that the request is related to an emergency.

Figure 2I:
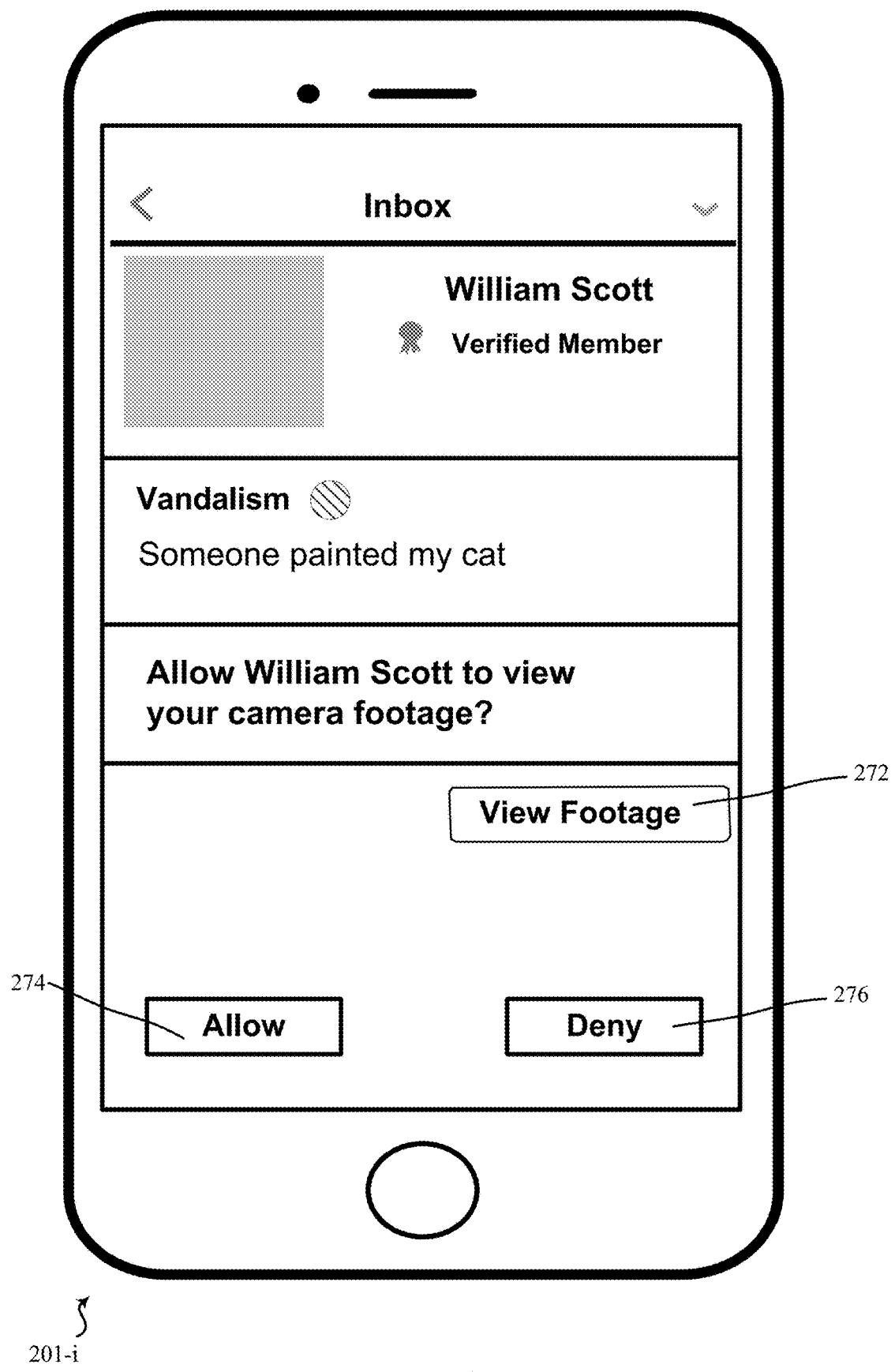
FIG. 2I shows an exemplary user interface relating to a security and/or an automation system, in accordance with various aspects of this disclosure.

Referring now to FIG. 2I, an exemplary user interface 201-i for a street watch is described. In some examples, the user interface may be generated by the sensor linking module 415, among other components or elements. The user interface may be generated in response to a user's indication to view a received request. The received request may be a request to access audio/video data from the receiver's camera for a specified time period. In some examples, the received request may be a request to access audio/video data from the receiver's camera without a specified time interval. The window for viewing a request may include the name and details of the requester (user composing the message), a description of an incident related to the request, a category associated with the request, and a visual identifier of the category, among other information. The receiver of the request may choose to allow 274 the sender to view the camera footage or deny 276 the sender to view the camera footage. Before transmitting the footage to the sender, the receiver of the request may view 272 the relevant camera footage.

Figure 2J:
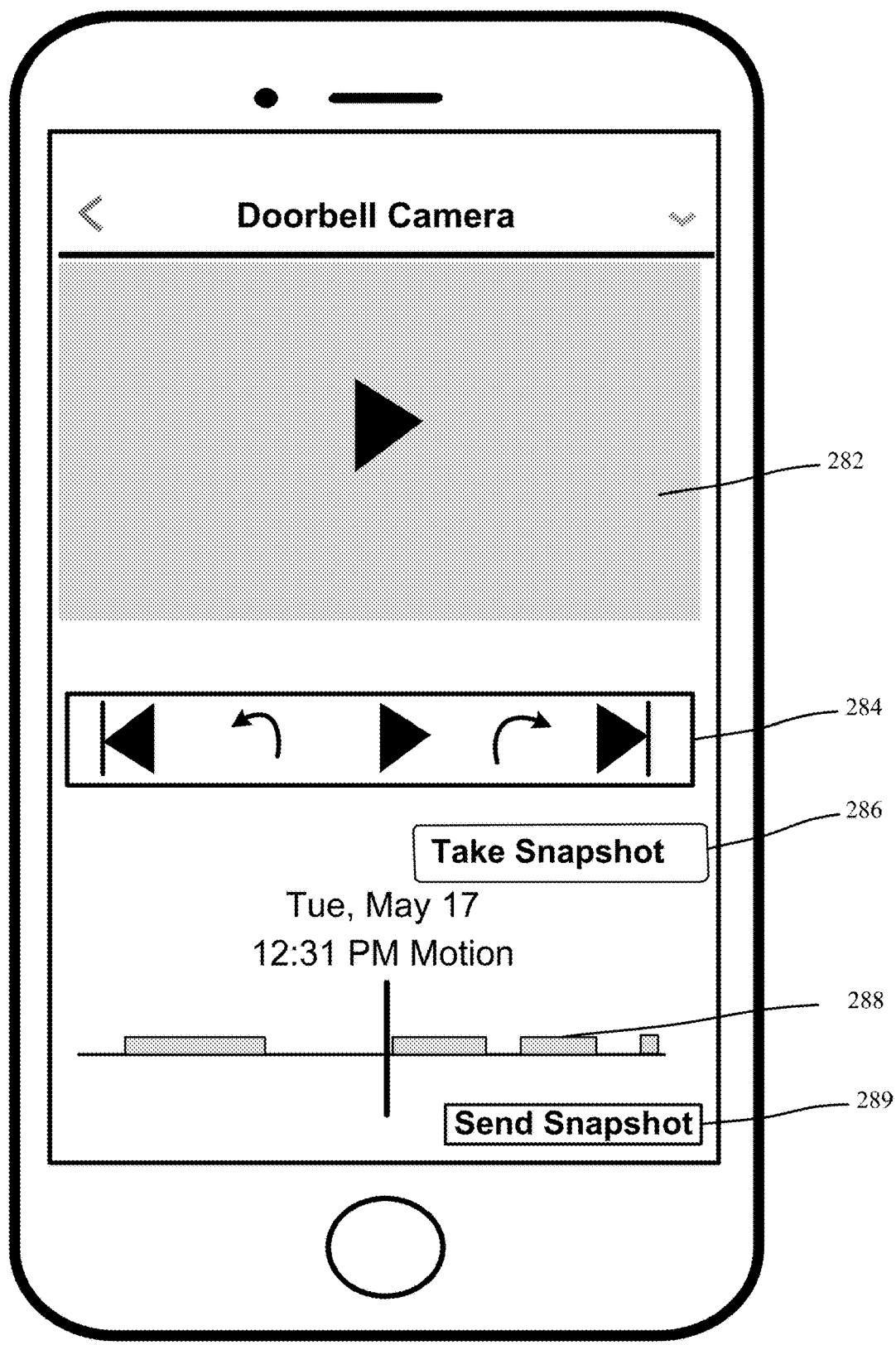
FIG. 2J shows an exemplary user interface relating to a security and/or an automation system, in accordance with various aspects of this disclosure.

Referring now to FIG. 2J, an exemplary user interface 201-j for a street watch is described. In some examples, the user interface may be generated by the sensor linking module 415, among other components or elements. The user interface may be generated in response to user input (e.g., a user's indication to view a camera footage) before sending the footage to the requester. The camera footage may be associated with or based on a received request. For example, a first member of a street watch group may compose a request to access camera footage from a second member of the street watch group. The recipient of the request may use the user interface to view the camera footage (e.g., audio/video footage) prior to transmitting the video to the requestor using one or more displays 282. The user interface for viewing the camera footage may also include one or more elements 284 to allow the viewer to pause, play, rewind and/or replay the same video, and/or also allow to skip a current video footage and view a subsequent video footage.

The user interface for viewing the camera footage may also allow the viewer to take snapshots while viewing the data via one or more elements 286 and, alternatively or additionally, provide a subset of the requested data in response to the request. For example, the viewer may take a snapshot from the data 282 (e.g., video and/or audio data) and may decide to send the snapshots to the requestor using one or more elements 289. In some examples, the user interface for viewing the camera footage may provide an indication that there may relevant footage outside the requested time period (e.g., before/after the requested time period). For example, the requestor may request for camera footage between 12:00 PM and 3:00 PM on May 17, 2016, as described with reference to FIG. 2G. The receiving device may determine that the request is an inquiry relating to a missing child (e.g., the inquiry may include that the child was 5 years of age, wearing a red sweater and black jeans). The receiver device may use facial recognition, among other techniques, to determine that the camera footage includes the missing child (i.e., description of the missing child in the inquiry matches the description of the child in the camera footage) at 11:00 AM on May 17, 2016 (i.e., prior to the requested time period).

In response to identifying information relevant to the inquiry in the request, the receiver device may provide an indication to the user of the receiver device, which may in some cases state that there may be relevant footage outside the requested time period. In some cases, the receiver device may seek approval from the user of the receiver device (via a device or otherwise) before transmitting the camera footage. On the other hand, in some examples, the receiver device may automatically transmit the relevant data to the requestor (based on pre-approval settings of the user). In some examples, the request may only include an inquiry related to a missing child and may not include the description associated with the missing child. The receiver device may query a database to determine a description of a child associated with the requestor (e.g., the database may include information about each family member of the requestor). Upon receiving the description, the receiver device may compare the description with the camera footage to determine if the camera footage includes data about the missing child associated with the requestor.

Figure 3A:
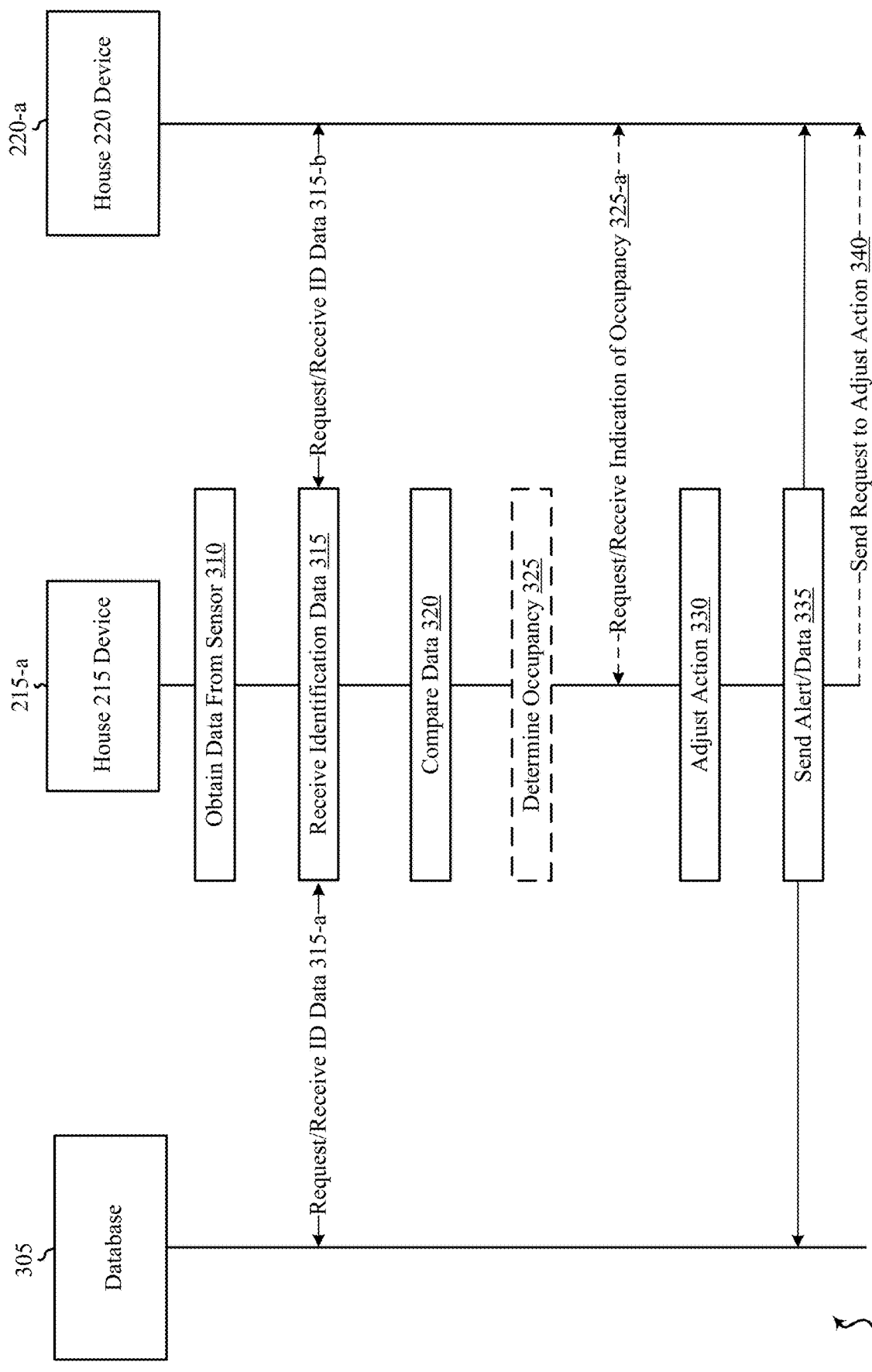
FIG. 3A shows a communication flow diagram between multiple devices relating to a security and/or an automation system, in accordance with various aspects of this disclosure.

In some examples, the receiver device may receive an inquiry and may transmit the inquiry to other devices that may be in network of the receiver device (e.g., same neighborhood watch group as the receiver device). For example, a second device in network of the receiver device may identify relevant footage (i.e., camera footage relevant to the received inquiry) and may transmit the footage to the receiver device. In some examples, the transmission of the camera footage (e.g., audio/video footage) from the second device to the receiver device may be based on user settings associated with the second device. Upon receiving relevant footage from the second device, the receiver device may transmit the footage to the requestor. In some examples, the receiver of the request may determine relevant portions of the data (e.g., video footage) and may only send a subset of those portions to the requestor. The user interface for viewing the camera footage may also allow the viewer to view a summary or a high-level representation of the data. The summary or high level representation may indicate portions 288 including important information (for example, when the camera detects human motion, identified color, identified object, other information, or some combination). In one example, the receiver of the request may also send the high level representation of the video to the requestor, FIG. 3A shows a communication flow diagram between multiple devices relating to a security and/or an automation system, in accordance with various aspects of this disclosure. In the example of FIG. 3A, house 215 and house 220 are located in the same neighborhood, and are located across the street from one another. Both house 215 and house 220 are associated with a networked group of devices that are in wireless communication with one another (e.g., as shown by the example area within dotted line 205 described with reference to FIG. 2). House 215 may be associated with a security camera, such as a doorbell camera, an external security camera, or other monitoring device 215-a. In some examples, device 215-a may comprise internal sensors; however, in other examples, device 215-a may be communicatively and/or electrically coupled to external sensors. Likewise, house 220 may be associated with a device 220-a. Devices 215-a and 220-a may be networked together in wireless communication—directly or indirectly. In addition, both or either of device 215-a and/or device 220-a may communicate with a local and/or remote database 305.

In one example, example, device 215-a is an external camera located at house 215. The device 215-a may have a wide field of view and is thus capable of capturing a wide area in front of and to the side of house 215, as well as across the streets and next door (e.g., the device 215-a may be configured to enable a 180+ degree view around the axis of the device lens). For example, in reference to FIG. 2A, device 215-a may have a full and/or partial view of at least some of the area in front of house 210, 230, 235, 240, 220, as well as the streets that intersect in the middle.

In addition, device 215-a is in communication with a control panel and/or database 305. Database 305 may be an example of a local database associated with house 215; for example, stored in memory on a control panel or other local computing device (e.g., smartphone, desktop at the location, a remote server or account associated with house 215). This local database may store information related to users associated with house 215 and each user's preferences. For example, there may be a father, mother, a daughter, a son, and a dog at house 215. The database may store identification information about each user, including the dog, as well as information about schedules, vehicles, preferences (e.g., lighting, sound, security levels). In addition, the database may store identification information about frequency and/or allowed and/or expected guests (e.g., extended family, friends, nanny, delivery people, neighbors). In another example, database 305 may be a database associated with house 220, thus, device 215-a may also be in communication with a database associated with house 220, where the house 220 database stores similar information about the users associated with house 220. In addition, houses 215 and 220 may have a shared database of similar information. In another example, database 305 may be a remote database or a third-party database which stores and shares information related to events and identification, such as a news source, law enforcement, missing persons databases, criminal databases, emergency alert systems, weather databases, and the like.

In one example, device 215-a obtains data from one or more sensors located at house 215 (block 310). In this example, the data obtained includes information indicating that the users of house 215 are scheduled to be out of the house based on their stored schedules (e.g., schedule information, activity information), the dog out with the dog walker (e.g., location information), a video of a woman approximately 5' 11" tall, dressed in black, and with blonde hair (e.g., physical characteristics, identification information), the device has obtained the sound of glass breaking near the living room (e.g., interior environment information), and a blue car drove by slowly five minutes before the sound of glass breaking (e.g., exterior environment information).

At block 315, device 215-a receives identification information from at least one of a plurality of sources. The sources may be a database associated with house 215, a database associated with house 220, or a remote database 305. The device 215-a queries a local database associated with device 215-a (i.e., associated with house 215) and determines that none of the allowed and/or expected users associated with house 215 are tall women with blonde hair. The device may also request data (at block 315-b) from the database associated with house 220-a, as well as a shared database, and determine that none of the allowed and/or expected and/or expected visitors are tall women with blonde hair. In addition, none of the associated databases indicate that any of the associated users have a blue car. The device 215-*a* may request data (at block 315-*a*) from a remote database 305. In some examples, the remote database may automatically send out an alert and/or data to all devices enabled to receive identification and/or event data. The remote database may provide the device 215-*a* with a news report related to a series of burglaries that have occurred within 15 miles of house 215. In addition, the police have published a picture and description of the suspect: a tall woman with blonde hair. Device 215-*a* compares the data obtained from the sensor in block 310 to the identification data in block 315, and determine that the event occurring at house 215 is likely a burglary being committed by the suspect-at-large.

Device 215-*a* may also determine whether anyone (allowed and/or expected) is home. Determining occupancy may be performed using sensors inside and/or outside of the home that detect the presence of and identify who is located at the house. Based on whether someone is home or not, and/or based on a user preference or system settings, device 215-*a* may adjust an action (at block 330). If someone is determined to be home, the action may be different than if no one is determined to be home; for example, if someone is home, the device 215-*a* may only initiate a loud alarm to warn a user that someone unexpected or not allowed is in the home, but may not lock the doors in case the user needs to get away from the intruder. If no one is home, the device 215-*a* may increase the security settings, lock doors to hinder escape, alert the police, sound an alarm to scare the intruder, turn the sprinklers on to make identifying the intruder easier, etc.

In another example embodiment, house 215 may be occupied by a single man who is suspicious of any amount of detected activity or unknown visitors. The man has programmed his security systems and sensors to determine that any person and/or any vehicle which comes within a predetermined distance of his house is of the highest threat. The man at house 215 desires to be notified of every movement and every noise that is detected by device 215-*a*. In addition, the man desires to be notified of all people coming and going at his nearby neighbors houses, and he wants to be notified of all cars driving by that do not explicitly belong to someone in the neighborhood. The man's neighbors, however, do not want to receive every single alert and action transmitted from device 215-*a*, lest they be inundated with alerts and security action adjustment requests.

Thus, for example, the users at house 220 have set their system to receive all alerts and requests from devices at houses 225, 235, 240 and 245 as described in the previous example. With regard to alerts from house 215, the users at house 220 have programmed their system to only receive alerts and requests from house 215 if the device 220-*a* receives the alert and/or data and determines that the threat level, alert, and/or request satisfies a predetermined threshold. For example, device 220-*a* may transmit an alert or take an action if the data and/or request received from device 215-*a* is indicative of a crime, but device 220-*a* may disregard an alert received from device 215-*a* if device 220-*a* determines the alert is related only to a person walking through the neighborhood that is unlikely to pose a threat. Alternatively, device 220-*a* may transmit an alert or take an action if the data and/or request received from device 215-*a* is indicative of security alert (e.g., a security status change, an arm or disarm event), but may not transmit an alert or take action based only on sensor data alone. It should be understood that these are merely examples, and any security action may be contemplated.

In some examples, the actions may include predetermined settings based on the identification and/or the event. In other examples, the action may be programmed by or based on feedback or information relating to at least one of the users at house 215 and/or agreed upon by the networked group of users. For example, the networked group of users may collectively, separately, or each individually set a series of "threat levels," where each determined event is assigned to trigger or initiate a threat level with corresponding actions. A low threat level may correspond to an allowed and/or expected guest arriving at the house or an expected delivery of a package, whereas a high threat level may be associated with identifying a prowler, a security alarm state change, or sounds associated with a crime or dangerous situation (e.g., glass breaking, tires squealing). In some cases, a threat level of a first home may be based on or the same as a threat level at a second home. For example, a group of devices within a predetermined proximity may elect or be automatically configured so that if a first home enters a first threat level based on sensor data or a user-initiated action, at least some or all of the devices in the group may also enter the same threat level or an elevated threat level based at least in part on the threat level of the first home. This elevated threat level may trigger specified actions based on specified inputs and may be essentially more sensitive than a lower threat level (i.e., requiring less unrecognized or abnormal input to trigger an alert or an event as compared to a lower threat level).

In another example, the device 215-*a* may send an alert to a user that something is happening at the house. The alert may include information related to the data obtained from the sensor and/or the identification data. Thus the device 215-*a* may wait to take an action, or take a specific action, based on the user's response to the alert. In the meantime, the device 215-*a* may increase the frequency of obtaining data in case more data is needed for a decision or for future reference.

In another example, the device 215-*a* may send an alert and/or data (at block 355) to device 220-*a* to alert the users at house 220 that a burglary is occurring within a proximity (e.g., across the street, at house 215-*a*). Based on this information, the device 220-*a* may obtain sensor data, may receive identification data, may adjust actions, and/or may send alerts and data itself. In other examples, device 215-*a* may send a request to device 220-*a* to determine if anyone is home at house 220. Based on whether someone is home at house 220 or not, and based on comparing the data (at block 320), device 215-*a* may send a request to device 220-*a* to initiate a security action (at block 340), such as turning on a security camera at house 220 which has a view of house 215 across the street.

In another example, device 215-*a* may obtain data from a sensor, such as data relating to or showing cars passing by, people walking by, two cars associated with the house leaving the garage, etc. Device 215-*a* may also receive identification data related to people, vehicles, and cars associated with the neighborhood and/or networked devices. At some point, device 215-*a* may receive an alert from device 220-*a* that the daughter that lives in house 220 is not at home and she is expected to be home. Device 220-*a* may have adjusted security actions at house 220, and has sent a request to device 215-*a* to adjust security actions, such as increasing the frequency of capturing audio and video around the house, or querying other devices or databases for information related to the missing daughter. In some examples, this may allow a user associated with device 220-*a* to have a better chance of locating the daughter based on the additional querying and searching. In some examples, the databases or the information sources associated with device 215-*a* may be at least partially different from the databases or the information sources associated with device 220-*a*. Thus, by requesting that device 215-*a* initiate one or more actions, additional information can be gathered, compared, and evaluated within a predetermined period of time (e.g., less than one minute).

However, earlier, device 215-*a* obtained data that indicated the daughter was riding her bike down the street, and in fact, at the current time (or a past time), device 215-*a* is obtaining data indicating someone matching the daughter's description is located in the front yard of house 230. Thus, device 215-*a* sends an alert to device 220-*a* that the daughter is likely located at house 230, and thus does not adjust the security actions at house 215 based on the received data.

Figure 3B:
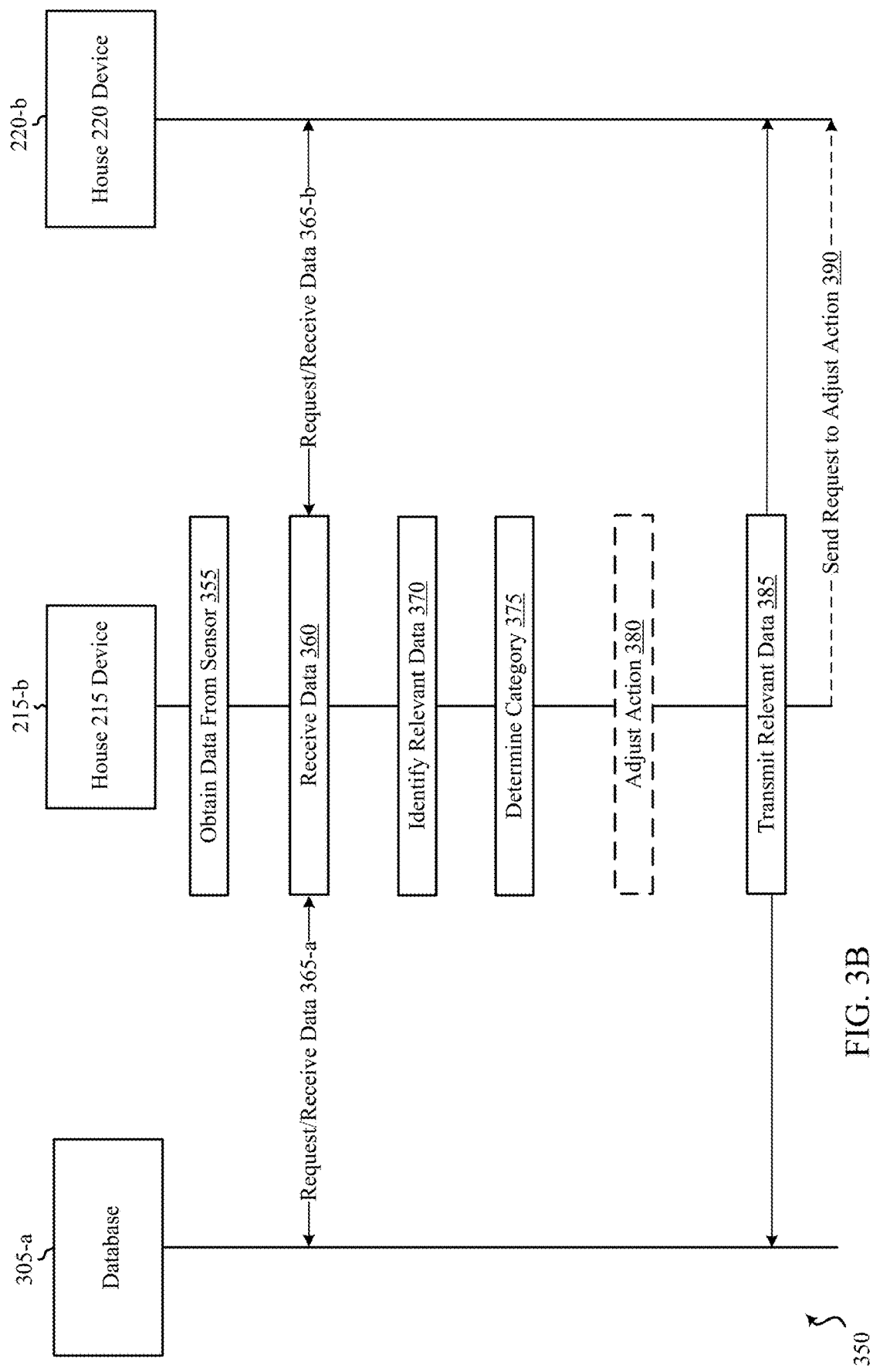
FIG. 3B shows a communication flow diagram between multiple devices relating to a security and/or an automation system, in accordance with various aspects of this disclosure.

FIG. 3B shows a communication flow diagram between multiple devices relating to a security and/or an automation system, in accordance with various aspects of this disclosure. In the example of FIG. 3B, house 215 and house 220 are located in the same neighborhood. In some examples, house 215 and house 220 are across the street from each other. In some embodiments, both house 215 and house 220 are associated with a networked group of devices that are in wireless communication with one another (e.g., as described with reference to FIG. 2). House 215 may be associated with a security camera, such as a doorbell camera, an external security camera, or other monitoring device 215-*b*. In some examples, device 215-*b* may comprise internal sensors; in other examples, device 215-*b* may additionally or alternatively be communicatively and/or electrically coupled to external sensors. Likewise, house 220 may be associated with a device 220-*b*. Device 215-*b* and device 220-*b* may be networked together in wireless communication—directly or indirectly. In addition, both or either of device 215-*b* and/or device 220-*b* may communicate with a local and/or remote database 305-*a*, among other devices.

In some examples, device 215-*b* is an external camera located at house 215. The device 215-*b* may have a wide field of view (e.g., the device 215-*b* may be configured to enable a 180+ degree view around the axis of the device lens) and is thus capable of capturing a wide area in front of and to the side of house 215, as well as across the streets and next door. For example, in reference to FIG. 2B, device 215-*b* may have a full and/or partial view of at least some of the area in front of house 210, 230, 235, 240, 220, as well as the streets that intersect in the middle. In some examples, the device 215-*b* may be an external camera located at the backyard of house 215. In one example, device 220-*b* is an external camera located at house 220. The device 220-*b* may have a full and/or partial view of at least some of the area in front of house 210, 230, 235, 240, 220, as well as the streets that intersect in the middle. In some examples, the device 220-*b* may be an external camera located at the backyard of house 220. In some examples, the device 220-*b* may be coupled to a user device 120. For example, a user may request a video footage from device 215-*b* using or through device 220-*b*. In some examples, other devices could request a video footage (e.g., control panel at requestor location, one or more smartphones associated with the requestor, desktop at a location of the requestor, desktop at a location remote from the requestor, laptop at a location of the requestor, laptop at a location remote from the requestor tablet, etc.). In some examples, a user of device 220-*b* may indicate a time period associated with the requested video footage (i.e. the user may identify the time period in the request and may request for the data (e.g., video footage) during that time period), In addition, in some embodiments, device 215-*b* is in communication with a control panel located at one or more structures and/or database 305-*a*. Database 305-*a* may be an example of a local database associated with house 215; for example, stored in memory on a control panel or other local computing device (e.g., smartphone, desktop at the location, a stand-alone storage device or hard drive, a remote server or account associated with house 215). This local database 305-*a* may be configured to store information related to users associated with houses in a neighborhood (e.g., house 215 and house 220). For example, there may be a father, mother, a daughter, a son, and a dog associated with a house (e.g., house 215). The database 305-*a* may store identification information about each user, including the dog, as well as information about schedules, vehicles, preferences (e.g., lighting, sound, security levels), among other information. In addition, the database 305-*a* may store audio/video data from devices associated with the houses (device 215-*b* and device 220-*b*). For example, the device 215-*b*, may be configured to capture audio/video data in response to detecting motion and store the captured audio/video data in database 305-*b*. In some examples, a user associated with the device 215-*b* may configure the device 215-*b* to capture audio/video data based on one or more user preferences. In some examples, the user associated with the device 215-*b* could enter the preferences through a control panel at user location, one or more smartphones associated with the user, desktop at a location of the user, desktop at a location remote from the user, laptop at a location of the user, laptop at a location remote from the user tablet, etc.

In some examples, the device 215-*b*, may be configured to capture audio/video data in response to receiving a request from device 220-*b*, and may store the request and the data in database 305-*a*. In some examples, the device 220-*b*, may be configured to capture audio/video data in response to receiving a request from device 215-*b*, and may store the request and the data in database 305-*a*. In addition, the database 305-*a* may store identification information about frequency and/or allowed and/or expected guests (e.g., extended family, friends, nanny, delivery people, neighbors). In some examples, the database may be configured to store identification data of neighbors of house 215 and house 220. In another example, database 305-*a* may be a database associated with house 220, thus, device 215-*b* may also be in communication with a database 305-*a* associated with house 220, where the house 220 database stores similar information about the users associated with house 220. In addition, houses 215 and 220 may have a shared database of similar information. In another example, database 305-*a* may be a remote database or a third-party database which stores and shares information related to events and identification, such as a news source, law enforcement, missing persons databases, criminal databases, emergency alert systems, weather databases, and the like.

In one example, device 215-*b* obtains data from one or more sensors located at house 215 (block 355). In this example, the data obtained may include information indicating that the users of house 215 are scheduled to be out of the house based on their stored schedules (e.g., schedule information, activity information), the dog is not at the home and is out with the dog walker (e.g., location information), a video of a child approximately 4' 4" tall, dressed in a red coat, and with brown hair and blue eyes (e.g., physical characteristics, identification information), and a child is riding a bike in the street in front of the house (e.g., exterior environment information), some combination, or other information. In some examples, device 220-*b* obtains data from one or more sensors located at house 220 (not shown). In some examples, a device 215-*b* may receive instructions to obtain sensor data from a control panel at a location of device 215-*b*, a control panel remote from device 215-*b*, one or more smartphones associated with a user of device 215-*b*, a desktop at a location of the user of device 215-*b*, desktop at a location remote from device 215-*b*, a laptop, a tablet, etc. In some examples, a device 220-*b* may receive instructions to obtain sensor data from a control panel at a location of device 220-*b*, a control panel remote from device 220-*b*, one or more smartphones associated with a user of device 220-*b*, a desktop at a location of the user of device 220-*b*, desktop at a location remote from device 220-*b*, a laptop, a tablet, etc. Although the present disclosure describes various examples, other examples and embodiments are contemplated and the present disclosure is not limited by these examples.

At block 360, device 215-*b* receives request from at least one of a plurality of sources. The sources may include a database associated with house 215, a database associated with house 220, a remote database 305, some combination, or other sources. Although it is shown that device 215-*b* receives the request, in some examples, device 220-*b* receives the request from at least one of a plurality of sources, the plurality of sources including a database associated with house 215, a database associated with house 220, a remote database 305, some combination, or other sources. In some examples, the device 215-*b* receive the request at a control panel at a location of the device 215-*b*, one or more smartphones associated with the user of the device 215-*b*, desktop at a location of the device 215-*b*, desktop at a location remote from the device 215-*b*, a laptop, a tablet, etc. The device 215-*b* queries a local database associated with device 215-*b* (i.e., associated with house 215) and determines whether a child approximately 4' 4" tall, dressed in a red coat, and with brown hair and blue eyes (or a subset of these or other characteristics or related features) was seen near the house. The device may also request data (at block 315-*b*) from the database associated with other houses, as well as a shared database, and determine whether any the cameras (or other devices, such as sensors) of any of the other houses have spotted the child approximately 4' 4" tall, dressed in a red coat, and with brown hair and blue eyes. The device 215-*b* may request data (at block 315-*a*) from a remote database 305. In some examples, the remote database may automatically send out an alert and/or data to all devices enabled to receive identification and/or event data. The remote database may provide the device 215-*b* with additional information (e.g., news report) related to a series of kidnapping that have occurred in the community or within a predetermined distance of house 215.

At block 370, in some examples, device 215-*b* identifies or determines relevant data from the received data. The sources for the data received by device 215-*b* may include a database associated with house 215, a database associated with house 220, a remote database 305, a combination thereof, or one or more other sources. Although it is shown that device 215-*b* identifies or determines relevant data from the received data, in some examples, device 220-*b* may be configured to identify or determine relevant data from the received data, upon receiving a request for data from device 215-*b*. In some examples, the device 215-*b* identifies or determines relevant data at a one or more cameras (or other devices such as motion sensor, fire sensor, glass break sensor, earthquake sensor, etc.), at the control panel at a location of the device 215-*b*, one or more smartphones associated with the user of the device 215-*b*, desktop at a location of the device 215-*b*, desktop at a location remote from the device 215-*b*, a laptop, a tablet, etc. In one example, the device 215-*b* queries a local database associated with device 215-*b* (i.e., associated with house 215) and determines that a child approximately 4' 4" tall, dressed in a red coat, and with brown hair and blue eyes was seen near a particular house in the neighborhood and may, in some cases, note a time when the child having at least some similar characteristics was captured by the device 215-*b*. Device 215-*b* may also determine whether the child was seen anywhere within a specified geographic area (e.g., based on the devices included in the street watch group, within a radius or a distance of one or more locations (e.g., a location of device 215-*b*, a location of the last location where the child was captured on camera or detected, a location associated with the child such as his home), some combination, or other information. If the child was spotted at multiple places at the same, a similar time, within a time period, etc., then it is likely that the recognition data is not relevant. In one example, the device 215-*b* queries a local database associated with other devices (i.e., devices associated with houses in the same neighborhood watch group as house 215) and determines that a child approximately 4' 4" tall, dressed in a red coat, and with brown hair and blue eyes was seen near a particular house in the neighborhood. In some examples, the neighborhood watch group associated with house 215 may be different from the neighborhood watch group associated with house 220. The device 215-*b* may be configured to query devices associated with both neighborhood watch groups.

At block 375, device 215-*b* determines a category associated with the received request. In some examples, the category may include vandalism, theft, lost pet, missing child, other crimes, and emergency, among other examples. In some examples, one or more categories may be conveyed by or may include a visual representation of the category. For example, the category may be green for vandalism, blue for theft, yellow for other crimes, pink for lost pet, red for missing child missing child, and orange for emergency. In one example, the device 215-*b* queries a local database associated with device 215-*b* (i.e., associated with house 215) and determines a ranking associated with the categories. Device 215-*b* may also determine whether the category included in the request is associated with a visual representation. Although it is shown that device 215-*b* determines a category associated with the received request, in some examples, device 220-*b* may be configured to determine a category associated with the received request, upon receiving a request for data from device 215-*b*.

At block 380, the device 215-*b* may adjust an action. Although it is shown that device 220-*b* adjusts an action, in some examples, device 220-*b* may be configured to adjust an action, upon receiving a request for data from device 215-*b*. In some examples, the device 215-*b* determine the action at a control panel at a location of the device 215-*b*, one or more smartphones associated with the user of the device 215-*b*, desktop at a location of the device 215-*b*, desktop at a location remote from the device 215-*b*, a laptop, a tablet, etc. If the device 215-*b* queries a local database associated with device 215-*b* (i.e., associated with house 215) and determines that the data associated with the device 215-*b* includes camera footage of a child approximately 4' 4" tall, dressed in a red coat, and with brown hair and blue eyes, then the device 215-*b* may transmit the relevant data to device 220-*b* (at block 385).

In an example, device 220-*b* may transmit the relevant data if the data received from device 215-*b* is identified as being indicative of a crime, but device 220-*b* may disregard an alert if the data from device 215-*b* is related only to a person walking through the neighborhood that is not identified as a threat. For example, device 215-*b* may categorize data as indicative of a crime if the data (e.g., video footage) includes footage that can be categorized as a threat. For example, the device 215-*b* may categorize the data as a crime based on objects (e.g., gun, knife), clothing item (e.g., masks) or people (e.g., recognized as a criminal) identified in the footage. A person walking down the street with a mask on, or a person walking down the street holding a knife, may be classified as data indicative of threat. In some examples, the device 215-*b* may receive sounds related to tires screeching near house 220-*b* during afternoon. The schedule preference for house 220-*b* may indicate that no member is scheduled to be home at that time of the day. Device 215-*b* may further capture video footage of people wearing masks coming out of the car and may conclude that these footages indicate a burglary. Alternatively, in some examples, device 220-*b* may transmit an alert or take an action if the data and/or request received from device 215-*b* is identified as being indicative of a security alert (e.g., a security status change, an arm or disarm event), but may not transmit an alert or take action if the data received from device 215-*b* is not related to or correlated to the request 365-*b* received from device 220-*b*. It should be understood that these are merely examples, and any security action may be contemplated. In some examples, the device 215-*b* may send a request to device 220-*b* to initiate a security action (at block 390), such as turning on a security camera at house 220 which has a view of house 215 across the street.

In some examples, the actions may be based on predetermined user settings. For example, the device 215-*b* may take an a security action based on the determined category. In some examples, the device 215-*b* may receive the user preferences from a user at a control panel at a location of the device 215-*b*, one or more smartphones associated with the user of the device 215-*b*, desktop at a location of the device 215-*b*, desktop at a location remote from the device 215-*b*, a laptop, a tablet, etc. In other examples, the action may be programmed by or based on feedback or information relating to at least one of the users at house 215, house 220 and/or agreed upon by the networked group of users.

In another example, the device 215-*b* may send an alert to a user that indicates that the device 215-*b* has retrieved data relevant to the received request. The alert may include information related to the data obtained from the sensor and/or the identification data. Thus the device 215-*b* may wait to take an action, or take a specific action, based on the user's response to the alert. In the meantime, the device 215-*b* may increase the frequency of obtaining data in case more data is needed for a decision or for future reference. For example, the device 215-*b* may automatically capture screenshots every motion is detected by device 215-*b*, a sensor, or another device (or when a device receives data from any other sensor at house 215). In some other examples, the device 215-*b* may capture video footage from a camera upon detecting motion and may continue capturing the video for a threshold time period, after the motion has ceased to occur.

Additionally or alternatively, other devices could perform some or all of the functionalities described above with reference to FIG. 3B. For example, a control panel at requestor location, a control panel at location associated with the receiver of the request, one or more smartphones associated with the requestor, one or more smartphones associated with the receiver, a desktop associated with the requestor, a desktop associated with the receiver, a laptop associated with the requestor, a laptop associated with the receiver, a tablet associated with the requestor, a tablet associated with the receiver, a smartwatch associated with the requestor, a smartwatch associated with the receiver etc.

Figure 3C:
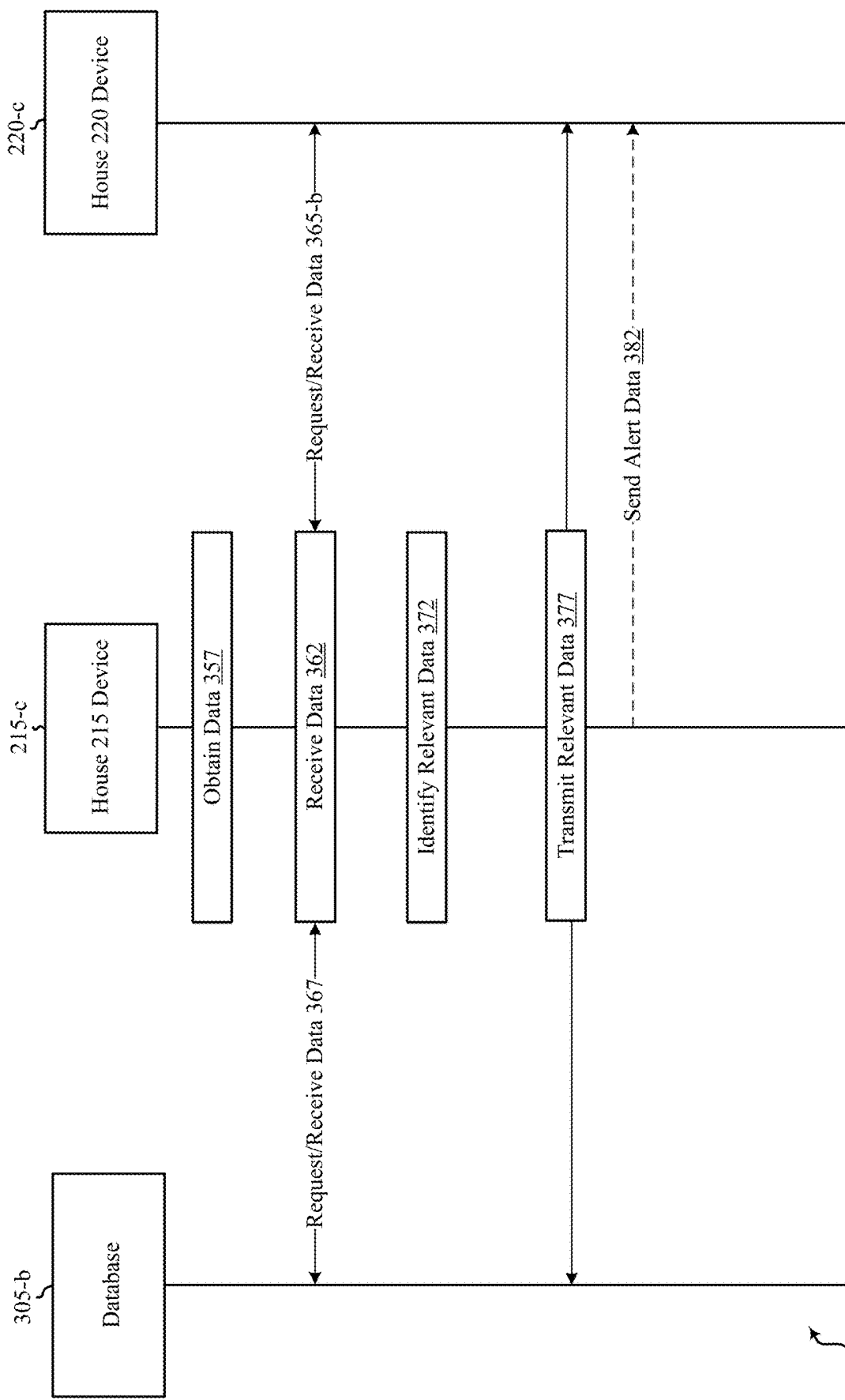
FIG. 3C shows a communication flow diagram between multiple devices relating to a security and/or an automation system, in accordance with various aspects of this disclosure.

FIG. 3C shows a communication flow diagram between devices relating to a security and/or an automation system, in accordance with various aspects of this disclosure. In the example of FIG. 3C, house 215 and house 220 are located in the same neighborhood. In some examples, house 215 and house 220 are across the street from each other. In some examples, house 215 and house 220 are located within a threshold boundary or distance from each other. In one example, house 215 and house 220 are located within an approximate distance from each other. In some embodiments, both house 215 and house 220 are associated with a networked group of devices that are in wireless communication with one another (e.g., as described with reference to FIG. 2). House 215 may be associated with a mobile camera device (e.g., a drone), a security camera such as a doorbell camera, an external security camera, or other monitoring device 215-*c*. In some examples, device 215-*c* may comprise internal sensors; in other examples, device 215-*c* may additionally or alternatively include or be communicatively and/or electrically coupled with external sensors. Likewise, house 220 may be associated with a device 220-*c*. Device 215-*c* and device 220-*c* may be networked together in wireless communication—directly or indirectly. In addition, both or either of device 215-*c* and/or device 220-*c* may communicate with a local and/or remote database 305-*b*, among other devices.

In some examples, device 215-*c* is a mobile camera device such as a drone. The mobile camera device may be located at house 215. For example, the drone may perch on the roof of house 215. The device 215-*c* (mobile camera device) may have a wide field of view (e.g., the device 215-*c* may be configured to enable a 180+ degree view around the axis of the device lens) and is thus capable of capturing a wide area. In some examples, the device 215-*c* may be configured to fly within a threshold distance and capture audio/video footage. In some cases, the device 215-*c* may be configured to live stream or send recorded video footage to a user's smartphone application. In some examples, device 215-*c* is an external camera located at house 215. The device 215-*c* may have a wide field of view (e.g., the device 215-*c* may be configured to enable a 180+ degree view around the axis of the device lens) and is thus capable of capturing a wide area in front of and to the side of house 215, as well as across the streets and next door. For example, in reference to FIG. 2A, upon receiving a request, device 215-*c* may be configured to leave house 215 and fly to house 245. In some cases, device 215-*c* may choose the shortest possible route to house 245. In some other examples, device 215-*c* may receive a route from another device (control panel) of house 215. While flying to house 245, device 215-*c* may have a full and/or partial view of at least some of the area in front of house 220, 225, 235 and 240, as well as the streets that intersect in the middle. In some examples, the device 215-*c* may be an external camera located at the backyard of house 215. In one example, device 220-*c* is an external camera located at house 220. In one example, device 220-*c* is a mobile camera device associated with house 220.

In some examples, the device 220-c may be coupled to a user device 120. For example, a user may request a video footage from device 215-c using or through device 220-c (not shown). In some examples, other devices could request a video footage (e.g., control panel at requestor location, one or more smartphones associated with the requestor, desktop at a location of the requestor, desktop at a location remote from the requestor, laptop at a location of the requestor, laptop at a location remote from the requestor tablet,). In some examples, a user of device 220-c may indicate a time period associated with the requested video footage (i.e., the user may identify the time period in the request and may request for the data (e.g., video footage) during that time period). In some examples, a user of device 220-c may request for information associated with a person (e.g., missing child) and/or an object (e.g., missing vehicle).

In addition, in some embodiments, device 215-c is in communication with a control panel located at one or more structures and/or database 305-b. Database 305-b may be an example of a local database associated with house 215; for example, stored in memory on a control panel or other local computing device (e.g., smartphone, desktop at the location, a stand-alone storage device or hard drive, a remote server or account associated with house 215). In some examples, the database 305-b may be associated with both house 215 and house 220. This local database 305-b may be configured to store information related to users associated with houses in a neighborhood (e.g., house 215 and house 220). For example, the information may include identification information of occupants living in a house (e.g., house 215 or house 220). The database 305-b may store information about schedules (e.g., time period when the home is regularly occupied, time period when the home is regularly unoccupied), vehicles (e.g., identification related to a car driven by a first occupant and another car driven by a second occupant), preferences (e.g., lighting, sound, security levels), among other information. In addition, the database 305-b may store audio/video data from devices associated with the houses (device 215-c and device 220-c). For example, the device 215-c, may be configured to capture audio/video data in response to detecting motion and store the captured audio/video data in database 305-b. In some examples, a user associated with the device 215-c may configure a device 215-c to capture audio/video data based on one or more user preferences.

In some examples, the device 215-c, may be configured to capture audio/video data in response to receiving a request from device 220-c, and may store the request and the data in database 305-b. In some examples, the device 215-c may be configured to fly to a requested location and capture data at that location. In addition, the database 305-b may store identification information about frequency and/or allowed and/or expected guests (e.g., extended family, friends, nanny, delivery people, neighbors). In some examples, the database may be configured to store identification data of neighbors of house 215 and house 220. In another example, database 305-b may be a database associated with house 220, thus, device 215-c may also be in communication with a database 305-b associated with house 220, where the house 220 database stores similar information about the users associated with house 220. In addition, houses 215 and 220 may have a shared database of similar information. In another example, database 305-b may be a remote database or a third-party database which stores and shares information related to events and identification, such as a news source, law enforcement, missing persons databases, criminal databases, emergency alert systems, weather databases, and the like.

In one example, device 215-c obtains data (block 357). In some examples, the device 215-c may obtain data from one or more sensors located at house 215. In another example, the device 215-c may fly to a requested location and may obtain data at that location. In another example, the device 215-c may be configured to start capturing data after reaching the requested location. In some examples, the device 215-c may live stream video data to the requester. In some examples, the data obtained may include information associated with people present at the requested location. In one example, a user of house 215 may instruct the device 215-c to capture data at a particular location. For example, a parent may request for video footage of his child swimming at the community pool. Upon receiving the request, the device 215-c (mobile camera device) may fly to the requested location (a community pool in this example) and may capture video footage of the child. In one example, the device 215-c may receive physical characteristics (or any other identification characteristics) of the child from the requesting use (the parent in this case). In some examples, a device 215-c may receive instructions to obtain data from a control panel at a location of device 215-c,a control panel remote from device 215-c, one or more smartphones associated with a user of device 215-c, a desktop at a location of the user of device 215-c, desktop at a location remote from device 215-c, a laptop, a tablet, etc. In some examples, a device 220-c may receive instructions to obtain sensor data from a control panel at a location of device 220-c,a control panel remote from device 220-c, one or more smartphones associated with a user of device 220-c, a desktop at a location of the user of device 220-c, desktop at a location remote from device 220-c, a laptop, a tablet, etc. Although the present disclosure describes various examples, other examples and embodiments are contemplated and the present disclosure is not limited by these examples.

At block 365, device 215-c receives request from at least one of a plurality of sources. The sources may include a database associated with house 215, a database associated with house 220, a remote database 305, a mobile camera device associated with the house 215, some combination, or other sources. For example, device 215-c may receive a request inquiring about a missing child. The user of the device 220-c may create the request inquiring about the missing child. The user may include identifying characteristics of the missing child (such as the child is a 4 foot tall boy with brown hair and blue eyes, and he is wearing a blue t-shirt and white shorts). Although it is shown that device 215-c receives the request, in some examples, device 220-c receives the request from at least one of a plurality of sources, the plurality of sources one or more devices associated with house 215. In some examples, the device 215-c receive the request at a control panel at a location of the device 215-c, one or more smartphones associated with the user of the device 215-c, desktop at a location of the device 215-c, desktop at a location remote from the device 215-c, a laptop, a tablet, etc. The device 215-c queries a local database associated with device 215-c (i.e., associated with house 215) and determines whether a boy approximately 4 feet tall, with brown hair and blue eyes, dressed in a blue t-shirt and white shorts (or a subset of these or other characteristics or related features) was seen near the house (house 215). In some examples, a mobile camera device associated with house 215 may be configured to travel around the neighborhood to identify a child with at least some of the requested features (e.g., having a subset of the requested features).

The device 215-*c* may also request and receive data (at block 367) from the database associated with other houses, as well as a shared database, and determine whether any the cameras (or other devices, such as sensors) of any of the other houses have spotted the child approximately 4 feet tall, with brown hair and blue eyes, dressed in a blue t-shirt and white shorts. The device 215-*c* may request data (at block 367) from a remote database 305 (e.g., a database associated with house 220) to determine any additional characteristics of the missing child. Although it is shown that device 215-*c* requests data, in some examples, device 220-*c* may request data from one or more databases.

At block 372, in some examples, device 215-*c* identifies or determines relevant data from the received data. For example, the device 215-*c* (a control panel at house 215) may receive identification data relating to a missing person from one or more sources of data. Although it is shown that device 215-*c* identifies or determines relevant data, in some examples, device 220-*c* may identify or determine the relevant data. The sources for the data received by device 215-*c* may include a database associated with house 215, a database associated with house 220, a remote database 305, data captured by a mobile camera device associated with house 215, data captured by other camera devices associated with house 215, a combination thereof, or one or more other sources. In one example, the mobile camera device associated with house 215 may capture data at a remote location, and the control panel at the house 215 may receive the captured data from the mobile camera device. Although it is shown that control panel associated with house 215 identifies or determines relevant data from the received data, in some examples, the mobile camera device associated with house 215 may be configured to identify or determine relevant data from the received data, upon receiving a request for data from a device 220-*c*. In another example, the device 220-*c* may be configured to identify relevant data upon receiving a request from device 215-*c*. For example, a control panel at house 215 may be configured to request data from the device 220-*c* (mobile camera device associated with house 220). In some examples, the device 215-*c* identifies or determines relevant data at a one or more cameras (such as drone camera, doorbell camera, outside camera, or other devices such as motion sensor, fire sensor, glass break sensor, earthquake sensor, etc.), at the control panel at a location of the device 215-*c*, one or more smartphones associated with the user of the device 215-*c*, desktop at a location of the device 215-*c*, desktop at a location remote from the device 215-*c*, a laptop, a tablet, a smartwatch, etc. In one example, the device 215-*c* queries a local database to determine physical characteristics associated with the missing child. The device 215-*c* (control panel/drone associated with house 215) may identify relevant data based on the received information.

At block 377, the device 215-*c* (stationary device or mobile camera device associated with house 215) may transmit the relevant data. In some cases, the device 215-*c* may transmit the relevant data to the device 220-*c*, data 305-*b*, a remote database 305, or a combination thereof. In one example, the device 215-*c* may adjust an action in response to identifying relevant data. For example, the mobile camera device (device 215-*c*) associated with house 215 may determine that the child with similar characteristics is being abducted. Upon determining the abduction, the device 215-*c* may initiate adjustment of a security action at house 215. Although it is shown that device 215-*c* initiates adjustment of an action, in some examples, device 220-*c* may be configured to initiate adjustment of an action, upon receiving the relevant data transmitted by device 215-*c*. In some examples, the device 215-*c* determine the action at a mobile camera device (e.g., a drone) associated with the device 215-*c*, a control panel at a location of the device 215-*c*, one or more smartphones associated with the user of the device 215-*c*, desktop at a location of the device 215-*c*, desktop at a location remote from the device 215-*c*, a laptop, a tablet, etc. If the device 215-*c* queries a database (e.g., database 305-*b*) and determines that the data associated with the device 215-*c* includes camera footage of a child approximately 4 feet tall, dressed in a blue t-shirt and white shorts, and/or with brown hair and blue eyes, then the device 215-*c* may transmit the relevant data to device 220-*c*.

Among the received data (data captured by one or more cameras, data retrieved from databases, etc.) device 215-*c* may categorize data as indicative of a crime if the data (e.g., video footage) includes footage that can be categorized as a threat. For example, the device 215-*c* may categorize the data as a crime based on objects (e.g., gun, knife), or people (e.g., recognized as a criminal, wearing face masks) identified in the footage. In some examples, device 215-*c* may transmit an alert or take an action if the identified relevant data is indicative of a threat (in block 382). It should be understood that these are merely examples, and any security action may be contemplated. In some examples, the device 215-*c* may send a request to device 220-*c* to initiate a security action, such as turning on a security camera at house 220 which has a view of house 215 across the street. In some examples, the device 215-*c* may send an alert to a user that indicates that the device 215-*c* has retrieved data relevant to the received request. The alert may include information related to the data obtained from the sensor and/or the identification data. Thus the device 215-*c* may wait to take an action, or take a specific action, based on the user's response to the alert.

Additionally or alternatively, other devices could perform some or all of the functionalities described above with reference to FIG. 3C. For example, a control panel at a requestor location, a control panel at a location associated with the receiver of the request, one or more smartphones associated with the requestor, one or more smartphones associated with the receiver, a desktop associated with the requestor, a desktop associated with the receiver, a laptop associated with the requestor, a laptop associated with the receiver, a tablet associated with the requestor, a tablet associated with the receiver, a smartwatch associated with the requestor, a smartwatch associated with the receiver etc.

Figure 4:
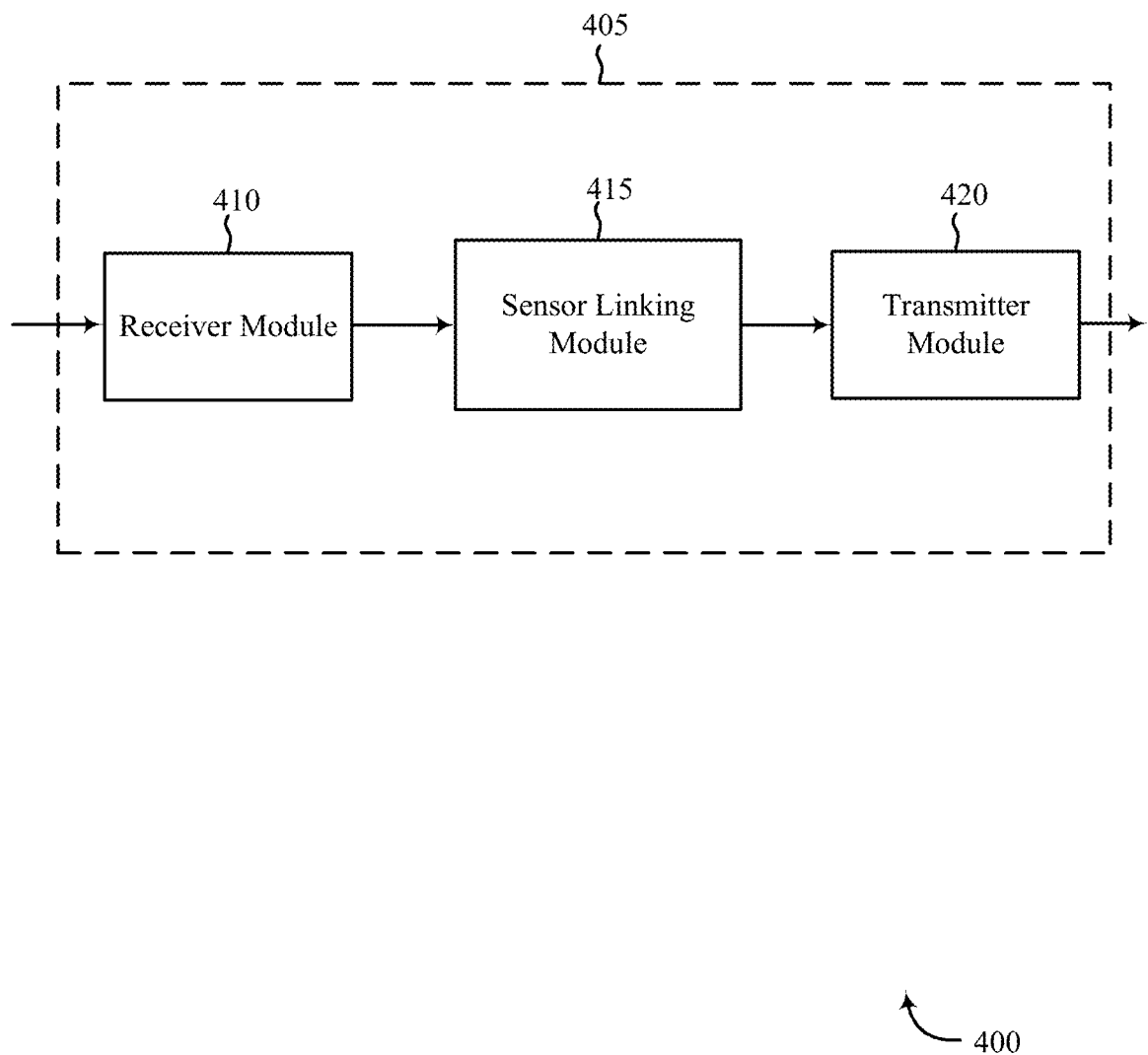
FIG. 4 shows a block diagram relating to a security and/or an automation system, in accordance with various aspects of this disclosure.

FIG. 4 shows a block diagram 400 of a device 405 for use in wireless communication, in accordance with various examples. The device 405 may be an example of one or more aspects of a control panel 105 described with reference to FIG. 1. It may also be an example of a sensor unit 110, local computing device 115 or 120, remote computing device 140 described with reference to FIG. 1. In the example where device 405 may be a sensor unit 110, sensor unit 110 may be a camera enabled to capture video and/or audio, in addition to other data as described previously. In some examples, device 405 may be an example device located at one of the example houses described with reference to FIG. 2. The device 405 may include a receiver 410, a sensor linking module 415, and/or a transmitter 420. The device 405 may also include a processor. Each of these components may be in communication with each other—directly and/or indirectly.

The components of device 405 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver 410 may receive information such as packets, user data, and/or control information associated with various information channels (e.g., control channels, data channels). The receiver 410 may be configured to receive data from sensor units 110, a local computing device 115 or 120, a remote computing device 140, a server 155, a third-party database, and one or more components of communications system 100. The received data may include data relating to a request from a user, time period associated with the received request, categories associated with the received request, the data related to user preferences related to the categories of the request, the identification of a person and/or an event, actions based on identification and/or user preferences, user profiles, data relating to home conditions and/or building features, data relating to environmental and geographic parameters and events, data relating to current positions of one or more drones, some combination, and/or other data and/or information. In some examples, information may be passed to the sensor linking module 415.

The sensor linking module 415 may be enabled to associate one device with at least one additional device in networked wireless communication. In one example, the devices may be linked based on a predetermined proximity, such as within a predetermined distance, geofenced area, neighborhood, subdivision, city block, city, county, state, street, association, etc. In another example, the devices may be automatically and initially linked based on automatic linking, but may be able to opt-out. For example, all houses which are located within a homeowners' association may be automatically networked. In some examples, the devices may include one or more stationary devices as well as one or more mobile camera devices (e.g., drones).

In another embodiment, the devices may be linked based on opting-in (e.g., street watch, houses having a specific type of security system). In another example, the devices may be linked based on an association, such as an interest group (e.g., a book club), a community group (e.g., home owner association, school organization), or social network (e.g., Facebook, Twitter). In another example, the devices may be linked based on user input (e.g., the user may add one or more contacts to an existing street watch group or the user may create a new street watch group with one or more contacts) In another example, the devices may be linked based on user selection of specific devices; for example, from a list of possible devices, a user may select which of the devices will receive data from the device at house 215 and/or which device will send data to the device at house 215. In other embodiments, the devices the user selects may be different based on the current situation; for example, in an emergency situation (e.g., determined to be an "emergency" based on an event classification), all of the houses which are within a predetermined radius of house 215 may be selected to receive data in response to a request.

In some examples, the sensor linking module 415 may receive a request at house 215 from house 220. For example, the sensor linking module 415 may be configured to receive the request at a mobile camera device (e.g., drone) at house 215 from a control panel at house 220. In some other examples, the sensor linking module 415 may be configured to receive the request at a control panel at house 215 from a mobile camera device at house 220. In some other examples, the sensor linking module 415 may be configured to receive the request at a first control panel at house 215 from a second control panel at house 220. The request may include a request to capture data during an identified time period. For example, a control panel at house 220 may transmit a request to a drone at house 215, requesting the drone to capture data at an identified location during a time period. Continuing with the above example, the control panel at house 220 may be configured to include the location and the time period within the request. For instance, a user of the control panel may compose the request at the control panel at house 220. After the request is composed, the sensor linking module 415 may transmit the request to house 215. The sensor linking module 415 may be configured to determine that the device at house 215 (receiving device) and the device at house 220 (requesting device) are part of a predetermined group of devices operating in a neighborhood network. As discussed above, both the receiving device and the requesting device may be stationary devices (e.g., control panel, motion sensor, glass break sensor, doorbell camera), a mobile camera device (e.g., drone), or a combination of both. The predetermined group of devices may be identified using methods discussed above.

Upon receiving the request and identifying that the receiving device and the requesting device are part of the same group of devices, the sensor linking module 415 may be configured to capture the data according to the request. In some examples, the data may be captured at the requested location during the requested time period. In some examples, the sensor linking module 415 may receive the request at a mobile camera device (or drone). In such examples, the receiving device may identify the location and may travel to the identified location in order to capture the requested data. In some examples, the sensor linking module 415 may receive the request at a stationary device. In such examples, the receiving device may identify the location and may instruct a mobile camera device to travel to the identified location and capture the requested data. The mobile camera device may be associated with the receiving device (devices of the same house). In some cases, prior to capturing data at the requested location, the sensor linking module 415 may be configured to verify that the identified location is within the travel range of the mobile camera device. In some cases, the sensor linking module 415 may receive a classification associated with the request. For example, the request may be classified as "emergency" based on a category (e.g., missing child). Upon capturing the data, the device at house 215 may transmit the captured data to the device at house 220.

In some examples, the sensor linking module 415 may receive a request at house 215 from house 220, and may be configured to identify a category associated with the request. For example, a stationary device at house 220 may be configured to transmit the request to a mobile camera device at house 215. The sensor linking module 415 may be configured to classify the request as "emergency" based on the category (e.g., if the request is categorized as missing child then the request is classified as emergency). In some examples, the category may be color coded differently for different situations (e.g., green for vandalism, blue for theft, yellow for other crimes, pink for lost pet, red for missing child missing child and orange for emergency). The sensor linking module 415 may be configured to receive input from a user regarding which categories to identify as emergency. In a non-emergency situation, however, only the house making the request, may be selected to receive data; for example, the device at 215 may receive a request from the device at 220, for theft of a delivery item. In response to the request, the device at house 215 may recognize a delivery truck has dropped off a package at 215 instead of 220, and the device at house 215 sends a notification to the networked devices associated with 220 which have indicated house 215 mistakenly received the delivery item. In some cases, a mobile camera device at house 215 may be configured to perform surveillance of the neighborhood, and may determine that the delivery truck has mistakenly dropped off the package at another house in the neighborhood. In some examples, the device at house 215 may receive a request from the device at 220 and may identify a category associated with the request. For example, the device at 220 may request for a lost puppy and the category associated with it may be color coded to indicate that there is a lost pet. The device at house 220 may include description of the lost puppy. The device at house 215 may recognize that the lost puppy was seen near the front porch and may notify the user of house 215 with data related to the lost puppy (e.g., video footage of the puppy, snapshot of the puppy).

The sensor linking module 415 may receive request from one or more sources and initiate a number of actions based on the request. In one example, sensor linking module 415 may receive a request from a security camera or doorbell camera from a first location or a device associated with the first location (e.g., example house 220). In some examples, sensor linking module 415 is associated with and/or located a second location or a device associated with the second location (e.g., example house 215) and receives the request from the first location or a device associated with the first location. The request may include a request to access the cameras the second location (e.g., security camera or the doorbell camera at house 215) for a custom time period. In some cases, the sensor linking module 415 may receive a request from one or more sources within the same house (e.g., house 215). For example, a first device in house 215 may request a second device in house 215 to capture data. For example, a user of the security and/or automation system may compose a request at a first device (e.g., an application on a smartphone of the user). The request may be transmitted to a drone, and upon receiving the request, the drone may be configured to capture data according to the request. For example, the user may instruct the drone to fly to the nearest bus stop and capture video of his child arriving in the school bus at 3:15 pm. Upon receiving the request, the drone may fly to the nearest bus stop and may monitor all vehicles arriving or passing by the bus stop. The drone may detect when the school bus arrives at the bus stop. For example, the drone may be configured to perch on top of a pole near the bus stand and may use the camera to constantly capture footage of the bus stop. The drone may automatically parse the captured footage to detect when the bus arrives. In one example, the drone may hover over a bus stop and periodically capture audio and/or video data at the bus stop. The drone may also be configured to use facial recognition, feature recognition, and/or a combination of facial and feature recognition to identify the child, and may start recording a video of the child returning home. In some cases, the drone may provide a live feed of the recording to the requesting user.

In some examples, the user of the house 220 may input a time period and may request data from the cameras at house 215 for the time period. In some examples, a sensor linking module 415 at house 220 may request data at a sensor linking module 415 from house 215. The request may be related to a missing child or a lost pet; for example, the request may include an inquiry about a missing child, description of the child, description of the clothes that the child was wearing when last seen, whether the child was riding a bike or may be associated with an object, if the child has any special physical or other features, etc. In another example, the sensor linking module 415 may receive data related to sounds and/or movement and/or events occurring inside the house—either by way of a communicatively linked sensor (e.g., another camera, a motion sensor, a microphone), or by way of data transmitted from an associated device in the house (e.g., smartphone, control panel) to the device 405. The sensor linking module 415 may store the data (e.g., video footage of the location of detected motion). In some examples, after receiving the request, the sensor linking module 415 may automatically detect the missing child from the stored data. In some examples, the sensor linking module 415 may identify a category of the request and may determine one or more user preferences associated with the category. For example, a user of house 215 may enter a conditional user preference to initiate one or more actions. As one example, a conditional user preference may be or include to forward the stored video footage to the requesting device without the user's approval. In some cases, this conditional preference may be based on a category, a time period associated with the request, information indicated in the request, a source of the request (e.g., a user, a location, an address, a device). For example, if the category associated with the request include a missing child or an emergency or is requested by a trusted person, the data may be forwarded automatically (e.g., absent user approval). In this example, the houses located within the dotted line 205 from FIG. 2 may be part of a network, and may send and receive data to one another based on the descriptions provided in the present disclosure.

In some examples, the sensor linking module 415 may be configured to recognize or predict suspicious behavior of person in a neighborhood or requesting information from others. For example, the sensor linking module 415 may be configured to monitor information related to the person requesting for audio/video data (e.g., frequency of request, time and/or duration of footage requested, profile of the user making the request, the details of the request including the identity or characteristics described in the request, other characteristics, some combination). The sensor linking module 415 may determine that a particular person is requesting video footage between 4:00 pm to 6:00 pm for weekdays from a neighbor. The system may determine that the requester is identifying a schedule when the a home occupant arrives home (or, alternatively or additionally, when one or more home occupants leave home). In some cases, this may be based on correlating sensor data inside and/or outside the home, location data of one or more occupants, request data, other information, or some combination. The sensor linking module 415 may determine that this pattern of request behavior is unusual or abnormal, and may block the user from making further requests and/or notify one or more other users of this potentially abnormal behavior. In some examples, the sensor linking module 415 may determine that a particular person is new to the neighborhood and is requesting video footage from a neighbor. The system may identify a profile associated with the requester and may determine that the requestor has a criminal background. In some cases, this may be based on receiving criminal identity data from a public database (e.g., police database) and comparing the identity of the requestor with the received data. The sensor linking module 415 may determine that the person requesting footage from the neighbors, has a criminal background, and may block the person from making further requests and/or notify one or more other users of this potential threat to the neighborhood. In some examples, the sensor linking module 415 may determine that a particular user is requesting video footage from a neighbor, and the request includes an inquiry about a missing child. The system may identify that the requester does not have any child living in the house (e.g., from database 305/305-a/305-b). In some cases, this may be based on sensor data from the location of the requestor, location data of one or more occupants, request data, other information, or some combination. The sensor linking module 415 may determine that this request is unusual or abnormal, and may notify one or more other users of this potentially abnormal request.

The sensor linking module 415 may receive data from a plurality of sources and initiate any number of actions based on the data. In one example, sensor linking module 415 may receive data from a security camera or doorbell camera or a mobile camera at example house 215 (e.g., sensor linking module 415 is associated with and/or located at example house 215). Some or all of the house that are networked may transmit and/or receive data from sensors and computing devices associated with any, some, or all of the networked locations. The data may be related to sounds and/or movement captured in front of the house; for example, people entering and exiting the house, people walking by, animals walking by, cars driving by, tree branches swaying the sound of wind and/or rain, the sound of a car colliding with another car, the sounds of shouting, etc. In another example, the sensor linking module 415 may receive data related to sounds and/or movement and/or events occurring inside the house—either by way of a communicatively linked sensor (e.g., another camera, a motion sensor, a microphone), or by way of data transmitted from an associated device in the house (e.g., smartphone, control panel) to the device 405. In some examples, the device 405 may be the control panel inside and receives data from a device outside of the house. In another example, sensor linking module 415 may receive data related to other devices associated in a networked and wireless communication with device 405. In this example, the houses located within the dotted line 205 from FIG. 2 may be part of a network, and may send and receive data to one another based on the descriptions provided herein.

The sensor linking module 415 may analyze data relating to an identification and/or an event and/or a user and/or other data, and perform operations relating to transmitted data to another networked device and/or taking an action in response to the data. In some examples, the sensor linking module 415 may identify a first set of data relating to a person and/or an event at a location. For example, the first set of data may be identified based on the analysis of the data. In some examples, the sensor linking module 415 may perform operations and/or actions related to at least: receiving an inquiry from a device and identifying an object and/or person from the inquiry; identifying a person inside, outside, and/or proximate a location; identifying events inside, outside, and/or proximate a location; and/or identifying a category of inquiry and transmitting the identification data to the device based at least in part on the category; and/or initiating an adjustment, adjustments, or a stream of adjustments of a security feature and/or other user preference based at least in part on the receiving and analyzing.

In some examples, the sensor linking module 415 may receive identification data relating to an object or a person at a mobile camera device. The mobile camera device may then transmit the identification data to the requesting device. In one example, device 405 may obtain data from a sensor located at house 215. As discussed above, the device 405 may be a mobile camera device or a stationary device. The sensor may detect video, still images, sound, motion, temperature, vibration, infrared, frequencies, and/or any combination. For example, sensor linking module 415 may determine that a person has broken the glass of the front living room window of house 215 based on determining the presence of a person, the sound of glass breaking, the proximity of the person and the sound, and/or other data which indicates the front living room window being broken. In another example, sensor linking module 415 may determine that a person has broken the glass of a window of house 235, which is located across the street from house 215. In another example, sensor linking module 415 may determine that the front living room window of one of the houses has broken, but the presence of a person has not been detected, and thus the breaking of the glass may be for another reason, such as a misthrown baseball or a branch blowing in the wind. In some embodiments, obtained and/or received data may be stored in memory for future reference. In some cases, sensor linking module 415 may determine that there has been a break in at a neighboring house (for example using a doorbell camera and/or other techniques), and may instruct a mobile camera device to obtain data from a neighboring house. The mobile camera device may then fly to the neighboring house to obtain audio and/or video data from the house. In some cases, the mobile camera device may capture audio and/or video data in response to a user inquiry. For example, a user may request a mobile camera device to obtain any information related to a particular person. In some cases, the information may be related to a mission person. Upon receiving the identity of the missing person, the mobile camera device may capture audio and/or video data at one or more locations and may run facial recognition, object recognition, feature recognition, and/or a combination of facial recognition, object recognition and feature recognition on the captured data to determine whether the footage includes the missing person. In some cases, the sensor linking module 415 may receive the captured data from the mobile camera device and may confirm an identity of the missing person.

In other embodiments, obtained and/or received data may trigger an adjustment or initiation of an action. In other embodiments, the obtained data may be stored without transmitting. In some examples, the sensor linking module 415 may also store a time stamp associated with the obtained data. In other embodiments, transmitter 420 may send the data to another device and/or send a notification and/or an alert and/or a command to another device based on the obtained data.

Sensor linking module 415 may also receive or obtain identification data related to a person and/or an event at house 215. In some embodiments, the sensor linking module 415 may obtain the identification data related to a person and/or an event at house 215 after receiving a request from house 220. In another example, sensor linking module 415 may receive or obtain identification data related to a person and/or an event at another location. For example, a video camera may obtain a facial scan of the person who broke the window at house 220, but may also receive or obtain data from a local or remote database, such as a criminal database containing news photos and/or mugshots. Sensor linking module 415 may then compare the data received (both locally and from a remote source) to make a determination as to who and what has occurred. In this example, sensor linking module 415 may determine that a person matching a recent news report about burglaries has been identified at the porch of house 215 and is identified as the person that broke the window of house 220, thus sensor linking module 415 may determine a burglary is about to occur.

In some examples, sensor linking module 415 determine that the identified person and/or object is in motion. For example, the sensor linking module 415 may be configured to receive a video footage of the person and/or object captured by the mobile camera device (or drone). Upon receiving the captured footage, the sensor linking module 415 may determine a speed at which the person and/or object is moving. In one example, upon receiving a user inquiry for a missing child, the sensor linking module 415 may instruct the mobile camera device to scan the neighborhood for the missing child. The mobile camera device may identify that the child is in a silver sedan. The sensor linking module 415 may receive the footage and may calculate a speed at which the silver sedan is moving. The sensor linking module 415 may be configured to instruct the mobile camera device (e.g., a drone) to follow a path of progress of the moving object and/or person. For example, the sensor linking module 415 may determine a route for the mobile camera device and may send the route to the mobile camera device. In some other examples, all operations may be locally performed at the mobile camera device. In some cases, upon capturing data relating to a person and/or object and determining a path of progress, the sensor linking module 415 may transmit a notification to a second device. In some cases, the second device may be a control panel, a doorbell camera, a mobile camera device and one or more other devices.

In some embodiments, the sensor linking module 415 may obtain the identification data related to a person and/or an event at house 215 after receiving a request from house 220. In some cases, the sensor linking module 415 may obtain the identification data from a mobile camera device. The sensor linking module 415 may determine that the identified person and/or object is in motion. In one embodiment, the sensor linking module 415 may predict a future path of progress for the identified person and/or object. In another example, the mobile camera device may be configured to predict the future path of progress for the identified person and/or object. In some examples, the sensor linking module 415 may predict the future path of progress based on the current traffic situation. Referring back to the example of the missing child in a silver sedan, the sensor linking module 415 may determine that the silver sedan is moving towards a certain road (e.g., an interstate, a highway, a toll road). For example, the sensor linking module 415 may receive a speed and direction of the silver sedan from the mobile camera device (e.g., a drone). The sensor linking module 415 may determine that the silver sedan is moving towards the east at a speed of 40 miles per hour. Based on this, the sensor linking module 415 may determine that the car will reach a particular destination within a time period. Additionally or alternatively, sensor linking module 415 may utilize parameters related to time of the day, traffic condition, accident reports and weather condition to determine the future path of progress for the car. Sensor linking module 415 may then determine that the future path of progress is beyond the range of the mobile camera device (i.e., the mobile camera device currently capturing video footage of the moving object). For example, a mobile camera device (or drone) may fly until a threshold distance.

The sensor linking module 415 may determine that if the moving person and/or object follow the predicted future path of progress, then the moving person and/or object will be out of the range of the mobile camera device. The sensor linking module 415 may identify one or more other cameras located within a threshold distance from the future path of progress. For example, sensor linking module 415 may identify one or more houses along the future path of progress. These house may be associated with doorbell cameras, outdoor cameras, mobile camera device, etc. In some examples, sensor linking module 415 may initiate a notification for at least one of the devices located along the future path of progress of the moving person and/or object. In one example, sensor linking module 415 may additionally verify whether at least one of these devices belong to a neighborhood watch group. In some examples, the mobile camera device currently capturing a footage of a moving object, and at least one device located along the future path of progress of the moving object may be part of the same street watch group.

In some examples, sensor linking module 415 may receive captured audio and visual data from the mobile camera device (e.g., a drone). The sensor linking module 415 may determine an identity of an object located at a first location. In some examples, sensor linking module 415 may determine whether the identified object is a mobile object or a stationary object. For example, the sensor linking module 415 may identify a tree and a truck in front of a home. The sensor linking module 415 may determine that the tree is a stationary object and the truck is a mobile object. In some cases, the sensor linking module 415 may be configured to determine whether the identified object has been previously captured at the current location. For example, the sensor linking module 415 may retrieve from a database that the truck belongs to the occupant of the home. In such a situation, the sensor linking module 415 may categorize the identification of the objects as normal. In one example, the sensor linking module 415 may receive an image of a blue sedan parked in front a home when it is unoccupied. The sensor linking module 415 may determine that the blue sedan does not belong to any occupant of the home. The sensor linking module 415 may classify the blue sedan as an unidentified object and may transmit a notification to the home owner. For example, the notification may include a picture of the blue sedan and an alert associated with the blue sedan.

In some examples, based on determining an identification of a person and/or an event, sensor linking module 415 may adjust a parameter associated with house 215 or take an action. The adjustment may be pre-programmed (e.g., a user profile which establishes actions and reactions), or may be based on artificial intelligence and learning based on previous events and actions both at the location and based on events and actions at other networked locations. In some examples, the actions may be based on a category of the request. For example, a user may set up a preference that in response to a request, the sensor linking module 415 will be configured to send identification of the person and/or the event without user approval, if the category associated with the request satisfies a threshold. Thus, in one example, an adjustment may be made automatically; however, in another example, the sensor linking module 415 may send a notification to a user to ask what the request adjustment should be based on the data and the comparison.

In addition, receiving and transmitting data and/or with regard to initiating an action at the associated location or at a networked location, sensor linking module 415 may further determine which other linked devices are part of the network and/or whether each device wants to, expects to, and/or is enabled to receive communications from device 405. Sensor linking module 415 may thus transmit data to at least one of the other linked devices which are identified as being part of the network.

In another example, such as when sensor linking module 415 detects the breaking of glass, but not the presence of a person, sensor linking module 415 may determine the event is not a burglary, but an accident, and thus the actions taken by sensor linking module 415 may be different based on determining a classification for the determined action. In another example, such as when sensor linking module 415 detects a person as described in an inquiry for a missing person, the sensor linking module 415 may determine that the video footage may be helpful in identifying the missing person and may transmit the inquiry to other linked devices, and thus the actions taken by sensor linking module 415 may be different.

In one example, sensor linking module 415 may receive data related to occupancy at a first location. For example, the sensor linking module 415 may determine that a home is unoccupied based on data received from one or more occupancy sensors (e.g., motion sensor, light sensor, camera sensor, vital signs sensor). Based on the occupancy information, sensor linking module 415 may instruct a mobile camera device to capture data in and around the home. In some cases, sensor linking module 415 may determine a pattern associated with occupancy in a home. For example, the sensor linking module 415 may determine that a home is unoccupied between 8:00 am and 6:00 pm on weekends. The sensor linking module 415 may instruct the mobile camera device to periodically capture pictures of the home every two hours on weekdays. The sensor linking module 415 may receive the captured footage from the mobile camera device and may identify whether the home condition looks normal (e.g., doors locked, windows locked, lights off). In one example, the sensor linking module 415 may determine an abnormal behavior in home. For example, the sensor linking module 415 may determine a home is unoccupied but the front door is open. The sensor linking module 415 may initiate an adjustment of a security action. For example, upon detecting an indication of a theft (e.g., glass break, open door), the sensor linking module 415 may notify one or more other houses in the neighborhood. The notification may include sending an alert to the control panels associated with the other houses in the neighborhood. In some examples, the security action may be automatic and based on preprogrammed preferences (preferences related to a user profile, preferences related to notification type, preferences related to a neighborhood street watch group itself, preferences related to a group of user profiles, and/or default preferences). In some examples, the security action may be dynamic and/or based on user input or other data (e.g., sensor data) in real time (e.g., audio/video footage may be transmitted upon receiving approval from the user). In some examples, adjustment of security actions, in examples involving a lighting system, may be to the lighting system and any component(s) thereof. Other adjustments may include, for example, adjustments to a television or system of televisions, a music system, relatedly a home theater system, a thermostat system, a humidifier system, and/or a water system, among others.

Figure 5:
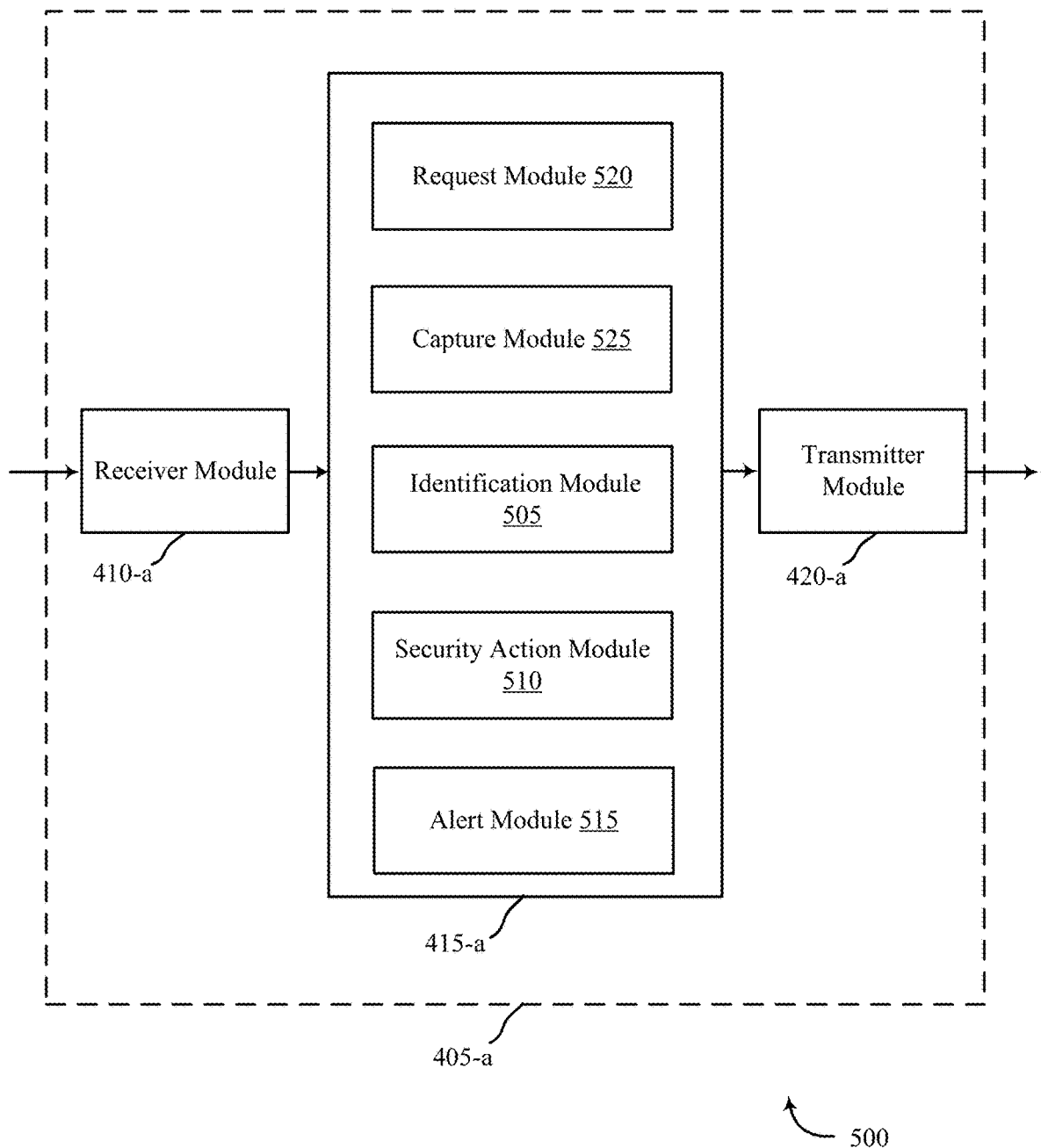
FIG. 5 shows a block diagram relating to a security and/or an automation system, in accordance with various aspects of this disclosure.

FIG. 5 shows a block diagram 500 of a device 405-a for use in wireless communication, in accordance with various examples. The device 405-a may be an example of one or more aspects of device 405 described with reference to FIG. 4. The device 405-a may also be an example of a control panel 105 described with reference to FIG. 1. It may also be an example of a sensor unit 110, local computing device 115 or 120, remote computing device 140 described with reference to FIG. 1. The device 405-a may include a receiver 410-a, a sensor linking module 415-a, and/or a transmitter 420-a, each of which may be an example of receiver 410, sensor linking module 415, and/or transmitter 420 described with reference to FIG. 4. Sensor linking module 415-a may also include a request module 520, an identification module 505, a security action module 510, and/or an alert module 515. The device 405-a may also include a processor. Each of these components may be in communication with each other—directly and/or indirectly.

The components of device 405-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver 410-a may receive information such as packets, user data, and/or control information associated with various information channels (e.g., control channels, data channels). The receiver 410-a may be configured to receive data from sensor units 110, a local computing device 115 or 120, a remote computing device 140, a server 155, a third-party database, one or more components of communications system 100, as well as data relating to a request from a user, time period associated with the received request, categories associated with the received request, the data related to user preferences related to the categories of the request, the identification of a person and/or an event, actions based on identification and/or user preferences, user profiles, data relating to home conditions and/or building features, data relating to environmental and geographic parameters and events, some combination, and/or other data and/or information. In some examples, information may be passed to the sensor linking module 415-a.

Request module 520 may receive and/or compose a request associated with a time period. In some examples, the request module 520 may receive a request to capture data during an identified time period at a requested location. In some examples, the request module 520 at a first location may receive a request from another request module 520 at a second location. In some cases, a request module associated with a mobile camera device may receive a request from a request module from a stationary device (doorbell camera, control panel, motion sensor, barrier sensor, etc.). In some examples, the request may include an inquiry related to a person, an object, and/or an event. In some examples, request module 520 receives a request and identifies a category associated with the request. In some examples, the category associated with the request may be a phrase describing the type of request, a color code classifying the request, or a number identifying the category of the request, or any other representation describing or indicating a category of the request. For example, the category can include vandalism, theft, lost pet, missing child, other crimes, and emergency, and the visual representation of the category may be green for vandalism, blue for theft, yellow for other crimes, pink for lost pet, red for missing child and orange for emergency.

In addition, request module 520 may identify the requested time period and/or determine data related to identifying a person, an animal, an object and/or an event during the time period. In some example, request module 520 may receive a request for access to one or more devices (e.g., sensors, cameras) at or within a particular location or structure. In some examples, the request module 520 may identify that the requester is not a verified member of street watch group and may discard the request based at least in part on the identification. Alternatively, the request module 520 may identify that the requester is not a verified member of street watch group and may send a notification to one or more street watch members to facilitate the non-member joining the group through one or more actions. In some examples, request module 520 may receive a request to access a mobile camera device associated with a first home. For example, a user of a street watch group may be able to request access to one or more stationary and mobile devices associate with another home that is part of the same street watch group.

In addition, the request module 520 may create a request associated with a time period. In some examples, the request module 520 may automatically create a request based on an identified occupancy pattern. For example, upon determining that a home 215 is unoccupied from 8:00 am to 6:00 pm on weekdays, the request module 520 associated with the house 215 may compose a request for periodic surveillance by a mobile camera device associated with the house 215. In some examples, the request module 520 at a second location may compose a request. For example the request module 520 at the second location may compose a request to access one or more security devices (e.g., cameras, sensors, and doorbell cameras) in communication with another request module 520 at a first location. In some examples, the request may include an inquiry related to a person, an object and/or an event. In some examples, request module 520 may query a user and receive user input while composing one or more aspects of the request. In some examples, the request module 520 may automatically compose a request based on an event. For example, one or more sensors of house 220 may detect glass breaking and may identifies movement of figure running toward house 215. Based at least in part on the detected data and/or potential identification of the figure, the request module 520 associated with the house 220 may automatically compose a request to view the security cameras of house 215 and transmit the request to the request module 520 associated with house 215. In some examples, request module 520 may include permission to access the security cameras at house 215 for a time period. In some cases, at least part of the time period may be based on the detected sensor or other data (i.e., the start of the time range may be based on the first detection of the movement of the figure and/or the glass breaking information).

Capture module 525 may capture the requested data using the mobile camera device at the first location. In some examples, the capture module 525 may receive the details of a request from the request module 502. Capture module 525 may be configured to instruct a mobile camera device to capture requested data from the requested location. In some cases, capture module 525 may determine that the requested location is beyond a travel range of the mobile camera device (or drone). Upon determining that the requested location is beyond the travel range (or the requested location is more than a predefined threshold distance away), the capture module 525 may instruct one or more other devices to capture data (audio/video data) from the requested location.

In addition, capture module 525 may receive and/or determine data related to occupancy within a home. Based on determining that the occupancy within the home satisfies a predefined threshold (e.g., less than a predefined number of occupants present at one time), the capture module 525 may instruct a mobile camera device to capture data at/or around the home. In some examples, data related to occupancy may also include data related to identifies of the occupant within a home at a current time. For example, a parent may wish to see live footage of his baby with a baby sitter. In this case, the capture module 525 may identify that the current occupants in the home includes the baby and the baby sitter. The capture module 525 may instruct the mobile camera device to capture or live stream audio and/video from the room where the baby and the baby sitter are present. In some cases, after receiving the captured data from the mobile camera device, the capture module 525 may be configured to transmit the captured data to the requesting device. As previously discussed, the requesting device may be a device associated with the same home as the mobile camera device, a device associated with another home in the same street watch group, a device associated with another home outside the street watch group, or a combination thereof.

Identification module 505 may receive and/or determine identification of a person, an object and/or an event. In some examples, the identification module 505 may receive and/or identify data associated with a time period received in a request. In some cases, the identification module 505 may receive the identification data from a mobile camera device. In some cases, the identification module 505 may receive the identification data from a combination of mobile camera device and stationary device. In some examples, identification module 505 obtains data within a predetermined proximity of the device. For example, the device can be a drone, a sensor device, an outside camera, doorbell camera etc. Data may include pictures, video, audio, sub audio, vibrations, motion, wind, rain, snow, ice, colors, fabrics, fingerprints, retinal scans, voice capture, identification numbers, changes in temperature, quick response (QR) code data, barcode data, radio frequency identification data (RFID), wireless device identification data, etc. Using similar methods, the identification module 505 may determine whether a person is located at or within the house. Using similar methods, the identification module 505 may determine whether a person is present at a particular location or not. For example, the identification module 505 may determine whether a child has been dropped off at the bus stop or not. Using similar methods, the identification module 505 may determine a person described in the request and may determine whether the person was located at or near the house.

In addition, identification module 505 may receive and/or determine data related to identifying a person, an animal, an object and/or an event. In some examples, the identification data may be compared to the inquiry received and/or determined as described above in order to determine a specific identification. Identification data may be stored in a device and/or in a database enabled to be accessed by the device, for example, a communal database shared by the networked devices. In other examples, identification data may be obtained and/or received from a remote source and/or a third-party database such as a news report, a flyer, a radio broadcast, an all-points bulletin, a missing child database, a criminal database, a database of user profiles associated with a networked group of users, etc.

In some examples, identification module 505 may determine whether the identified person and/or object is in motion. For example, the identification module 505 may receive a video footage or an image of the person and/or object captured by a mobile camera device (or drone) and/or a stationary device (doorbell camera, outside camera, sensor device, etc.). Upon receiving the captured footage, the identification module 505 may determine a speed at which the person and/or object is moving. In some embodiments, the identification module 505 may be configured to instruct a mobile camera device to follow a path of progress of the moving object and/or person. For example, the identification module 505 may determine a route for the drone based on the moving person and/or object, and may send the route to the drone. For example, the identification module 505 may determine the route for the drone based on a location of the moving person and/or object, direction of movement, time of the day, weather conditions, traffic conditions, etc.

In some cases, upon capturing data relating to a person and/or object and determining a path of progress, the identification module 505 may initiate a notification to a second device. For example, the identification module 505 may determine that a child is being abducted from a neighborhood in a car. The identification module 505 may be configured to identify details associated with the child. For example, the identification module 505 may identify that a child of height 4 feet 2 inches, wearing a red shirt and a blue pair of jeans, is being abducted. Based on the identification data, the identification module 505 may coordinate with alert module 515 to initiate and transmit a notification of the abduction. In some cases, the notification may be in form of an alert (e.g., amber alert, text message, news alert). For example, the identification module 505 may initiate an amber alert describing the missing child, and the alert module 515 may transmit the amber alert to all houses in the neighborhood (or located within a predetermined distance of the abduction). In some cases, the second device may be a control panel, a doorbell camera, a mobile camera device and one or more other devices.

In some embodiments, the identification module 505 may predict a future path of progress for the identified person and/or object. Referring back to the previous example, the identification module 505 may determine that the child is being abducted in a minivan, and the minivan is moving in a particular direction. In some embodiments, the identification module 505 may identify a license plate number associated with the minivan. In some examples, the identification module 505 may predict the future path of progress based on the current traffic situation. The identification module 505 may determine a speed and direction of the moving object (and/or person) based on a video footage captured by a mobile camera device and/or a stationary device. In some examples, the identification module 505 may utilize parameters related to time of the day, traffic condition, accident reports and weather condition to determine the future path of progress for the moving person and/or object. Additionally or alternatively, the identification module 505 may determine that the future path of progress is beyond the range of the mobile camera device (i.e., the mobile camera device currently following the moving object).

The identification module 505 may determine the predicted future path of progress will be out of the range of the mobile camera device. The identification module 505 may identify one or more other cameras (drones, doorbell cameras, outside cameras, sensors, etc.) located within a threshold distance from the future path of progress. For example identification module 505 may identify one or more devices associated with houses located within a threshold distance from the future path of progress. In some examples, the identification module 505 may initiate a notification for at least one of the devices located along the future path of progress of the moving person and/or object. In one example, the identification module 505 along with the alert module 515 may transmit the notification to the devices located along the future path of progress of the moving person and/or object.

Additionally or alternatively, the identification module 505 may determine whether an identified object is a mobile object or a stationary object. For example, identification module 505 may identify a tree and an unidentified vehicle in front of a home. identification module 505 may determine that the tree is a stationary object and the truck is a mobile object. For example, the identification module 505 may compare a currently captured image (or video footage) of a location to a previously captured image of the same location to identify which objects are stationary. In some cases, the identification module 505 may be configured to transmit a notification to a home owner based on identifying a mobile object near the home.

In addition, identification module 505 may retrieve data related to the requested time period and may compare the requested inquiry with the retrieved data. In some examples, the retrieve data may be compared to the inquiry received and/or determined that the retrieved data does not include information related to the inquiry.

Security action module 510 may adjust security actions or other automation actions based on the received request and the identification of people, events, objects, and/or animals. In some examples, the security action module 510 may automatically transmit the identification data based at least in part on determining that the category associated with the request meets or exceeds a level of a user-defined threshold. In some examples, the security actions may be automatic and based on preprogrammed preferences (preferences related to a user profile, preferences related to a neighborhood street watch group itself, preferences related to a group of user profiles, and/or default preferences). In other examples, the security action may be based on an identify of the requestor and pre-programmed or default preferences. In some examples, the security action may be dynamic and/or based on user input or other data (e.g., sensor data) in real time (e.g., audio/video footage may be transmitted upon receiving approval from the user).

In another example adjustment of security actions, in examples involving a lighting system, may be to the lighting system and any component(s) thereof. Other adjustments may include, for example, adjustments to a television or system of televisions, a music system, relatedly a home theater system, a thermostat system, a humidifier system, and/or a water system, among others.

Other adjustments may be security actions and may include: locking and/or unlocking doors and/or windows; turning on or turning off internal and/or external lights; turning on, turning off, turning the volume up, turning the volume down on audio and/or video broadcasts; deactivating or activating sensors which indicate a door and/or window has been opened or closed; deactivating or activating alarms and sirens; increasing the frequency audio and/or video is captured at a security device; turning on or off electricity and/or circuit breakers and/or water lines; sending an alert to a user, a remote user, a networked device, law enforcement, a news source, an associated group, and the like.

In some examples, the security action adjustment may be automatic and based on preprogrammed preferences. In other examples, the security action adjustment may be based on determining whether or not a user is located at the first and/or a second location. In some examples, the security action adjustment may be dynamic and/or based on user input in real time (e.g., within 5 minutes of a user receiving an alert). In other examples, the security action adjustment may be based on who has been identified as being located at a second location and/or based on an event at a second location (e.g., a burglary down the street).

Alert module 515 may transmit identification and event data to a user associated with the device at example house 215. In some examples, the alert may be sent to a control panel inside or outside of the house, a portable electronic device such as a smartphone, tablet, smartwatch, the alert may be broadcast through speakers inside or outside of the house and/or on a television screen and/or monitor. In some examples, the alert may similarly transmitted and broadcast to at least one other wireless networked device, such as the device located at house 245. In other examples, the alert may be sent to law enforcement, a news source, a share group database, and the like.

In one example, the alert module 515 may send an approval alert to the user associated with the device 215-b (or 215-c) that a second device 220-b (or 220-c) is requesting access to the data associated with device 215-b. In some examples, the alert module 515 may receive a category associated with the received request and may send a notification to the user of device 215-b indicating the category of the received request. The option to select a security action adjustment associated with a category of a received request may be based on preprogrammed security action adjustment selections, or may be able to manually override automatic or scheduled security action adjustments. In some cases, the system may perform an automatic security action adjustment if a user does not provide input or a contrary instruction within a predetermined time (e.g., the system automatically sends audio/video data to the requesting user if the system determines that the identified data at house 215 includes requested data).

In one example, the alert module 515 may send an alert to the user associated with the device that someone is determined to be present at the house and whether the person is identified, and if so, who the person is identified to be, and/or whether the person is allowed and/or expected. In other examples, the device may send an alert that a person is determined to be present at the house but the person is not identified. In other examples, the alert module 515 may send the user an alert which indicates an event has or is occurring; for example, a family member arriving home, a package being delivered, someone breaking in, a car accident in the front yard, a child napping, a pet running away, etc. Based on the alert, the user may be presented with options. The options may be to select a security action adjustment based on preprogrammed security action adjustment selections, or may be able to manually override automatic or scheduled security action adjustments. In some cases, the system may perform an automatic security action adjustment if a user does not provide input or a contrary instruction within a predetermined time (e.g., the system automatically arms the system and locks the doors if the user does not indicate otherwise).

In another example, the alert module 515 may alert other networked devices about the presence or non-presence of a person and/or the occurrence or non-occurrence of an event. For example, the alert module 515 may receive a request for a missing child, and upon receiving the request, the alert module 515 may transmit a missing child alert to other networked devices. In one example, the alert sent to a networked device may be informational and contain data obtained at the first location. In one embodiment, the alert sent from the first location may be to request the device at the second location to adjust a security action or take another action. For example, the alert module 515 may receive an indication of the sound of glass breaking at house 215, and thus transmit an alert to a device associated with house 220 regarding a notification of the glass break. The device associated with house 220 may have a preprogrammed action to initiate and/or adjust at house 220 based on data and alerts received from house 215.

In other examples, the alert module 515 may send a request to a device at a second location to determine occupancy at the second location. In some examples, an identification module associated with a device at the second location may make the occupancy determination based on the alert received from the first device. In another example, the alert module 515 may send a request to the device at the second location to adjust a security action at the second location. In some cases, the adjustment of the security action at the second location will be effectuated based on receiving the alert. In other cases, however, the adjustment of the security action may be based on a determination of occupancy at the second location and/or based on user preferences or input at the first and/or second locations.

The transmitter 420-a may transmit the one or more signals received from other components of the device 405-a. The transmitter 420-a may transmit data relating to, for example, adjusting a home environment, including data relating to adjusting a device 130, including in some examples data relating to adjusting a component of a lighting system. In some examples, the transmitter 420-a may be collocated with the receiver 410-a in a transceiver module.

Figure 6:
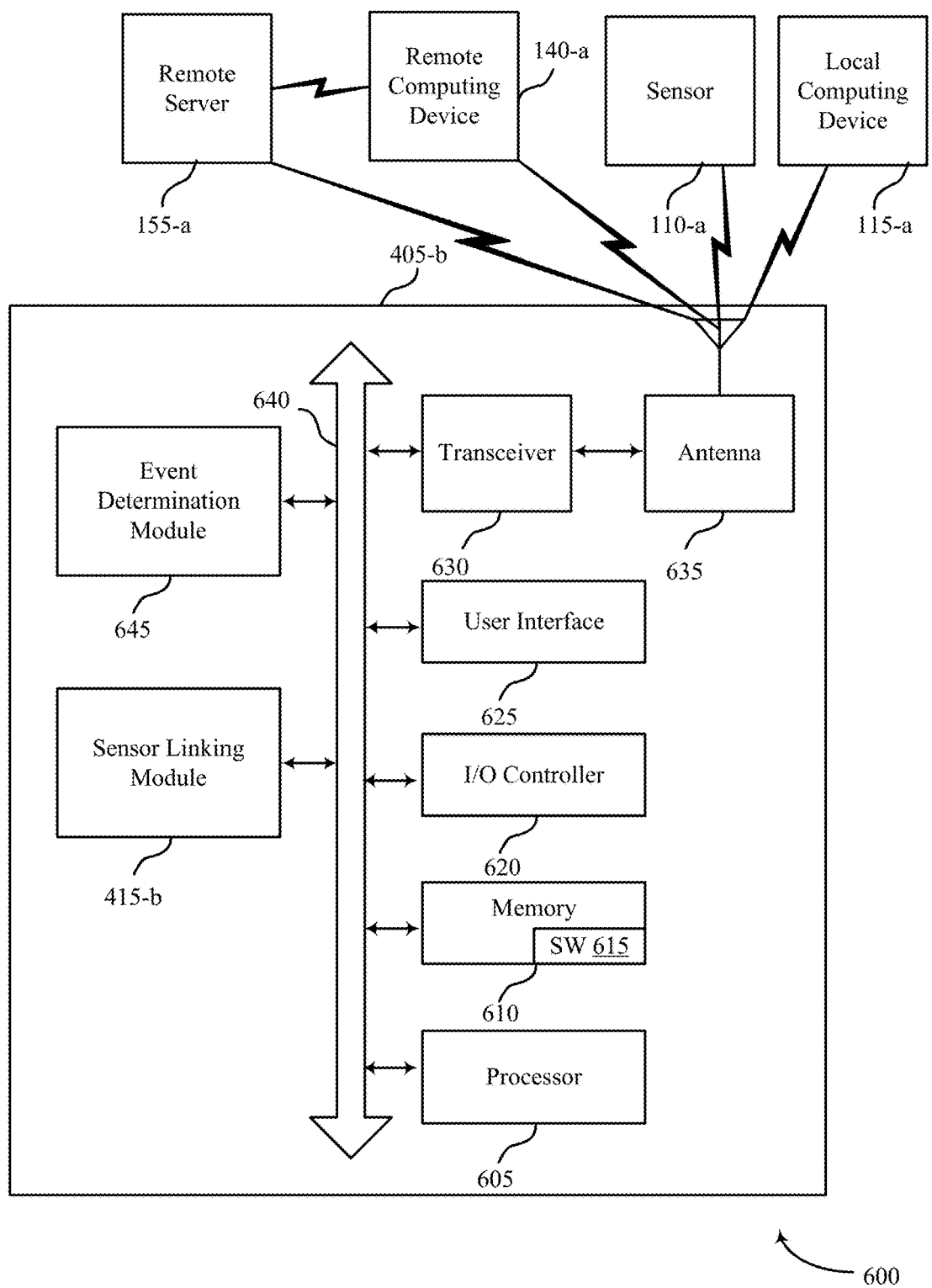
FIG. 6 shows a block diagram of an apparatus relating to a security and/or an automation system, in accordance with various aspects of this disclosure.

FIG. 6 shows a system 600 for networked security cameras and related automation, in accordance with various examples. System 600 may include a device 405-b, which may be an example of the control panel 105, local computing devices 115 and/or 120, remote computing device 140, and/or sensor unit 110 described with reference to FIG. The device 405-b may also be an example of one or more aspects of device 405 and/or 405-a of FIGS. 4 and 5.

Device 405-b may also include components for bi-directional voice and data communications including components for transmitting communications and components for receiving communications. For example, device 405-b may communicate bi-directionally with one or more of local computing devices 115-a, one or more sensor units 110-a, one or more of remote computing devices 140-a, and/or remote server 155-a. This bi-directional communication may be direct (e.g., device 405-b communicating directly with remote server 155-a) or indirect (e.g., device 405-b communicating indirectly with remote computing device 140-a through remote server 155-a).

Device 405-b may also include a processor 605, and memory 610 (including software/firmware code (SW) 615), an input/output controller module 620, a user interface 625, a transceiver 630, and one or more antennas 635 each of which may communicate—directly or indirectly—with one another (e.g., via one or more buses 640). The transceiver 630 may communicate bi-directionally—via the one or more antennas 635, wired links, and/or wireless links—with one or more networks or remote devices as described above. For example, the transceiver 630 may communicate bi-directionally with one or more of local computing devices 115-a, one or more sensor units 110-a, one or more of remote computing devices 140-a, and/or remote server 155-a. The transceiver 630 may include a modem to modulate the packets and provide the modulated packets to the one or more antennas 635 for transmission, and to demodulate packets received from the one or more antenna 635. While a device (e.g., 405-b) may include a single antenna 635, the device may also have multiple antennas 635 capable of concurrently transmitting or receiving multiple wired and/or wireless transmissions. In some examples, one element of device 405-b (e.g., one or more antennas 635, transceiver 630) may provide a direct connection to a remote server 155-a via a direct network link to the Internet via a POP (point of presence). In some examples, one element of device 405-b (e.g., one or more antennas 635, transceiver 630) may provide a connection using wireless techniques, including digital cellular telephone connection, Cellular Digital Packet Data (CDPD) connection, digital satellite data connection, and/or another connection.

The signals associated with system 600 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 635 and/or transceiver 630 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some examples, each antenna 635 may receive signals or information specific and/or exclusive to itself. In other examples, each antenna 635 may receive signals or information not specific or exclusive to itself.

In some examples, one or more sensor units 110 (e.g., motion, proximity, smoke, light, glass break, door, window, carbon monoxide, and/or another sensor) may connect to some element of system 600 via a network using one or more wired and/or wireless connections.

In some examples, the user interface 625 may include an audio device, such as an external speaker system, an external display device such as a display screen, and/or an input device (e.g., remote control device interfaced with the user interface 625 directly and/or through I/O controller 620).

One or more buses 640 may allow data communication between one or more elements of device 405-b (e.g., processor 605, memory 610, I/O controller 620, user interface 625).

The memory 610 may include random access memory (RAM), read only memory (ROM), flash RAM, and/or other types. The memory 610 may store computer-readable, computer-executable software/firmware code 615 including instructions that, when executed, cause the processor 605 to perform various functions described in this disclosure (e.g., obtain data at a sensor, receive identification data, compare data, adjust security actions, transmit data). Alternatively, the software/firmware code 615 may not be directly executable by the processor 605 but may cause a computer (e.g., when compiled and executed) to perform functions described herein. Alternatively, the computer-readable, computer-executable software/firmware code 615 may not be directly executable by the processor 605 but may be configured to cause a computer (e.g., when compiled and executed) to perform functions described herein. The processor 605 may include an intelligent hardware device, e.g., a central processing unit (CPU), a microcontroller, an application-specific integrated circuit (ASIC), etc.

In some examples, the memory 610 can contain, among other things, the Basic Input-Output system (BIOS) which may control basic hardware and/or software operation such as the interaction with peripheral components or devices. For example, the sensor linking module 415 to implement the present systems and methods may be stored within the system memory 610. Applications resident with system 600 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver 630, one or more antennas 635).

Many other devices and/or subsystems may be connected to, or may be included as, one or more elements of system 600 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some examples, all of the elements shown in FIG. 6 need not be present to practice the present systems and methods. The devices and subsystems may be interconnected in different ways from that shown in FIG. 6. In some examples, an aspect of some operation of a system, such as that shown in FIG. 6, may be readily known in the art and are not discussed in detail in this application. Code to implement the present disclosure may be stored in a non-transitory computer-readable medium such as one or more of system memory 610 or other memory. The operating system provided on I/O controller module 620 may be iOS®, ANDROID®, MS-DOS®, MS-WINDOWS®, OS/2®, UNIX®, LINUX®, or another known operating system.

The transceiver 630 may include a modem configured to modulate the packets and provide the modulated packets to the antennas 635 for transmission and/or to demodulate packets received from the antennas 635. While the control panel and/or device and/or sensor (e.g., 405-b) may include a single antenna 635, the control panel and/or device and/or sensor (e.g., 405-b) may have multiple antennas 635 capable of concurrently transmitting and/or receiving multiple wireless transmissions.

The device 405-b may include a sensor linking module 415, which may perform the functions described above for the sensor linking module 415 of devices 405 and 405-a of FIGS. 4 and 5, respectively. The device 405-b may also include an event determination module 645. Event determination module 645 may compare data received with elements pre-associated with a plurality of known events to determine whether an event is occurring and classify what type of event is occurring (e.g., user returning home, delivery of a package, car accident in the front yard, burglary, fire, flood). In other examples, event determination module 645 may extrapolate to determine what and when an event is occurring based on data that is not pre-associated with an event. For example, the event determination module 645 may not have the event of a "burglary" stored, but may know about the sound of glass breaking and the sound of heavier footsteps of a person exiting the house as opposed to entering the house. The event determination module 645 may thus use computer learning techniques and extrapolation, as well as considering other external data, to determine that these data indicate a burglary.

Based on the determination of the event at one location, the device may query another device for additional data to make further determinations. For example, if the device determines the front living room glass has broken, the device may query the other networked devices for audio and/or video data within a predetermined time period, in order to determine if the glass breaking is a burglary or an accident. Based on a request received at the sensor linking module 415-*b*, the device may query another device for additional data to make one or more further determinations regarding the request. For example, if the device receives a request regarding a missing child, the device may identify a child riding a bike in front of house 215, and the device may query another device to confirm the identification and/or one or more characteristics of the child. In some cases, identifying, determining, or confirming one or more characteristics or related pieces of information related to the child may serve to confirm the child's identity or may eliminate the child as the child of interest. For example, if the missing child has blond hair (which may be input via user input or based on captured data using one or more sensors or devices), but the child on the bike has black hair, then the child on the bike may be identified as a child other than the missing child.

Figure 7:
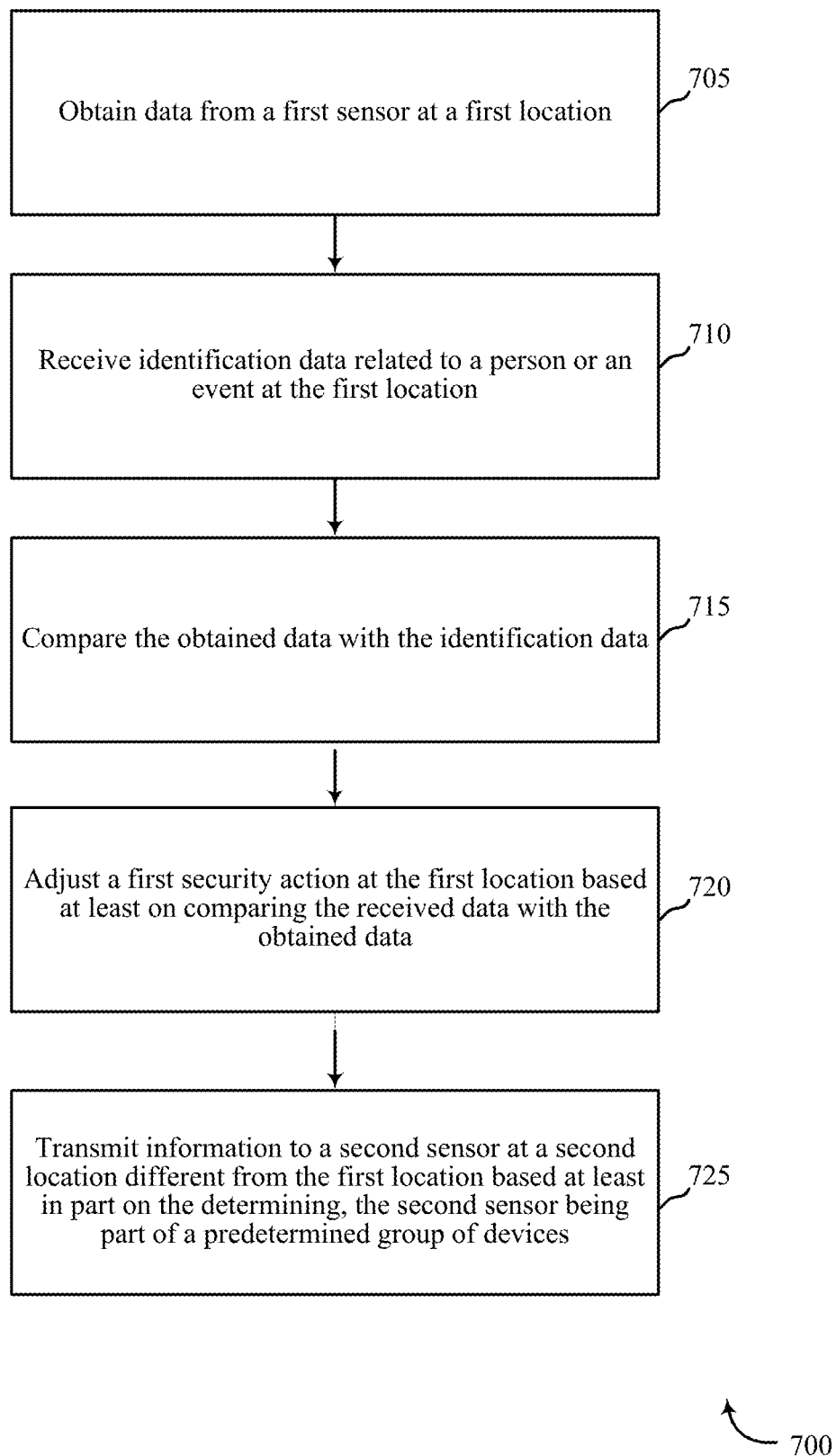
FIG. 7 is a flow chart illustrating an example of a method relating to a security and/or an automation system, in accordance with various aspects of this disclosure.

FIG. 7 is a flow chart illustrating an example of a method 700 for networked security cameras and related automation, in accordance with various aspects of the present disclosure. For example, the method 700 is described below with reference to aspects of one or more of the devices 405 described with reference to FIG. 4, and/or aspects of one or more of the devices described with reference to FIG. 5, and/or aspects of one or more of the sensor units 110 described with referenced to FIG. 1. In some examples, a process may execute one or more sets of codes to control the functional elements of device 405 and/or device 405-*a* and/or sensor unit 110 to perform the functions described below. Additionally or alternatively, the processor may perform one or more of the functions described below using special-purpose hardware.

At block 705, the method 700 may include obtaining data from a first sensor at a first location. For example, an image capture device, such as a camera, may be positioned to capture pictures, audio, and videos in a location, and may detect motion occurring within a predetermined distance from the image capture device. Presence may also be detected through sound captured at a microphone or other sound capture device. In other examples, presence may be determined by way of pressure detection (e.g., pressure sensitive floors), infrared detection, temperature differences, vibration detection, etc. In one example, the detection of movement, sound, vibrations, etc. may be caused by a person or may be caused by a nearby moving vehicle. In other examples, the motion may be caused by factors such as animals or tree branches blowing in the wind. The operation(s) at block 705 may be performed using the sensor linking module 415 and/or the identification module 505 described with reference to FIGS. 4 and 5, respectively.

At block 710, the method 700 may include receiving identification data related to a person or an event at the first location. Identification data may be related to a person's physical characteristics and/or anatomy, to information a user knows, actions, interactions with devices or areas or locations, environmental and temporal data, electronic data and information received from devices associated with a user, situational data, and the like. Identification data may be retrieved from a local database, a user profile, and/or sensor data relating to one or more locations (e.g., home, street, car, location of mobile device). Identification data may also be retrieved from a third-party database such as a news report, a flyer, a radio broadcast, an all-points bulletin, a missing child database, a criminal database, a database of user profiles associated with a networked group of users, etc. In addition identification data may not be related to a person, but an animal and/or a vehicle. Identification data may also be related to an event. For example, the sound of glass breaking, metal crunching, tires squealing, screaming, etc., may indicate a robbery, a crash, a child napping, an accident, or another determined event, etc. The operation(s) at block 710 may be performed using the sensor linking module 415 and/or the identification module 505 and/or the event determination module 645 described with reference to FIGS. 4, 5, and 6 respectively.

At block 715, the method 700 may include comparing the obtained data with the identification data. Based on the data obtained by the first device, and the identification data received, the device may compare the data to make a determination. For example, if it is detected that glass is breaking, but there is no person detected within a predetermined distance of the glass at the time of the breaking (e.g., within a five foot radius), the device may determine the glass broke due to a branch hitting the glass or a baseball hitting the glass. On the other hand, if the sound of glass breaking is obtained, as well as the presence of a person, and the person has characteristics which match a news report related to specific person breaking into houses nearby or if the person is unknown or cannot be recognized, the device may determine this is an intruder breaking into this house. The operation(s) at block 715 may be performed using the sensor linking module 415 and/or the identification module 505 and/or the event determination module 645 described with reference to FIGS. 4, 5, and 6 respectively.

At block 720, the method 700 may include adjusting a first security action at the first location based at least on comparing the received data with the obtained data. For example, the security at the ingress and egress points may increase (e.g., doors and/or windows lock, curtains close, lights and/or sounds activate, alarms activate, law enforcement is notified, other networked users are notified, sprinklers are activated) or decrease (e.g., security system turned off, blinds raise, doors unlock). The operation(s) at block 720 may be performed using the sensor linking module 415 and/or the security action module 510 described with reference to FIGS. 4 and 5, respectively.

At block 725, the method 700 may include transmitting information to a second sensor at a second location different from the first location based at least in part on the determining, the second sensor being part of a predetermined group of devices. There may be multiple devices networked in wireless communication with one another, where the devices are not located at the same location (e.g., not at the same house, but in the same neighborhood; not on the same floor, but in the same high-rise office building). Based on determining the identification of a person or event, the first device may share data related to the identification with another networked device. In other examples, the first device may share data with law enforcement, news sources, security companies, delivery companies, etc. The operation(s) at block 725 may be performed using the sensor linking module 415 and/or the security action module 510 and/or the alert module 515 described with reference to FIGS. 4 and 5, respectively.

Thus, the method 700 may provide for networked security cameras and related automation. It should be noted that the method 700 is just one implementation and that the operations of the method 700 may be rearranged or otherwise modified such that other implementations are possible.

Figure 8:
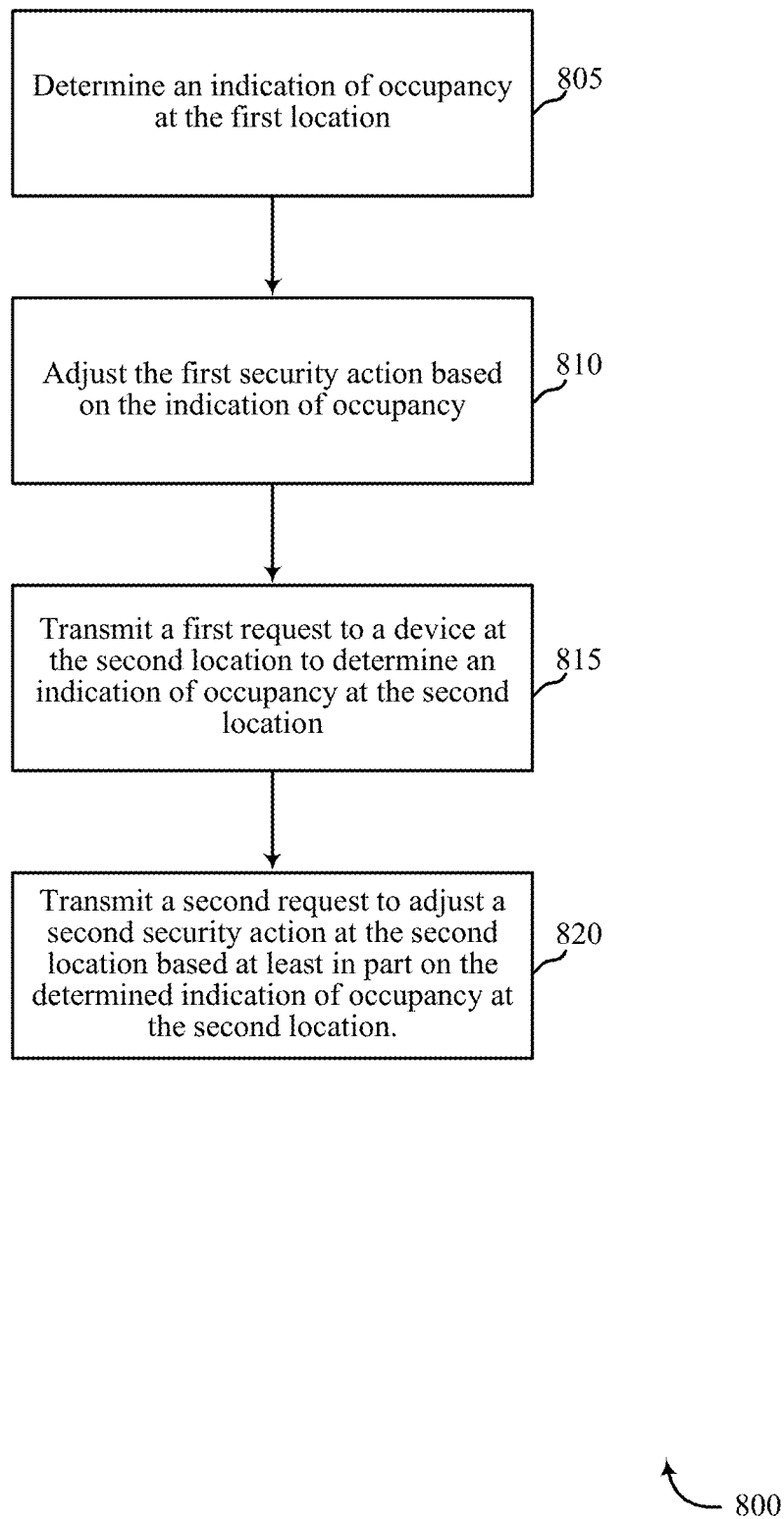
FIG. 8 is a flow chart illustrating an example of a method relating to a security and/or an automation system, in accordance with various aspects of this disclosure.

FIG. 8 is a flow chart illustrating an example of a method 800 for networked security cameras and related automation, in accordance with various aspects of the present disclosure. For example, the method 800 is described below with reference to aspects of one or more of the devices 405 described with reference to FIG. 4, and/or aspects of one or more of the devices described with reference to FIG. 5, and/or aspects of one or more of the sensor units 110 described with referenced to FIG. 1. In some examples, a process may execute one or more sets of codes to control the functional elements of device 405 and/or device 405-a and/or sensor unit 110 to perform the functions described below. Additionally or alternatively, the processor may perform one or more of the functions described below using special-purpose hardware.

At block 805, the method 800 may include determining an indication of occupancy at the first location. For example, determining an indication of occupancy at the first location may include determining if an known or recognized user has arrived at home by way of presence detection and identification techniques. The techniques may include: detection by motion sensor, a microphone detecting sound, sensors detecting vibrations, facial recognition, voice recognition, fingerprint scan, retinal scan, identification by way of wireless communications with a portable electronic device associated with a user, a digital input at an input device (e.g., personal identification number), and the like. Similar techniques may be used to determine the presence of any person, even if the person is not considered an allowed and/or expected user. The operation(s) at block 805 may be performed using the sensor linking module 415 and/or the identification module 505 and/or the event determination module 645 described with reference to FIGS. 4, 5, and 6 respectively.

At block 810, the method 800 may include adjusting the first security action based on the indication of occupancy. In some examples, as previously described, a security action may be determined and/or activated and/or initiated based on the determination of an event or identification (or non-identification) of a person and/or object. For example, the security at the ingress and egress points may increase (e.g., doors and/or windows lock, curtains close, lights and/or sounds activate, alarms activate, law enforcement is notified, other networked users are notified, sprinklers are activated) regardless if an user is home or not. In other examples, however, the security action may be based on the fact a user was determined to be home or not or that a structure has been determined to be occupied or not. For example, in the case that a user is determined to be home, the security action may be to notify the user that someone suspicious is outside, or that a flagged event is happening outside (e.g., a stolen car is identified as driving by). Because the user is home, the alert may be all that is desired and/or sufficient. However, if the user is determined not to be home, the security actions may be different. Because the user is not present to deal with the situation him or herself, the security actions may make the house more secure. In other examples, the security actions may activate instruments in the home to make it appear as if a user is home, even if he or she is not. For example, turning on lights or music. The operation(s) at block 810 may be performed using the sensor linking module 415 and/or the security action module 510 described with reference to FIGS. 4 and 5, respectively.

At block 815, the method 800 may transmitting a first request to a device at the second location to determine an indication of occupancy at the second location. As described previously, multiple devices may be networked together in wireless communication (e.g., a neighborhood, a group, a community network). In one example, a device may determine that a person identified from the news as stealing a car is located at house 215. The device associated with house 215 may be programmed to warn a user at the house within a predetermined area or proximity, such as a home down the street (e.g., house 225), and thus sends a communication or an instruction to the device associated with house 225 to determine whether anyone is home at house 225. The operation(s) at block 815 may be performed using the sensor linking module 415 and/or the security action module 510 and/or the alert module 515 described with reference to FIGS. 4 and 5, respectively.

At block 820, the method 800 may include transmitting a second request to adjust a second security action at the second location based at least in part on the determined indication of occupancy at the second location. Based on determining whether a person is home or not at house 225, the device associated with house 215 may send a request to the device at house 225 to adjust a security action at house 225. The security actions may be similar to those described previously. The operation(s) at block 820 may be performed using the sensor linking module 415 and/or the security action module 510 and/or the alert module 515 described with reference to FIGS. 4 and 5, respectively.

Thus, the method 800 may provide for networked security cameras and related automation. It should be noted that the method 800 is just one implementation and that the operations of the method 800 may be rearranged or otherwise modified such that other implementations are possible.

Figure 9:
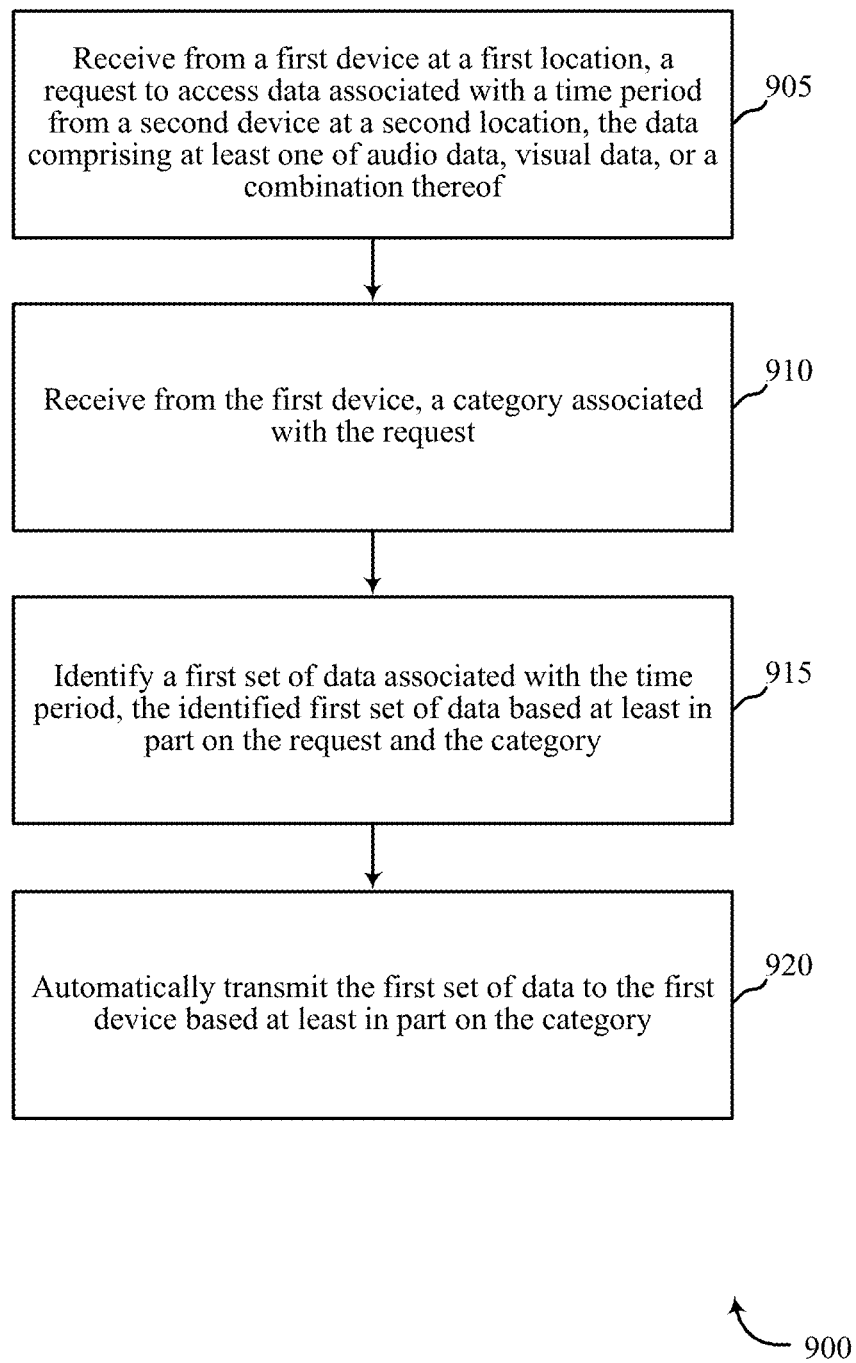
FIG. 9 is a flow chart illustrating an example of a method relating to a security and/or an automation system, in accordance with various aspects of this disclosure.

FIG. 9 is a flow chart illustrating an example of a method 900 related to a request for information, in accordance with various aspects of the present disclosure. For example, the method 900 is described below with reference to aspects of one or more of the devices 405 described with reference to FIG. 4, and/or aspects of one or more of the devices described with reference to FIG. 5, and/or aspects of one or more of the sensor units 110 described with referenced to FIG. 1. In some examples, a process may execute one or more sets of codes to control the functional elements of device 405 and/or device 405-a and/or sensor unit 110 to perform the functions described below. Additionally or alternatively, the processor may perform one or more of the functions described below using special-purpose hardware.

At block 905, the method 900 may include receiving from a first device at a first location, a request to access data associated with a time period from a second device at a second location, the data comprising at least one of audio data, visual data, or a combination thereof. For example, receiving from a first device at a first location, a request to access data associated with a time period from a second device at a second location may include receiving a request to access a camera at a first location. A user at the second device (e.g., house 220) may compose the request. In some examples, the request may be related to vandalism, theft, lost pet, missing child, emergency, etc. The operation(s) at block 905 may be performed using the sensor linking module 415 and/or the request module 520 described with reference to FIGS. 4, 5, and 6 respectively.

At block 910, the method 900 may include receiving from the first device, a category associated with the request. In some examples, the category may include a phrase describing the urgency of the request and may also include a visual identifier. For example, the category may include vandalism, theft, lost pet, missing child, other crimes, and emergency, and the visual representation of the category may be green for vandalism, blue for theft, yellow for other crimes, pink for lost pet, red for missing child missing child and orange for emergency. The operation(s) at block 910 may be performed using the sensor linking module 415 described with reference to FIGS. 4 and 5.

At block 915, the method 900 may include identifying a first set of data associated with the time period, the identified first set of data based at least in part on the request and the category. The operation(s) at block 915 may be performed using the sensor linking module 415 and/or the identification module 505 and/or the alert module 515 described with reference to FIGS. 4 and 5, respectively.

At block 920, the method 900 may include automatically transmitting the first set of data to the first device based at least in part on the category. Based on determining whether the category satisfies a pre-determined threshold, the first set of data may be automatically transmitted. The operation(s) at block 920 may be performed using the sensor linking module 415 and/or the described with reference to FIGS. 4 and 5.

Thus, the method 900 may provide for networked security cameras and related automation. It should be noted that the method 900 is just one implementation and that the operations of the method 900 may be rearranged or otherwise modified such that other implementations are possible.

Figure 10:
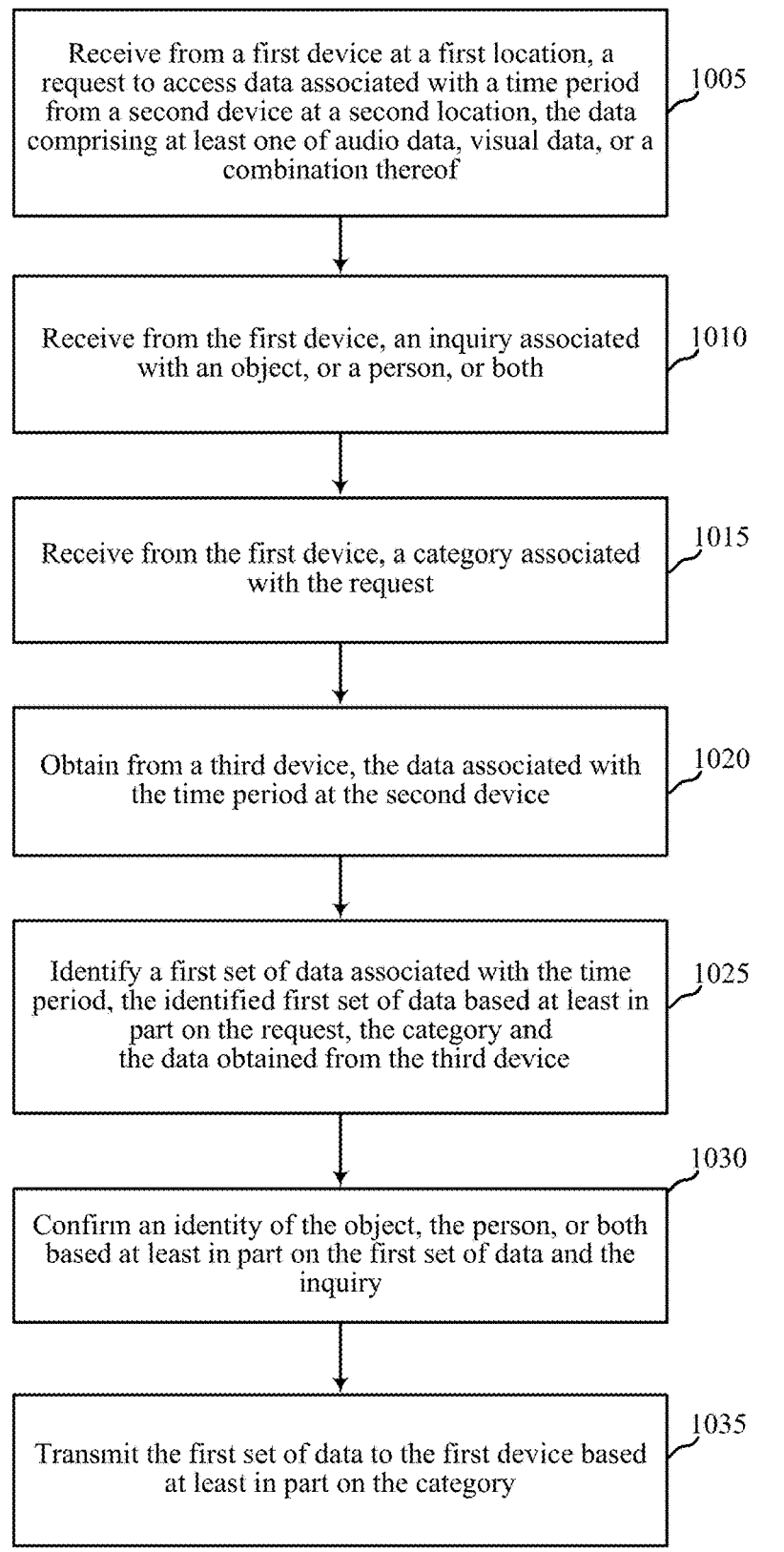
FIG. 10 is a flow chart illustrating an example of a method relating to a security and/or an automation system, in accordance with various aspects of this disclosure.

FIG. 10 is a flow chart illustrating an example of a method 1000 related to a request for information, in accordance with various aspects of the present disclosure. For example, the method 1000 is described below with reference to aspects of one or more of the devices 405 described with reference to FIG. 4, and/or aspects of one or more of the devices described with reference to FIG. 5, and/or aspects of one or more of the sensor units 110 described with referenced to FIG. 1. In some examples, a process may execute one or more sets of codes to control the functional elements of device 405 and/or device 405-a and/or sensor unit 110 to perform the functions described below. Additionally or alternatively, the processor may perform one or more of the functions described below using special-purpose hardware.

At block 1005, the method 1000 may include receiving from a first device at a first location, a request to access data associated with a time period from a second device at a second location, the data comprising at least one of audio data, visual data, or a combination thereof. For example, the request may be a request to access camera footage during the time period at the second camera. The operation(s) at block 1005 may be performed using the sensor linking module 415 and the request module 520 described with reference to FIGS. 4 and 5 respectively.

At block 1010, the method 1000 may include receiving from the first device, an inquiry associated with an object, or a person, or both. For example, a user associated with the first device may include an inquiry related to an object or an event or a person, within the request. The operation(s) at block 1010 may be performed using the sensor linking module 415 and/or the request module 520 described with reference to FIGS. 4 and 5, respectively.

At block 1015, the method 1000 may include receiving from the first device, a category associated with the request. As described previously, the category may include a phrase describing the urgency of the request and may also include a visual identifier. For example, the category may include vandalism, theft, lost pet, missing child, other crimes, and emergency, and the visual representation of the category may be green for vandalism, blue for theft, yellow for other crimes, pink for lost pet, red for missing child missing child and orange for emergency. The operation(s) at block 1015 may be performed using the sensor linking module 415 described with reference to FIGS. 4 and 5.

At block 1020, the method 1000 may include obtaining from a third device, the data associated with the time period at the second device. The operation(s) at block 1020 may be performed using the sensor linking module 415 and/or the identification module 505 described with reference to FIGS. 4 and 5, respectively.

At block 1025, the method 1000 may include identifying a first set of data associated with the time period, the identified first set of data based at least in part on the request, the category and the data obtained from the third device. The operation(s) at block 1025 may be performed using the sensor linking module 415 described with reference to FIGS. 4, 5, and 6

At block 1030, the method 1000 may include confirming an identity of the object, the person, or both based at least in part on the first set of data and the inquiry. The operation(s) at block 1030 may be performed using the sensor linking module 415 described with reference to FIGS. 4, 5, and 6.

At block 1035, the method 1000 may include transmitting the first set of data to the first device based at least in part on the category. The operation(s) at block 1035 may be performed using the sensor linking module 415 described with reference to FIGS. 4, 5, and 6.

Thus, the method 1000 may provide for networked security cameras and related automation. It should be noted that the method 1000 is just one implementation and that the operations of the method 1000 may be rearranged or otherwise modified such that other implementations are possible.

Figure 11:
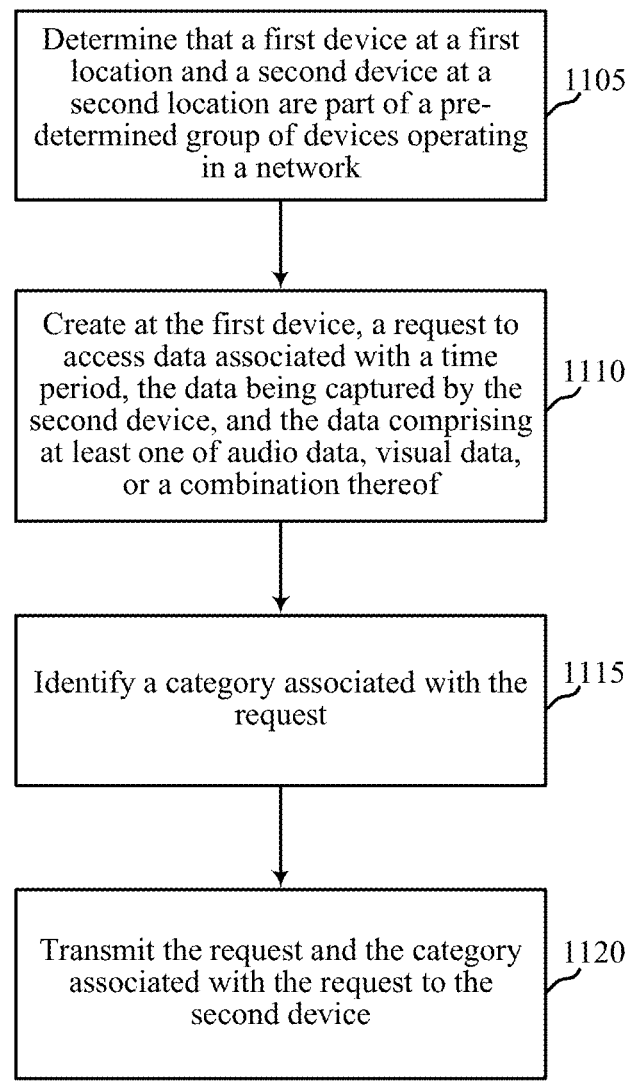
FIG. 11 is a flow chart illustrating an example of a method relating to a security and/or an automation system, in accordance with various aspects of this disclosure.

FIG. 11 is a flow chart illustrating an example of a method 1100 related to a request for information, in accordance with various aspects of the present disclosure. For example, the method 1100 is described below with reference to aspects of one or more of the devices 405 described with reference to FIG. 4, and/or aspects of one or more of the devices described with reference to FIG. 5, and/or aspects of one or more of the sensor units 110 described with referenced to FIG. 1. In some examples, a process may execute one or more sets of codes to control the functional elements of device 405 and/or device 405-a and/or sensor unit 110 to perform the functions described below. Additionally or alternatively, the processor may perform one or more of the functions described below using special-purpose hardware.

At block 1105, the method 1100 may include determining that a first device at a first location and a second device at a second location are part of a pre-determined group of devices operating in a network. As described previously, multiple devices may be networked together in wireless communication (e.g., a neighborhood, a group, a community network). For example, determining that a first device at a first location and a second device at a second location are part of a pre-determined group of devices may include determining that the first device and the second device are members of the same street watch group. The operation(s) at block 1105 may be performed using the sensor linking module 415 described with reference to FIGS. 4, 5, and 6.

At block 1110, the method 1100 may include creating at the first device, a request to access data associated with a time period, the data being captured by the second device, and the data comprising at least one of audio data, visual data, or a combination thereof. In some examples, a user associated with the first device (house 220) may compose a request to access data at the second device (house 215). The operation(s) at block 1110 may be performed using the sensor linking module 415 and/or the request module 520 described with reference to FIGS. 4 and 5, respectively.

At block 1115, the method 1100 may include identifying a category associated with the request. As described previously, the category may include vandalism, theft, lost pet, missing child, other crimes, and emergency, and the visual representation of the category may be green for vandalism, blue for theft, yellow for other crimes, pink for lost pet, red for missing child missing child and orange for emergency. The operation(s) at block 1115 may be performed using the sensor linking module 415 described with reference to FIGS. 4 and 5.

At block 1120, the method 1100 may include transmitting the request and the category associated with the request to the second device. As discussed earlier, the request may be transmitted from a first member of a street watch group to a second member of the street watch group. The operation(s) at block 1120 may be performed using the sensor linking module 415 and/or the request module 520 described with reference to FIGS. 4 and 5, respectively.

Thus, the method 1100 may provide for networked security cameras and related automation. It should be noted that the method 1100 is just one implementation and that the operations of the method 1100 may be rearranged or otherwise modified such that other implementations are possible.

Figure 12:
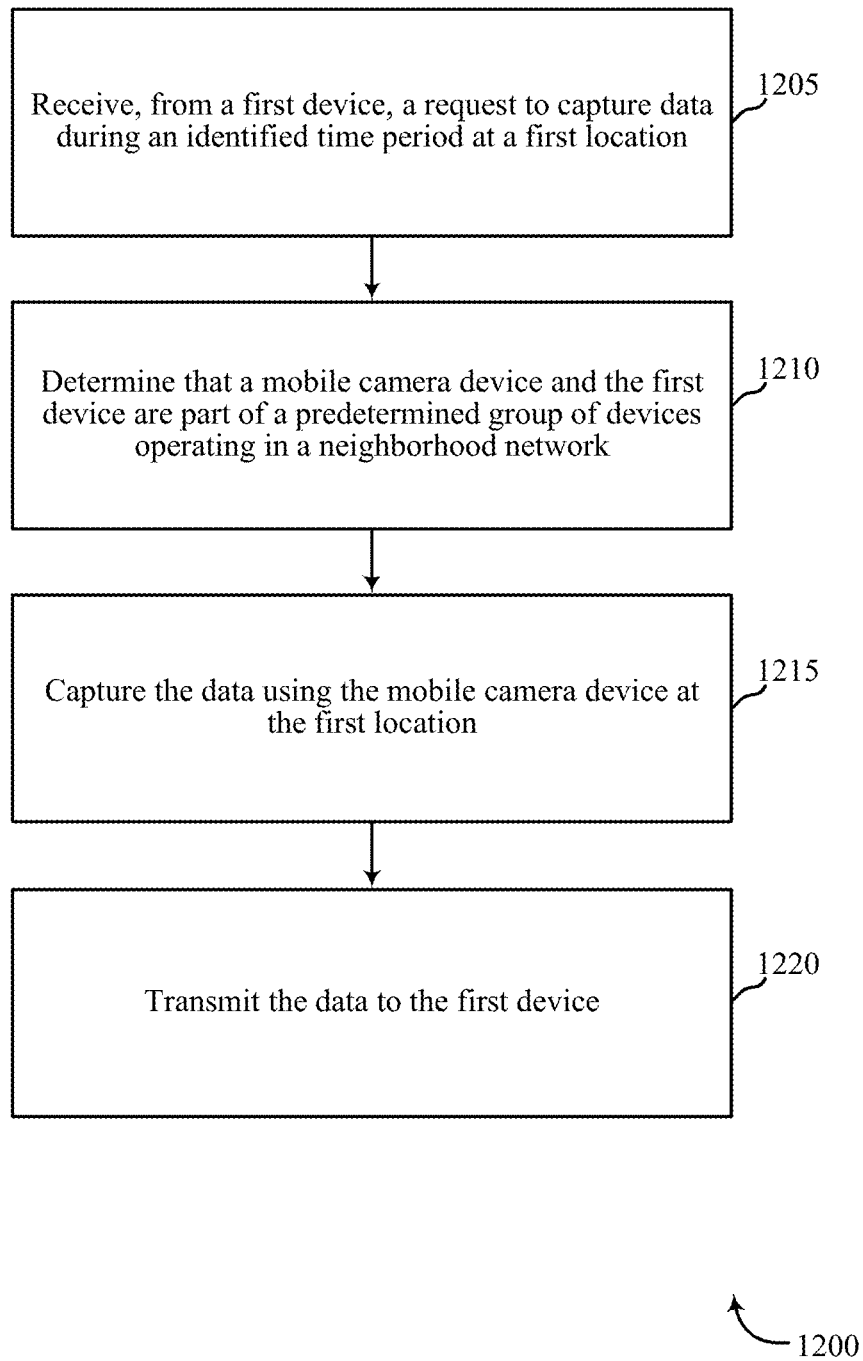
FIG. 12 is a flow chart illustrating an example of a method relating to a security and/or an automation system, in accordance with various aspects of this disclosure.

FIG. 12 is a flow chart illustrating an example of a method 1200 related to a request for information, in accordance with various aspects of the present disclosure. For example, the method 1200 is described below with reference to aspects of one or more of the devices 405 described with reference to FIG. 4, and/or aspects of one or more of the devices described with reference to FIG. 5, and/or aspects of one or more of the sensor units 110 described with referenced to FIG. 1. In some examples, a process may execute one or more sets of codes to control the functional elements of device 405 and/or device 405-a and/or sensor unit 110 to perform the functions described below. Additionally or alternatively, the processor may perform one or more of the functions described below using special-purpose hardware.

At block 1205, the method 1200 may include receiving from a first device, a request to capture data during an identified time period at a first location. For example, receiving from a first device, a request to capture data during an identified time period at a first location may include receiving a request to access a mobile camera device at a first location. The first device may include stationary device (control panel, doorbell camera, outside camera, sensors, etc.) or a mobile camera device. A user at the first device (e.g., house 220) may compose the request. In some examples, the request may be related to vandalism, theft, lost pet, missing child, emergency, etc. The operation(s) at block 1205 may be performed using the sensor linking module 415 and/or the request module 520 described with reference to FIGS. 4, 5, and 6 respectively.

At block 1210, the method 1200 may include determining that a mobile camera device and the first device are part of a predetermined group of devices operating in a neighborhood network. For example, the mobile camera device may belong to a first house (e.g., house 215) and the first device may belong to a second house (e.g., house 220). The first house and the second house may be located within a predetermined proximity of each other. In some examples, the first device and the mobile camera device may be part of the same street watch group. The operation(s) at block 1210 may be performed using the sensor linking module 415 and/or the request module 520 described with reference to FIGS. 4 and 5.

At block 1215, the method 1200 may include capturing the data using the mobile camera device at the first location. For example, upon receiving the request, the mobile camera device may fly to the requested location and capture the data. The operation(s) at block 1215 may be performed using the sensor linking module 415 and/or the capture module 525 described with reference to FIGS. 4 and 5, respectively.

At block 1220, the method 1200 may include transmitting the data to the first device. In some cases, the request may include a category of urgency. Based on determining whether the category satisfies a pre-determined threshold, the data may be automatically transmitted. The operation(s) at block 1220 may be performed using the sensor linking module 415 and/or the capture module 525 and the alert module 515 described with reference to FIGS. 4 and 5.

Thus, the method 1200 may provide for networked security cameras and related automation. It should be noted that the method 1200 is just one implementation and that the operations of the method 1200 may be rearranged or otherwise modified such that other implementations are possible.

Figure 13:
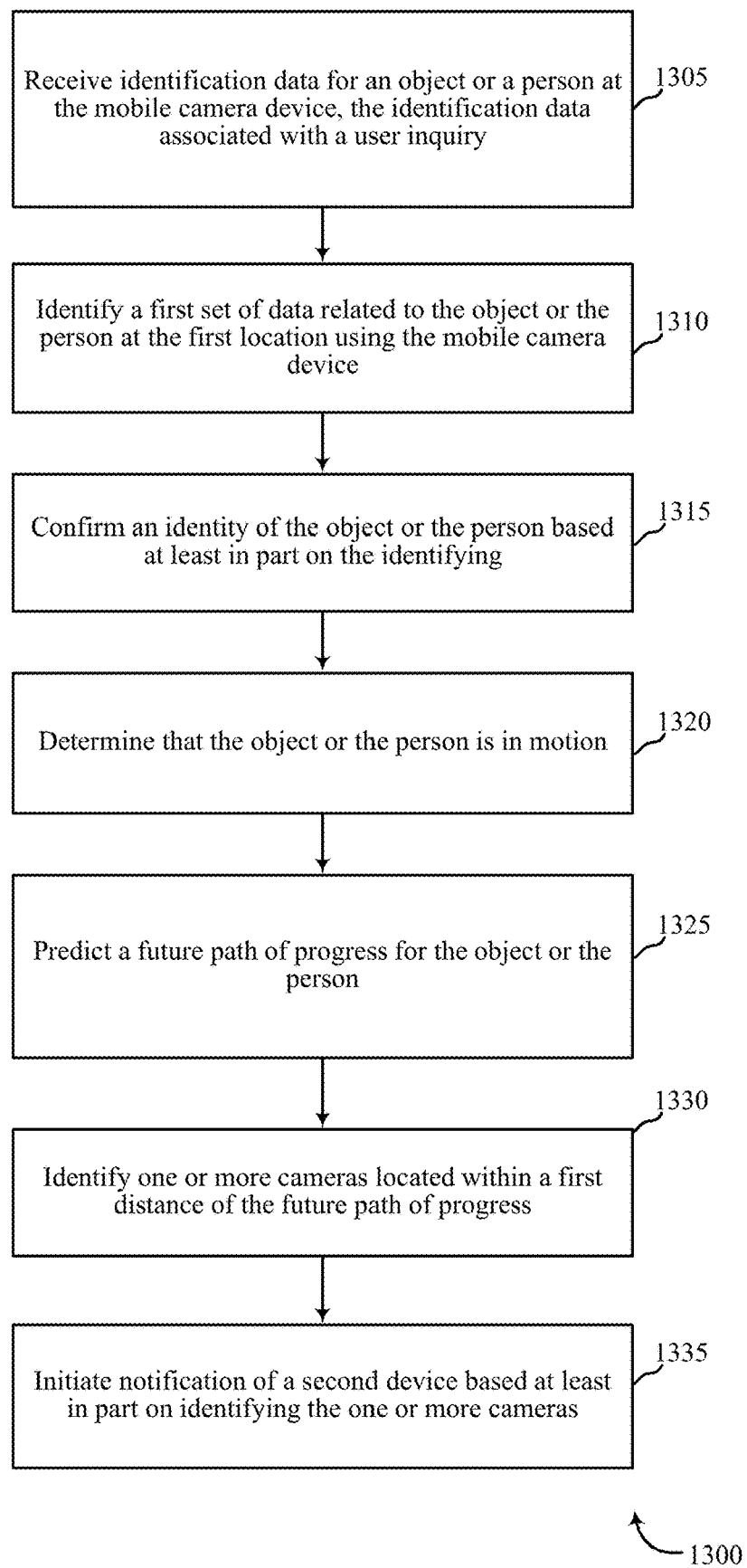
FIG. 13 is a flow chart illustrating an example of a method relating to a security and/or an automation system, in accordance with various aspects of this disclosure.

FIG. 13 is a flow chart illustrating an example of a method 1300 related to a request for information, in accordance with various aspects of the present disclosure. For example, the method 1300 is described below with reference to aspects of one or more of the devices 405 described with reference to FIG. 4, and/or aspects of one or more of the devices described with reference to FIG. 5, and/or aspects of one or more of the sensor units 110 described with referenced to FIG. 1. In some examples, a process may execute one or more sets of codes to control the functional elements of device 405 and/or device 405-a and/or sensor unit 110 to perform the functions described below. Additionally or alternatively, the processor may perform one or more of the functions described below using special-purpose hardware.

At block 1305, the method 1300 may include receiving identification data for an object or a person at the mobile camera device. In some cases, the identification data may be associated with a user inquiry. For example, a control panel and/or mobile camera device may receive an inquiry related to an object or an event or a person. The operation(s) at block 1305 may be performed using the sensor linking module 415 and the identification module 505 described with reference to FIGS. 4 and 5 respectively.

At block 1310, the method 1300 may include identifying a first set of data related to the object or the person at the first location using the mobile camera device. For example, a mobile camera device may identity audio and/or video data associated with an object or a person present at the requested location. The operation(s) at block 1310 may be performed using the sensor linking module 415 and/or the identification module 505 described with reference to FIGS. 4 and 5, respectively.

At block 1315, the method 1300 may include confirming an identity of the object or the person based at least in part on the identifying. The operation(s) at block 1315 may be performed using the sensor linking module 415 and/or the identification module 505 described with reference to FIGS. 4 and 5.

At block 1320, the method 1300 may include determining that the object or the person is in motion. For example, the mobile camera device may determine that the identified object and/or person is moving. In some cases, the stationary device (control panel) in conjunction with the mobile camera device may determine that the object or the person is in motion. The operation(s) at block 1320 may be performed using the sensor linking module 415 and/or the identification module 505 described with reference to FIGS. 4 and 5, respectively.

At block 1325, the method 1300 may include predicting a future path of progress for the object or the person. For example, the future path of progress may be based at least in part on a current speed of the object or the person, a current time of the day, weather conditions, traffic conditions, navigation data, etc. The operation(s) at block 1325 may be performed using the sensor linking module 415 and/or identification module 505 described with reference to FIGS. 4, and 5.

At block 1330, the method 1300 may include identifying one or more cameras located within a first distance of the future path of progress. The one or more cameras may be stationary cameras as well as mobile camera devices. The operation(s) at block 1330 may be performed using the sensor linking module 415 and/or identification module 505 described with reference to FIGS. 4 and 5.

At block 1335, the method 1300 may include initiate notification of a second device based at least in part on identifying the one or more cameras. The operation(s) at block 1335 may be performed using the sensor linking module 415 described with reference to FIGS. 4, 5, and 6.

Thus, the method 1300 may provide for networked security cameras and related automation. It should be noted that the method 1300 is just one implementation and that the operations of the method 1300 may be rearranged or otherwise modified such that other implementations are possible.

Figure 14:
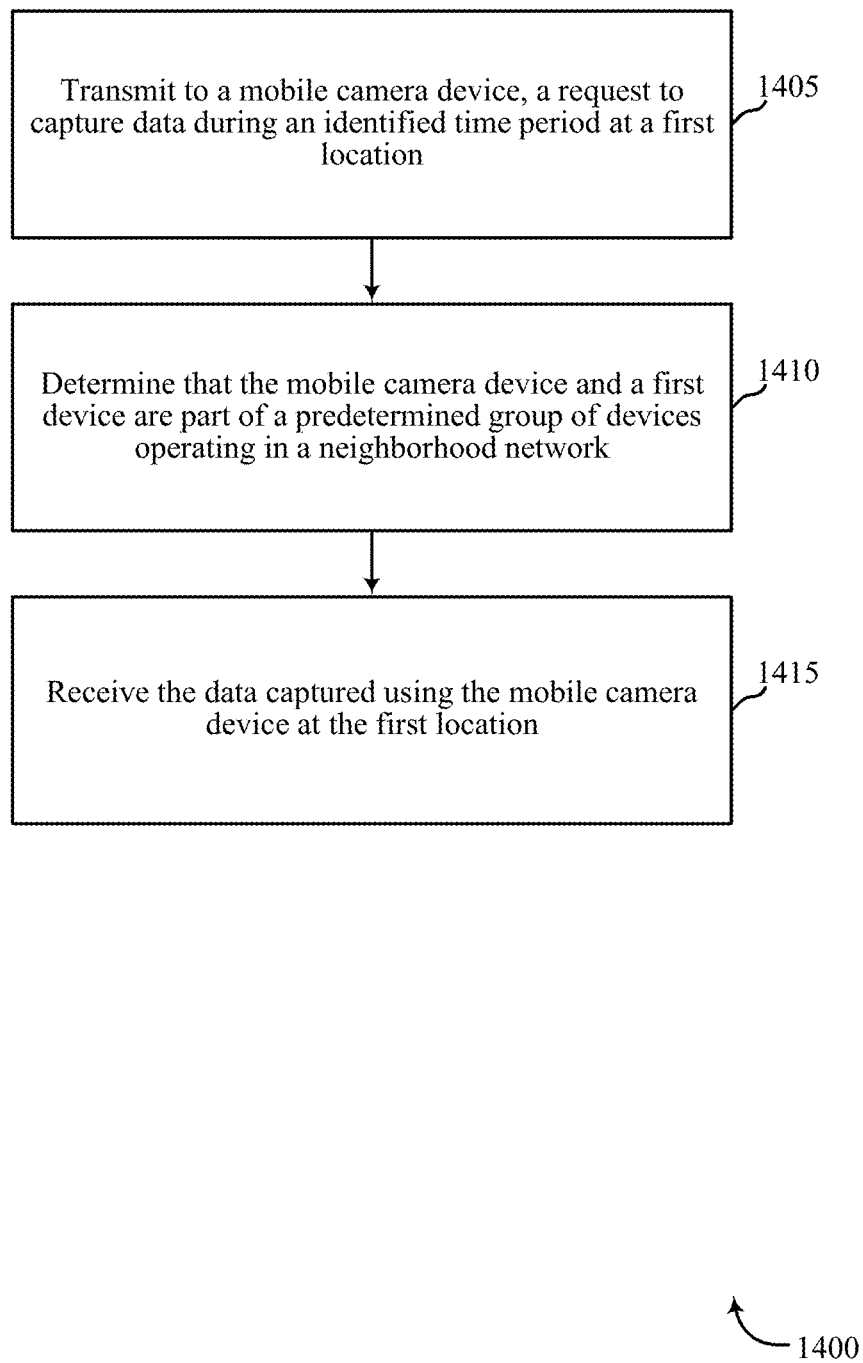
FIG. 14 is a flow chart illustrating an example of a method relating to a security and/or an automation system, in accordance with various aspects of this disclosure.

FIG. 14 is a flow chart illustrating an example of a method 1400 related to a request for information, in accordance with various aspects of the present disclosure. For example, the method 1400 is described below with reference to aspects of one or more of the devices 405 described with reference to FIG. 4, and/or aspects of one or more of the devices described with reference to FIG. 5, and/or aspects of one or more of the sensor units 110 described with referenced to FIG. 1. In some examples, a process may execute one or more sets of codes to control the functional elements of device 405 and/or device 405-a and/or sensor unit 110 to perform the functions described below. Additionally or alternatively, the processor may perform one or more of the functions described below using special-purpose hardware.

At block 1405, the method 1400 may include transmitting to a mobile camera device, a request to capture data during an identified time period at a first location. For example, a user at a first device (e.g., a control panel, a doorbell camera, a sensor, a drone) may compose a request to capture data by a mobile camera device at the first location. In some cases, the request may be an inquiry relating to a person, an event or an object. The operation(s) at block 1405 may be performed using the sensor linking module 415 described with reference to FIGS. 4, 5, and 6.

At block 1410, the method 1400 may include determining that the mobile camera device and a first device are part of a predetermined group of devices operating in a neighborhood network. As described previously, multiple devices may be networked together in wireless communication (e.g., a neighborhood, a group, a community network). For example, determining that the mobile camera device and a first device are part of a predetermined group of devices operating in a neighborhood network may include determining that the mobile camera device and the first device are members of the same street watch group. The operation(s) at block 1410 may be performed using the sensor linking module 415 and/or the request module 520 described with reference to FIGS. 4 and 5, respectively.

At block 1415, the method 1400 may include receiving the data captured using the mobile camera device at the first location. For example, the requesting device may receive data captured at the requested location. The data may include audio data, image, video footage, a combination of image and video, etc. The operation(s) at block 1415 may be performed using the sensor linking module 415 described with reference to FIGS. 4 and 5.

Thus, the method 1400 may provide for networked security cameras and related automation. It should be noted that the method 1400 is just one implementation and that the operations of the method 1400 may be rearranged or otherwise modified such that other implementations are possible.

In some examples, aspects from two or more of the methods 700, 800, 900, 1000, 1100, 1200, 1300, and 1400 may be combined and/or separated. It should be noted that the methods 700, 800, 900, 1000, 1100, 1200, 1300, and 1400 are just example implementations, and that the operations of the methods 700, 800, 900, 1000, 1100, 1200, 1300, and 1400 may be rearranged or otherwise modified such that other implementations are possible. In some examples, aspects from two or more of the methods 700, 800, 900, 1000, 1100, 1200, 1300, and 1400 may be combined and/or separated. It should be noted that the methods 700, 800, 900, 1000, 1100, 1200, 1300, and 1400 are just example implementations, and that the operations of the methods 700, 800, 900, 1000, 1100, 1200, 1300, and 1400 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some examples, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various examples have been described and/or illustrated here in the context of fully functional computing systems, one or more of these exemplary examples may be distributed as a program product in a variety of forms, regardless of the particular type of computer-readable media used to actually carry out the distribution. The examples disclosed herein may also be implemented using software modules that perform certain tasks. These software modules may include script, batch, or other executable files that may be stored on a computer-readable storage medium or in a computing system. In some examples, these software modules may permit and/or instruct a computing system to perform one or more of the exemplary examples disclosed here.

This description, for purposes of explanation, has been described with reference to specific examples. The illustrative discussions above, however, are not intended to be exhaustive or limit the present systems and methods to the precise forms discussed. Many modifications and variations are possible in view of the above teachings. The examples were chosen and described in order to explain the principles of the present systems and methods and their practical applications, to enable others skilled in the art to utilize the present systems, apparatus, and methods and various examples with various modifications as may be suited to the particular use contemplated.

What is claimed is:

1. A method for security or automation systems, comprising:
    receiving, from a first device, a request to capture data during an identified time period at a first location;
    determining that an unmanned air vehicle and the first device are part of a predetermined group of devices operating in a neighborhood network based at least in part on the predetermined group of devices being networked together via wireless communication, wherein the neighborhood network comprises a plurality of users associated with each of the devices of the predetermined group;
    capturing the data using the unmanned air vehicle during the identified time period and at the first location based at least in part on receiving the request to capture the data;

receiving, from the first device, a request to access the data captured during the identified time period and at the first location, wherein the request is received after capturing the data;

transmitting the data to the first device based at least in part on receiving the request to access the data captured;

identifying an object at the first location;

determining that the object is a mobile object;

retrieving data related to a second object previously captured at the first location; and transmitting an indicator associated with an adjustment of a security action at the first location based at least in part on determining that the object is the mobile object and the retrieved data.

2. The method of claim 1, wherein the first device comprises a stationary device.

3. The method of claim 1, further comprising:

identifying a first set of data related to a person or an event at the first location based at least in part on capturing the data, wherein transmitting the data comprises transmitting the first set of data related to the person or the event at the first location to the first device based at least in part on identifying the first set of data.

4. The method of claim 1, further comprising:

receiving identification data for the object or a person at the unmanned air vehicle, the identification data associated with a user inquiry;

identifying a first set of data related to the object or the person at the first location using the unmanned air vehicle; and confirming an identity of the object or the person based at least in part on the identifying.

5. The method of claim 4, further comprising:

determining that the object or the person is in motion;

following a path of progress for the object or the person for a predefined distance; and initiating notification of a second device based at least in part on the path of progress for the object or the person.

6. The method of claim 5, further comprising:

predicting a future path of progress for the object or the person;

identifying one or more cameras located within a first distance of the future path of progress; and initiating notification of the second device based at least in part on identifying the one or more cameras, wherein a second mobile camera device comprises one of the one or more cameras.

7. The method of claim 6, wherein the one or more cameras comprise one or more stationary cameras, the one or more stationary cameras and the second mobile camera device being part of the predetermined group of devices operating in the neighborhood network.

8. The method of claim 1, further comprising:

identifying the predetermined group of devices based at least in part on a geographic proximity of each to the first location, or a second location, or both, wherein the first location and the second location are each associated with different homes.

9. The method of claim 1, further comprising:

receiving data related to occupancy at the first location; and capturing the data using the unmanned air vehicle at the first location based at least in part on receiving the data related to the occupancy.

10. The method of claim 9, further comprising:

transmitting an indicator associated with an adjustment of a security action at the first location based at least in part on the received data related to the occupancy, the captured data, or both.

11. The method of claim 1, wherein the request comprises a request to capture audio, visual data, or both during the identified time period at the first location.

12. A method for security or automation systems, comprising:

transmitting, to an unmanned air vehicle, a request to capture data during an identified time period at a first location;

determining that the unmanned air vehicle and a first device are part of a predetermined group of devices operating in a neighborhood network based at least in part on the predetermined group of devices being networked together via wireless communication, wherein the neighborhood network comprises a plurality of users associated with each of the devices of the predetermined group;

transmitting, to the unmanned air vehicle, a request to access the data captured during the identified time period and at the first location, wherein the request is transmitted after capturing the data;

receiving the data captured using the unmanned air vehicle during the identified time period and at the first location based at least in part on transmitting the request to access the data captured;

identifying an object at the first location;

determining that the object is a mobile object;

retrieving data related to a second object previously captured at the first location; and transmitting an indicator associated with an adjustment of a security action at the first location based at least in part on determining that the object is the mobile object and the retrieved data.

13. The method of claim 12, wherein the first device comprises a stationary device.

14. The method of claim 12, further comprising:

transmitting identification data for the object or a person to the unmanned air vehicle, the identification data associated with a user inquiry;

determining that the object or the person is in motion;

identifying a path of progress for the object or the person for a predefined distance; and transmitting the identified path of progress to the unmanned air vehicle.

15. The method of claim 14, further comprising:

predicting a future path of progress for the object or the person;

identifying one or more cameras located within a first distance of the future path of progress; and notifying a second device based at least in part on identifying the one or more cameras, wherein a second mobile camera device comprises one of the one or more cameras.

16. An apparatus for security or automation systems, comprising:

a processor;

a memory in electronic communication with the processor; and instructions stored in the memory, the instructions being executable by the processor to:

receive, from a first device, a request to capture data during an identified time period at a first location;

determine that an unmanned air vehicle and the first device are part of a predetermined group of devices operating in a neighborhood network based at least in part on the predetermined group of devices being networked together via wireless communication, wherein the neighborhood network comprises a plurality of users associated with each of the devices of the predetermined group;

capture the data using the unmanned air vehicle during the identified time period and at the first location based at least in part on receiving the request to capture the data;

receive, from the first device, a request to access the data captured during the identified time period and at the first location, wherein the request is received after capturing the data;

transmit the data to the first device based at least in part on receiving the request to access the data captured;

identify an object at the first location;

determine that the object is a mobile object;

retrieve data related to a second object previously captured at the first location; and transmit an indicator associated with an adjustment of a security action at the first location based at least in part on determining that the object is the mobile object and the retrieved data.

17. The apparatus of claim 16, wherein the first device comprises a stationary device.

18. The apparatus of claim 16, wherein the instructions are further executable by the processor to:
identify a first set of data related to a person or an event at the first location based at least in part on capturing the data, wherein transmitting the data comprises transmitting the first set of data related to the person or the event at the first location to the first device based at least in part on identifying the first set of data.

19. The apparatus of claim 16, wherein the instructions are further executable by the processor to:
receive identification data for the object or a person at the unmanned air vehicle, the identification data associated with a user inquiry;
identify a first set of data related to the object or the person at the first location using the unmanned air vehicle; and
confirm an identity of the object or the person based at least in part on the identifying.

* * * * *